(12) United States Patent
Tai et al.

(10) Patent No.: US 7,534,829 B2
(45) Date of Patent: May 19, 2009

(54) RESIN COMPOSITION AND MULTI-LAYER STRUCTURES

(75) Inventors: Shinji Tai, Okayama (JP); Kaoru Ikeda, Okayama (JP); Haruhisa Masuda, Osaka (JP); Tomoyuki Watanabe, Okayama (JP); Kouta Isoyama, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 302 days.

(21) Appl. No.: 10/503,586

(22) PCT Filed: Feb. 20, 2003

(86) PCT No.: PCT/JP03/01843

§ 371 (c)(1),
(2), (4) Date: Aug. 12, 2004

(87) PCT Pub. No.: WO03/072653

PCT Pub. Date: Sep. 4, 2003

(65) Prior Publication Data

US 2005/0147778 A1    Jul. 7, 2005

(30) Foreign Application Priority Data

Feb. 26, 2002 (JP) ............................. 2002-050530
Sep. 25, 2002 (JP) ............................. 2002-279983

(51) Int. Cl.
| | |
|---|---|
| C08L 29/04 | (2006.01) |
| C08F 8/00 | (2006.01) |
| C08F 16/06 | (2006.01) |
| C08L 21/00 | (2006.01) |
| C08L 53/02 | (2006.01) |
| C08J 3/24 | (2006.01) |

(52) U.S. Cl. ...................... 524/503; 524/504; 524/524; 525/57; 525/61; 525/223

(58) Field of Classification Search ................ 524/503, 524/504, 524; 525/57, 61, 223
See application file for complete search history.

(56) References Cited

U.S. PATENT DOCUMENTS

| | | | |
|---|---|---|---|
| 2,434,179 A * | 1/1948 | Sharkey | ........................ 525/60 |
| 3,025,267 A | 3/1962 | Calfee | |
| 3,106,543 A | 10/1963 | Milne | |
| 3,707,567 A | 12/1972 | Wingler et al. | |
| 5,214,091 A * | 5/1993 | Tanaka et al. | ................ 524/425 |
| 6,533,964 B1 * | 3/2003 | Hata et al. | .................. 252/511 |
| 2005/0147778 A1 | 7/2005 | Tai et al. | |

FOREIGN PATENT DOCUMENTS

| | | |
|---|---|---|
| EP | 0 585 929 A2 | 3/1994 |
| EP | 585929 A2 * | 3/1994 |
| EP | 1 090 932 A1 | 4/2001 |
| EP | 1 403 289 A1 | 3/2004 |
| GB | 958893 | 5/1964 |
| JP | 49-16279 | 4/1974 |
| JP | 50-12186 | 2/1975 |
| JP | 53-35993 | 9/1978 |
| JP | 60-197704 | 10/1985 |
| JP | 63-8448 | 1/1988 |
| JP | 63-230757 | 9/1988 |
| JP | 3-227307 | 10/1991 |
| JP | 03227307 A * | 10/1991 |
| JP | 5-320330 | 12/1993 |
| JP | 6-136138 | 5/1994 |
| JP | 11-140120 | 5/1999 |
| JP | 11-181053 | 7/1999 |
| JP | 11-198539 | 7/1999 |
| JP | 2000-219738 | 8/2000 |
| WO | WO 00/56780 | 9/2000 |

OTHER PUBLICATIONS

Translation to JP 03227307 (Oct. 1991).*

* cited by examiner

*Primary Examiner*—Kelechi C Egwim
(74) *Attorney, Agent, or Firm*—Oblon, Spivak, McClelland, Maier & Neustadt, P.C.

(57) ABSTRACT

Provided is a resin composition comprising 1-99% by weight of a modified ethylene-vinyl alcohol copolymer (C) having an ethylene content of 5-55 mol %, which contains a specific structural unit (I) in an amount of 0.3-40 mol % and can be obtained by reacting an ethylene-vinyl alcohol copolymer (A) with a monofunctional epoxy compound (B) having a molecular weight of not more than 500, and 1-99% by weight of a thermoplastic resin (T1) other than (C). Moreover, a multilayer structure in which the resin composition and a thermoplastic resin (T2) are laminated is also provided. Thus, a resin composition superior in barrier properties, transparency, stretchability, flexibility, flexing resistance and interlayer adhesiveness and various kinds of molded articles made thereof are provided.

66 Claims, 11 Drawing Sheets

Parison body side

Parison body side

RESIN COMPOSITION AND MULTI-LAYER STRUCTURES

TECHNICAL FIELD

The present invention relates to a resin composition comprising a modified ethylene-vinyl alcohol copolymer and a thermoplastic resin other than the copolymer. Moreover, the invention relates to a resin composition which can be obtained by subjecting a modified ethylene-vinyl alcohol copolymer and an elastomer to a dynamic crosslinking treatment. Moreover, the invention relates also to various types of molded articles and multilayer structures comprising these resin compositions and to their applications.

BACKGROUND ART

An ethylene-vinyl alcohol copolymer, which henceforth may be abbreviated as EVOH, is superior in transparency and gas barrier property, but it has defect of being poor in stretchability, flexibility and flexing resistance. Known is a method of blending a flexible resin such as an ethylene-vinyl acetate copolymer and an ethylene-propylene copolymer to an EVOH to improve the defect. However, this method has a defect that the transparency deteriorates greatly.

On the other hand, JP-A-63-230757 discloses a resin composition comprising 94-30 parts by weight of EVOH (A) having an ethylene content of 20-45 mol % and a degree of saponification of 96 mol % or more and 6-70 parts by weight of EVOH (B) having an ethylene content of 24-49 mol % and a degree of saponification of less than 96 mol %, wherein the ethylene content of (B) is greater by at least 4 mol % than that of (A) and the degree of saponification of (A) is greater by at least 3 mol % than that of (B) and wherein the ethylene contents and solubility parameters of (A) and (B) satisfy a specific relation. This resin composition is reported to be superior in heat high-speed stretchability.

JP-A-50-12186 discloses a method for producing a modified EVOH with an improved mold-workability, the method being characterized by reacting 0.01-0.8 parts by weight of polyfunctional epoxy compound with 100 parts by weight of EVOH having an ethylene content of 20-90 mol % and a degree of saponification of 95% or more. This published specification also discloses that such a modified EVOH can be mixed with the other resins such as unmodified EVOH and polyolefin.

However, in a method of blending a soft resin other than EVOH to EVOH, it is difficult for a resulting resin composition to have satisfactory stretchability, flexibility and flexing resistance and satisfactory transparency simultaneously. In addition, the gas barrier property is also deteriorated. Moreover, the resin composition disclosed in the above-cited JP-A-63-230757 does not necessarily have satisfactory flexibility or satisfactory flexing resistance.

In JP-A-50-12186, an improvement in neck-in (a phenomenon that a product width becomes narrower than die slit width) which occurs when an EVOH is shaped into a film through a T-die is disclosed as an improvement in mold-workability. However, there is no description about the improvement in stretchability, flexibility and flexing resistance, which is the object of the present invention. Moreover, the EVOH resulting from a reaction with a specific amount of multifunctional epoxy compound or a resin composition containing the same, which are disclosed in the above-cited publication cannot demonstrate effects of improving stretchability, flexibility and flexing resistance. Furthermore, in the case of using a polyfunctional epoxy compound, it is difficult to produce an EVOH whose amount of modification with an epoxy compound is within the specific range specified in the present invention.

An object of the present invention is to provide a resin composition superior in barrier properties, transparency, stretchability, flexibility, flexing resistance and interlayer adhesiveness and a barrier material comprising the same. In addition, the present invention intends to provide various types of molded articles comprising such a resin composition.

DISCLOSURE OF THE INVENTION

The above-mentioned objects can be achieved by providing a resin composition comprising 1-99% by weight of a modified ethylene-vinyl alcohol copolymer (C) having an ethylene content of 5-55 mol % and containing 0.3-40 mol % of the following structural unit (I) and 1-99% by weight of a thermoplastic resin (T1) other than (C):

wherein $R^1$, $R^2$, $R^3$ and $R^4$ denote a hydrogen atom, an aliphatic hydrocarbon group having 1-10 carbon atoms, an alicyclic hydrocarbon group having 3-10 carbon atoms or an aromatic hydrocarbon group having 6-10 carbon atoms; $R^1$, $R^2$, $R^3$ and $R^4$ may be the same group or may differ; $R^3$ and $R^4$ may be combined together; and $R^1$, $R^2$ $R^3$ and $R^4$ may have a hydroxyl group, a carboxyl group or a halogen atom.

It is preferable that both $R^1$ and $R^2$ be hydrogen atoms. It is more preferable that one of $R^3$ and $R^4$ be an aliphatic hydrocarbon group having 1-10 carbon atoms and the other be a hydrogen atom. It is still more preferable that one of $R^3$ and $R^4$ be a substituent represented by $(CH_2)_i OH$, wherein i is an integer of 1-8, and the other be a hydrogen atom.

In addition, the above-mentioned objects are also achieved by providing a resin composition comprising 1-99% by weight of a modified ethylene-vinyl alcohol copolymer (C) obtained by reacting an ethylene-vinyl alcohol copolymer (A) with a monofunctional epoxy compound (B) having a molecular weight of not more than 500 and 1-99% by weight of a thermoplastic resin (T1) other than (C).

It is preferable that the modified ethylene-vinyl alcohol (C) have a melting point of not higher than 160° C. It is also preferable that the thermoplastic resin (T1) have an oxygen transmission rate at 20° C. and 65% RH of not more than 1000 cc·20 μm/m²·day·atm and that the resin composition have an oxygen transmission rate at 20° C. and 65% RH of not more than 100 cc·20 μm/m²·day·atm.

That the thermoplastic resin (T1) is an ethylene-vinyl alcohol copolymer (F) having an ethylene content of 5-55 mol % and being free of said structural unit (I) is one preferable embodiment of the present invention. In such an event, it is more preferable that the resin composition comprise 1-50% by weight of the modified ethylene-vinyl alcohol copolymer (C) and 50-99% by weight of the ethylene-vinyl alcohol copolymer (F). It is more preferable that the difference between the ethylene content of the modified ethylene-vinyl alcohol copolymer (C) and the ethylene content of the ethylene-vinyl alcohol copolymer (F) be 2-30 mol %.

That the thermoplastic resin (T1) is a polyolefin (G) is also one preferable embodiment of the present invention. In such an event, it is more preferable that the resin composition comprise 10-60% by weight of the modified ethylene-vinyl alcohol copolymer (C) and 40-90% by weight of the polyolefin (G). That the thermoplastic resin (T1) comprises a polyolefin (G) and a compatibilizer (H) is also one preferable embodiment of the present invention.

The above-mentioned objects are also achieved by providing a resin composition obtained by mixing 100 parts by mass of a modified ethylene-vinyl alcohol copolymer (C) containing 0.3-40 mol % of a following structural unit (I), 5-900 parts by mass of an elastomer (J) having a functional group capable of reacting with the following crosslinking agent (K) and 0.05-30 parts by weight, based on 100 parts by weight of the elastomer (J), of a crosslinking agent (K) under melt condition and performing a dynamic crosslinking treatment:

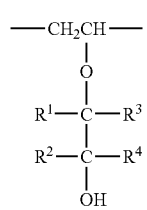

(I)

wherein $R^1$, $R^2$, $R^3$ and $R^4$ denote a hydrogen atom, an aliphatic hydrocarbon group having 1-10 carbon atoms, an alicyclic hydrocarbon group having 3-10 carbon atoms or an aromatic hydrocarbon group having 6-10 carbon atoms; $R^1$, $R^2$, $R^3$ and $R^4$ may be the same group or may differ; $R^3$ and $R^4$ may be combined together; and $R^1$, $R^2$, $R^3$ and $R^4$ may have a hydroxyl group, a carboxyl group or a halogen atom.

It is preferable that the modified ethylene-vinyl alcohol copolymer (C) be one which is obtained by reacting an ethylene-vinyl alcohol copolymer (A) with a monofunctional epoxy compound (B) having a molecular weight of not more than 500. It is preferable that a particle of a crosslinked elastomer (J) having a diameter of 0.1-30 μm be dispersed in a matrix of the modified ethylene-vinyl alcohol copolymer (C).

In such an event, it is preferable that the functional group capable of reacting with the crosslinking agent be at least one functional group selected from the group consisting of a hydroxyl group, an amino group, an alkylamino group, an epoxy group, an ether group, a carboxyl group, an ester group, an amide group, a bromine group, a group having a structure of dicarboxylic anhydride, a boronic acid group, a boron-containing group that is convertible to a boronic acid group in the presence of water and a double bond. It is also preferable that the elastomer (J) be a block copolymer which has a functional group capable of reacting the crosslinking agent (K) and which comprises a vinyl aromatic polymer block and a conjugate diene polymer block.

One preferable embodiment of the present invention is a barrier material comprising any of the above-mentioned resin compositions. A molded article, an extrusion molded article, a film, a sheet, a oriented film, a thermoformed article, a heat shrinkable film, a pipe, a hose, an extrusion blow molded article, a container, a packing for a container, a flexible packaging material, and a material for a packaging food and beverage are all preferable embodiments of the present invention.

A multilayer structure in which a layer of any of the above-mentioned resin compositions and a layer of another material, such as a thermoplastic resin (T2) are laminated, is also a preferable resin composition of the present invention. In such an event, it is preferable that the thermoplastic resin (T2) be at least one selected from the group consisting of polyolefin, polyamide, polyester, polystyrene, polyurethane, polyvinylidene chloride, polyvinyl chloride, polyacrylonitrile and polycarbonate. It is also preferable that the thermoplastic resin (T2) be an elastomer.

A coextrusion film, coextrusion sheet, multilayer pipe, multilayer hose, pipe for hot water circulation and coextrusion blow molded container comprising the above-mentioned multilayer structure are all preferable embodiments. Moreover, a coinjection blow molded container comprising the above-mentioned multilayer structure is also one preferable embodiment. In this event, a coinjection blow molded container in which the thermoplastic resin (T2) is at least one selected from the group consisting of polyester, polypropylene and polyethylene is a particularly preferable embodiment.

The present invention is described in detail below.

The present invention is a resin composition comprising 1-99% by weight of a modified ethylene-vinyl alcohol copolymer (C) having an ethylene content of 5-55 mol % and containing 0.3-40 mol % of the following structural unit (I) and 1-99% by weight of a thermoplastic resin (T1) other than (C):

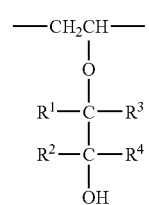

(I)

wherein $R^1$, $R^2$, $R^3$ and $R^4$ denote a hydrogen atom, an aliphatic hydrocarbon group having 1-10 carbon atoms (e.g. an alkyl group and an alkenyl group), an alicyclic hydrocarbon group having 3-10 carbon atoms (e.g. a cycloalkyl group and a cycloalkenyl group) and an aromatic hydrocarbon group having 6-10 carbon atoms (e.g. a phenyl group); $R^1$, $R^2$, $R^3$ and $R^4$ may be the same group or may differ; $R^3$ and $R^4$ may be combined together, provided that the case where both $R^3$ and $R^4$ are hydrogen atoms is excluded; and $R^1$, $R^2$, $R^3$ and $R^4$ may have other groups, for example, a hydroxyl group, a carboxyl group and a halogen atom.

The modified EVOH (C) used in the present invention is a modified ethylene-vinyl alcohol copolymer (C) having an ethylene content of 5-55 mol % and containing 0.3-40 mol % of the structural unit (I) shown above.

In a more preferable embodiment, both $R^1$ and $R^2$ are hydrogen atoms. In a still more preferable embodiment, both $R^1$ and $R^2$ are hydrogen atoms and one of $R^3$ and $R^4$ is an aliphatic hydrocarbon group having 1-10 carbon atoms and the other is a hydrogen atom. Preferably, the aliphatic hydrocarbon group is an alkyl group or an alkenyl group. From a viewpoint of attaching great importance to the gas barrier properties required when the modified EVOH (C) is used as a barrier material, it is more preferable that one of $R^3$ and $R^4$ be a methyl group or an ethyl group and the other be a hydrogen atom.

In addition, from a view point of the gas barrier properties required when the modified EVOH (C) is used as a barrier material, it is preferable also that one of $R^3$ and $R^4$ be a substituent represented by $(CH_2)_iOH$, wherein i is an integer of 1-8, and the other be a hydrogen atom. When much importance is attached to the gas barrier properties as a barrier material, in the substituent represented by $(CH_2)_iOH$, i is preferably an integer of 1-4, more preferably 1 or 2, and still more preferably 1.

The amount of the structure unit (I) contained in the modified EVOH (C) must fall within the range of 0.3-40 mol %. The lower limit of the amount of the structure unit (I) is preferably not less than 0.5 mol %, more preferably not less than 1 mol %, and still more preferably not less than 2 mol %. On the other hand, the upper limit of the amount of the structure unit (I) is not more than 35 mol %, more preferably not more than 30 mol %, and still more preferably not more than 25 mol %. A modified EVOH (C) superior simultaneously in gas barrier properties, transparency, stretchability, flexibility and flexing resistance can be obtained when the amount of the structure unit (I) contained therein falls within the range mentioned above.

The ethylene content of the modified EVOH (C) is preferably 5-55 mol %. From a viewpoint where the modified EVOH (C) of the present invention becomes superior in stretchability, flexibility and flexing resistance, the lower limit of the ethylene content of the modified EVOH (C) is more preferably not less than 10 mol %, still more preferably not less than 20 mol %, particularly preferably not less than 25 mol %, and more preferably not less than 31 mol %. On the other hand, from a viewpoint of the gas barrier properties of the modified EVOH (C) of the present invention, the upper limit of the ethylene content of the modified EVOH (C) is more preferably not more than 50 mol %, still more preferably not more than 45 mol %. When the ethylene content is less than 5 mol %, the melt moldability may become poor, whereas when it exceeds 55 mol %, the gas barrier properties may be insufficient.

The constituents of the modified EVOH (C) other than the structure units (I) and the ethylene units are mainly vinyl alcohol units. The vinyl alcohol units are usually vinyl alcohol units which had not reacted with monofunctional epoxy compounds (B)contained in a starting EVOH (A). Unsaponified vinyl acetate units which may be contained in the EVOH (A) are usually contained in the modified EVOH (C) as they are. Measurements of NMR and melting point showed that the modified EVOH (C) is a random copolymer which contains these constituents. Furthermore, other constituents may also be contained unless the object of the present invention is adversely affected.

A preferable melt flow rate (MFR) (measured at 190° C. under a load of 2160 g) of the modified EVOH (C) of the present invention is 0.1-30 g/10 min, more preferably 0.3-25 g/10 min, and still more preferably 0.5-20 g/10 min. It is noted that when the melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.

The method for producing the modified EVOH (C) is not limited particularly. The method that the present inventors recommend is a method in which the modified EVOH (C) is obtained by reacting an ethylene vinyl alcohol copolymer (A) with a monofunctional epoxy compound (B) having a molecular weight of not more than 500.

In addition, the object the present invention intends to solve is also achieved by providing a resin composition comprising 1-99% by weight of a modified ethylene-vinyl alcohol copolymer (C) obtained by reacting an ethylene-vinyl alcohol copolymer (A) with a monofunctional epoxy compound (B) having a molecular weight of not more than 500 and 1-99% by weight of a thermoplastic resin (T1) other than (C).

Substances suitable as an EVOH (A) used as a raw material of the modified EVOH (C) to be mixed with the thermoplastic resin (T1) in the present invention are described below. An EVOH (A) suitably used as a raw material of the modified EVOH (C) used in the production of the resin composition resulting from a dynamic crosslinking treatment, which is another preferable embodiment of the present invention, will be described later.

As the EVOH (A) used as a raw material of the modified EVOH (C), preferred is one obtained by saponifying an ethylene-vinyl ester copolymer. A typical vinyl ester used in the production of EVOH is vinyl acetate. However, other fatty acid vinyl esters (e.g. vinyl propionate and vinyl pivalate) may also be employed. Unless the object of the present invention is adversely affected, it is also permitted to copolymerize other comonomers, for example, α-olefins such as propylene, butylene, isobutene, 4-methyl-1-pentene, 1-hexene and 1-octene; unsaturated carboxylic acids or esters thereof such as (meth)acrylic acid, methyl (meth)acrylate and ethyl (meth)acrylate; vinylsilane compounds such as vinyltrimethoxysilane; unsaturated sulfonic acids or salts thereof; alkylthiols; and vinylpyrrolidones such as N-vinylpyrrolidone.

When an EVOH resulting from copolymerization with a vinylsilane compound as a comonomer component is used as the EVOH (A), it is preferable that the EVOH contain that component copolymerized in an amount of 0.0002-0.2 mol %. When the EVOH contains a vinylsilane compound as a comonomer component in an amount within that range, the compatibility in melt viscosity between a substrate resin and the modified EVOH (C) may be improved in coextrusion molding, thereby enabling to produce homogeneous multilayer coextrusion film articles. In particular, when using a substrate resin with a high melt viscosity, it becomes easy to obtain homogeneous multilayer coextrusion film articles. The vinylsilane compound includes, for example, vinyltrimethoxysilane, vinyltriethoxysilane, vinyltri(β-methoxy-ethoxy)silane and γ-methacryloxypropylmethoxysilane. Above all, preferred are vinyltrimethoxysilane and vinyltriethoxysilane.

The ethylene content of the EVOH (A) for use in the present invention is preferably 5-55 mol %. From a viewpoint where the modified EVOH (C) of the present invention becomes superior in stretchability, flexibility and flexing resistance, the lower limit of the ethylene content of the EVOH (A) is more preferably not less than 10 mol %, still more preferably not less than 20 mol %, particularly preferably not less than 25 mol %, and more preferably not less than 31 mol %. On the other hand, from a viewpoint of the gas barrier property of the modified EVOH (C), the upper limit of the ethylene content of the EVOH (A) is more preferably not more than 50 mol %, still more preferably not more than 45 mol %. When the ethylene content is less than 5 mol %, the melt moldability may become poor, whereas when it exceeds 55 mol %, the gas barrier property may be insufficient. When the EVOH (A) for use in the invention comprises a mixture of two or more EVOHs of different ethylene contents, an average value calculated from the blend proportions in weight of the EVOHs shall be the ethylene content of the EVOH (A).

The degree of saponification of the vinyl ester moiety in the EVOH (A) for use in the present invention is preferably not less than 90%. The degree of saponification of the vinyl ester moiety is more preferably not less than 95%, still more preferably not less than 98%, and most suitably not less than 99%. A degree of saponification of less than 90% may result in an unsatisfactory thermostability which may result in easy formation of gels and pimples in molded articles, as well as in deterioration of gas barrier properties, especially gas barrier properties at high humidity. When the EVOH (A) comprises a mixture of two or more EVOHs of different degrees of saponification, an average value calculated from the blend proportions in weight of the EVOHs shall be the degree of saponification of the EVOH (A).

The ethylene content and the degree of saponification of the EVOH (A) can be determined by the nuclear magnetic resonance (NMR) analysis.

Furthermore, an EVOH containing a boron compound blended therein may also be employed as the EVOH (A) unless the object of the present invention is adversely affected. The boron compound includes, for example, boric acids, borates, salts of boric acids and boron hydrides. Concretely, the boric acids include orthoboric acid, metaboric acid, tetraboric acid, etc.; the borates include triethyl borate, trimethyl borate, etc.; the salts of boric acids include alkali metal salts and alkaline earth metal salts of various boric acids such as those mentioned above, as well as borax, etc. Of those compounds, preferred is orthoboric acid, which may be referred to as boric acid hereinafter.

When the EVOH (A) containing a boron compound blended therein is employed as the EVOH (A), its boron compound content is preferably 20-2000 ppm and more preferably 50-1000 ppm in terms of boron element. Blending the boron compound in an amount within such ranges can afford an EVOH (A) the torque variation of which is restrained during its melting by heating. However, if the boron compound content is smaller than 20 ppm, such an effect will be reduced, whereas if larger than 2000 ppm, a resulting EVOH will gel easily and it may be of poor moldability.

In addition, an EVOH (A) containing a phosphoric acid compound may be employed as the EVOH (A). This may successfully stabilize the qualities (e.g. coloration) of the resin. The phosphoric acid compound for use in the present invention is not restricted particularly. Various acids, such as phosphoric acid and phosphorous acid, and their salts may be used. The salts of phosphoric acids may be in any form of primary phosphate, secondary phosphate and tertiary phosphate, but primary phosphates are preferred. The cation species is not also specifically restricted. However, alkali metal salts are preferred. Of these salts, sodium dihydrogen phosphate and potassium dihydrogen phosphate are preferable. When an EVOH (A) containing a phosphoric acid compound is used, the content of the phosphoric acid compound is preferably not more than 200 ppm, more preferably 5-100 ppm, and most preferably 5-50 ppm in terms of phosphate radical.

However, when the EVOH (A) and a monofunctional epoxy compound (B) are reacted together in the presence of a catalyst (D) containing an ion of a metal which belongs to any of Groups 3-12 of the periodic table as described later, it is desirable that the content of the phosphoric acid compound be as small as possible because the salts of phosphoric acid will deactivate the catalyst. In this case, the content of the phosphoric acid compound in the EVOH (A) is preferably not more than 200 ppm, more preferably not more than 100 ppm, and most preferably not more than 50 ppm in terms of phosphate radical.

Moreover, as described later, the modified EVOH (C) is obtained preferably by carrying out a reaction between an EVOH (A) and a monofunctional epoxy compounds (B) having a molecular weight of not more than 500 in an extruder. During the reaction, the EVOH is exposed to a heating condition. If the EVOH (A) contains an excess amount of alkali metal salt and/or alkaline earth metal salt at this time, the resulting modified EVOH (C) may suffer from coloration. In addition, problems such as a decrease in viscosity of the modified EVOH (C) may arise, resulting in deterioration of moldability thereof. In addition, when a catalyst (D) is used as described later, it is desirable that the amounts of those salts to be added be as small as possible because they will deactivate the catalyst (D).

In order to avoid the above-mentioned problems, it is preferable that the content of the alkali metal salt contained in the EVOH (A) be not more than 50 ppm in terms of the metal elements. In a more preferable embodiment, the content of the alkali metal salt contained in the EVOH (A) is not more than 30 ppm, more preferably not more than 20 ppm in terms of the metal elements. From the same viewpoint, the content of the alkaline earth metal salt contained in the EVOH (A) is preferably not more than 20 ppm, more preferably not more than 10 ppm, and still more preferably not more than 5 ppm in terms of the metal elements. It is most preferable that substantially no alkaline earth metal salt be contained in the EVOH (A).

In addition, an EVOH containing a heat stabilizer, an antioxidant or the like incorporated therein may be used as the EVOH (A) unless the object of the present invention is adversely affected.

The EVOH (A) for use in the present invention preferably has an intrinsic viscosity of not less than 0.06 L/g. The intrinsic viscosity of the EVOH (A) is more preferably within the range of 0.07-0.2 L/g, still more preferably 0.075-0.15 L/g, and particularly preferably 0.080-0.12 L/g. If the intrinsic viscosity of the EVOH (A) is less than 0.06 L/g, the stretchability, flexibility and flexing resistance may deteriorate. On the other hand, if the intrinsic viscosity of the EVOH (A) exceeds 0.2 L/g, gels and pimples may form easily in a molded article comprising the modified EVOH (C).

A preferable melt flow rate (MFR) (measured at 190° C. under a load of 2160 g) of the EVOH (A) for use in the present invention is 0.1-30 g/10 min, more preferably 0.3-25 g/10 min, and still more preferably 0.5-20g/10 min. It is noted that when a melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C. Two or more EVOHs of different MFRs may be mixed and used.

The monofunctional epoxy compound (B) having a molecular weight of not more than 500 for use in the present invention must be a monofunctional epoxy compound. In other words, it must be an epoxy compound which has only one epoxy group in its molecule. When a polyfunctional epoxy compound of two or more functionalities is used, the effect of the present invention can not be obtained. It is to be noted that during the production of the monofunctional epoxy compound, a very small amount of polyfunctional epoxy compound may be contained. Unless the effect of the present invention is adversely affected, a monofunctional epoxy compound containing a very small amount of polyfunctional epoxy compound can be used as the monofunctional epoxy compound (B) having a molecular weight of not more than 500 in the present invention.

The monofunctional epoxy compound (B) having a molecular weight of not more than 500 for use in the present invention is not limited particularly. Specifically, compounds represented by the following formulae (III) through (IX) can be used suitably:

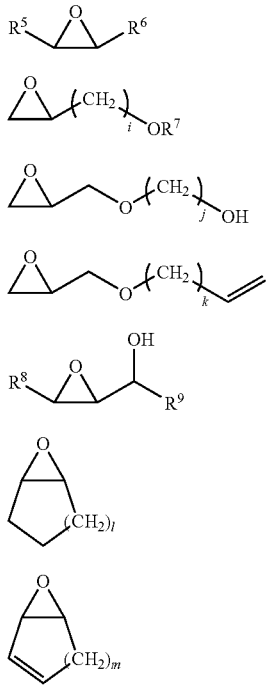

(III)
(IV)
(V)
(VI)
(VII)
(VIII)
(IX)

wherein $R^5$, $R^6$, $R^7$, $R^8$ and $R^9$ each represent a hydrogen atom, an aliphatic hydrocarbon group (e.g. alkyl group, alkenyl group or the like) having 1-10 carbon atoms, an alicyclic hydrocarbon group (e.g. cycloalkyl group, cycloalkenyl group or the like) having 3-10 carbon atoms, and an aromatic hydrocarbon group having 6-10 carbon atoms (e.g. phenyl group or the like); and i, j, k, l and m each denote an integer of 1-8.

Examples of the monofunctional epoxy compound (B) having a molecular weight of not more than 500 represented by formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 1-phenyl-1,2-epoxypentane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane and 6-phenyl-1,2-epoxyhexane.

Examples of the monofunctional epoxy compound (B) having a molecular weight of not more than 500 represented by the formula (IV) include methyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-3-octyloxypropane, 1,2-epoxy-3-phenoxypropane, 1,2-epoxy-3-benzyloxypropane, 1,2-epoxy-4-methoxybutane, 1,2-epoxy-4-ethoxybutane, 1,2-epoxy-4-propoxybutane, 1,2-epoxy-4-butoxybutane, 1,2-epoxy-4-pentyloxybutane, 1,2-epoxy-4-hexyloxybutane, 1,2-epoxy-4-heptyloxybutane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butyloxyheptane, 1,2-epoxy-8-methoxyheptane, 1,2-epoxy-8-ethoxyheptane, 1,2-epoxy-8-butoxyheptane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol and 10,11-epoxy-1-undecanol.

Examples of the monofunctional epoxy compound (B) having a molecular weight of not more than 500 represented by the formula (V) include ethylene glycol monoglycidyl ether, propanediol monoglycidyl ether, butanediol monoglycidyl ether, heptanediol monoglycidyl ether, hexanediol monoglycidyl ether, heptanediol monoglycidyl ether and octanediol monoglycidyl ether.

Examples of the monofunctional epoxy compound (B) having a molecular weight of not more than 500 represented by the formula (VI) include 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene and 8-(2,3-epoxy)propoxy-1-octene.

Examples of the monofunctional epoxy compound (B) having a molecular weight of not more than 500 represented by the formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2- hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol and 1,2-epoxy-3-decanol.

Examples of the monofunctional epoxy compound (B) having a molecular weight of not more than 500 represented by the formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane and 1,2-epoxycyclododecane.

Examples of the monofunctional epoxy compound (B) having a molecular weight of not more than 500 represented by the formula (IX) include 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene and 1,2-epoxycyclododecene.

Epoxy compounds having 2-8 carbon atoms are particularly preferred as the monofunctional epoxy compound (B) having a molecular weight of not more than 500 used for the present invention. The number of carbon atoms of the monofunctional epoxy compound (B) is preferably 2-6, more preferably 2-4 from the viewpoints of easiness of the handling of a compound and reactivity with EVOH (A). Moreover, it is preferable that the monofunctional epoxy compound (B) be a compound represented by the formula (III) or (IV). From the viewpoints of the reactivity with EVOH (A) and the gas barrier properties of a modified EVOH (C) to be obtained, 1,2-epoxybutane, 2,3-epoxybutane, epoxypropane, epoxyethane and glycidol are particularly preferable. Above all, epoxypropane and glycidol are preferable. In the applications in which sanitariness is required, such as food packaging, drink packaging and drug packaging, it is desirable to use 1,2-epoxybutane, 2,3-epoxybutane, epoxypropane and epoxyethane as the epoxy compound (B). Above all, epoxypropane is preferably employed.

A modified EVOH (C) is obtained by reacting the EVOH (A) and the monofunctional epoxy compound (B). A preferable mixing ratio of the EVOH (A) and the monofunctional epoxy compound (B) is 1-50 parts by weight of (B) to 100 parts by weight of (A), more preferably 2-40 parts by weight of (B) to 100 parts by weight of (A), and particularly preferably 5-35 parts by weight of (B) to 100 parts by weight of (A).

The method for producing the modified EVOH (C) by reacting the EVOH (A) with the monofunctional epoxy compound (B) having a molecular weight of not more than 500 is not limited particularly; examples of preferable methods include a production method in which the EVOH (A) and the monofunctional epoxy compound (B) are reacted together in a solution, and a production method in which the EVOH (A) and the monofunctional epoxy compound (B) are reacted together within an extruder.

In the production method using a solution reaction, the modified EVOH (C) is obtained by reacting the monofunctional epoxy compound (B) with a solution of the EVOH (A) in the presence of an acid catalyst or an alkali catalyst. In addition, the modified EVOH (C) can be produced also by dissolving the EVOH (A) and the monofunctional epoxy compound (B) in a reaction solvent and then performing a heat treatment. As the reaction solvent, preferable are polar aprotic solvents, which are good solvents of the EVOH (A), such as dimethylsulfoxide, dimethylformamide, dimethylacetamide and N-methylpyrrolidone.

The reaction catalyst includes acid catalysts such as p-toluenesulfonic acid, methanesulfonic acid, trifluoromethane sulfonic acid, sulfuric acid and boron trifluoride and alkali catalysts such as sodium hydroxide, potassium hydroxide, lithium hydroxide and sodium methoxide. Among these, acid catalysts are preferably employed. The amount of the catalyst is appropriately 0.0001-10 parts by weight to 100 parts by weight of the EVOH (A). The reaction temperature is appropriately within the range of room temperature to 150° C.

In the production method in which the EVOH (A) and the monofunctional epoxy compound (B) are reacted together within an extruder, there are no particular limitations for extruder to use, but it is preferable to react the EVOH (A) and the monofunctional epoxy compound (B) at a temperature of about 180-300° C. by use of a single screw extruder, twin screw extruder or a multi-screw extruder having two or more screws. As described below, during the reaction performed within an extruder, it is preferable to employ a relatively low melting temperature in the case of causing a catalyst (D) to be present. On the other hand, when no catalyst (D) is employed, a desirable temperature is about 200-300° C.

When a twin screw extruder or a multi-screw extruder having two or more screws is used, modification of the screw structure easily increases the pressure within the reaction section and makes it possible to perform a reaction between the EVOH (A) and the monofunctional epoxy compound (B) efficiently. In the case of using a single screw extruder, it is possible to increase the pressure within the reaction section by connecting two or more extruders and disposing a valve in a resin passageway between the extruders. Alternatively, the production may be carried out by connecting two or more twin screw extruders or multi-screw extruders having two or more screws.

In comparison of the production method by a solution reaction to that using a reaction within an extruder, the method using a solution reaction requires a solvent to dissolve the EVOH (A) and also requires recovery and removal of the solvent after the reaction. Therefore, such a method is to have a complicated process. In order to enhance the reactivity between the EVOH (A) and the monofunctional epoxy compound (B), it is desirable to hold the reaction system under heat and/or pressure conditions. In comparison to the solution reaction, it is easy, in the reaction within an extruder, to maintain the heat and/or pressure conditions of the reaction system. From such a viewpoint, the reaction within an extruder is of great merit.

Furthermore, when performing the reaction between the EVOH (A) and the monofunctional epoxy compound (B) by a solution reaction, it isn't necessarily easy to control the reaction and, therefore, the reaction may proceed excessively. In other words, although the modified EVOH (C) having the structural unit (I) is obtained as a result of the reaction between the EVOH (A) and the monofunctional epoxy compound (B), a product having a structural unit different than that specified in the present invention may be obtained through a further reaction of a hydroxyl group contained in the structural unit (I) with a monofunctional epoxy compound (B). Specifically, when the monofunctional epoxy compound (B) is ethylene oxide, the above-mentioned excessive proceeding of the reaction will result in the formation of an EVOH having a structural unit (II) shown below:

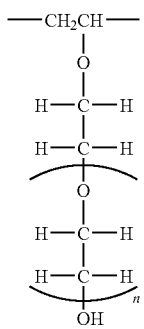

wherein n denotes a natural number of 1 or more.

The present inventors studied and made it clear that the increase in the ratio of the above-mentioned structural unit (II) contained which unit is different from the structural unit (I) specified in the present invention, results in the reduction in the gas barrier property of the modified EVOH (C) to be obtained. Furthermore, they found that the occurrence of such a side reaction could be restrained effectively when the reaction between the EVOH (A) and the monofunctional epoxy compound (B) is performed in an extruder. From such a viewpoint, preferred is the method in which the modified EVOH (C) is produced by performing the reaction between the EVOH (A) and the monofunctional epoxy compound (B) in an extruder.

In addition, in the method using a solution reaction, heating the reaction system may cause the vaporization of the monofunctional epoxy compound (B) to the outside of the system because the monofunctional epoxy compound (B) having a molecular weight of not more than 500 used in the present invention does not always have a high boiling point. However, it is possible to inhibit the vaporization of the monofunctional epoxy compound (B) to the outside of the system by reacting the EVOH (A) with the monofunctional epoxy compound (B) in an extruder. In particular, when the monofunctional epoxy compound (B) is supplied under pressure during its addition to the extruder, it is possible to increase the reactivity between the EVOH (A) and the monofunctional epoxy compound (B) and, at the same time, to inhibit remarkably the vaporization of the monofunctional epoxy compound (B) to the outside of the system.

The method of mixing the EVOH (A) and the monofunctional epoxy compound (B) during the reaction in an extruder is not limited particularly. Preferable examples include a method in which the monofunctional epoxy compound (B) is sprayed to the EVOH (A) before being fed to the extruder and a method in which the EVOH (A) is fed to the extruder and is brought into contact with the monofunctional epoxy compound (B) in the extruder. Among these, preferred is the method in which the EVOH (A) is fed into an extruder and then it is brought into contact with the monofunctional epoxy compound (B) within the extruder from a viewpoint that the vaporization to the monofunctional epoxy compound (B) to the outside of the system can be inhibited. In addition, the position where the monofunctional epoxy compound (B) is added to the extruder is optional. However, from the viewpoint of reactivity between the EVOH (A) with the epoxy compound (B), it is desirable to add the monofunctional epoxy compound (B) to molten EVOH (A).

A production method using a reaction between the EVOH (A) and the monofunctional epoxy compound (B) within an extruder which is recommended by the present inventor comprises (1) a step of melting the EVOH (A), (2) a step of adding the monofunctional epoxy compound (B) and (3) a step of removing unreacted monofunctional epoxy compound (B) through a vent or the like. From the viewpoint of performing a reaction smoothly, it is preferable to remove moisture and oxygen from the system. For this purpose, moisture and oxygen may be removed through a vent or the like before the addition of the monofunctional epoxy compound (B) to the extruder.

In addition, in the step of adding the monofunctional epoxy compound (B), it is preferable to supply the monofunctional epoxy compound (B) under pressure as described previously. At this time, if the pressure is not high enough, the reactivity may decrease and problems such as variation in discharge rate will arise. A necessary pressure varies greatly depending upon the boiling point of the monofunctional epoxy compound (B) and the extrusion temperature, but it is, in usual, preferably within the range of 0.5-30 MPa and more preferably within the range of 1-20 MPa.

In the production method of the present invention, it is preferable to melt-knead the EVOH (A) and the monofunctional epoxy compound (B) in an extruder in the presence of a catalyst (D) containing an ion of a metal which belongs to Groups 3-12 of the periodic table. To cause the catalyst (D) containing an ion of a metal which belongs to Groups 3-12 of the periodic table to be present makes it possible to react the EVOH (A) with the monofunctional epoxy compound (B) efficiently even if the melt-kneading is carried out at a lower temperature. In other words, it is possible to obtain a highly modified EVOH (C) easily through a melt-kneading at a relatively low temperature. The EVOH is a resin the melt stability of which at high temperatures is not very good. Therefore, from the viewpoint that the degradation of a resin can be prevented, it is desirable that melt kneading can be carried out at such a low temperature. When the EVOH (A) and the monofunctional epoxy compound (B) are reacted together without using the catalyst (D), a resulting modified EVOH (C) tends to have an MFR lower than that of the starting EVOH (A). However, when using the catalyst (D), the MFR does not change very much.

The catalyst (D) used in the present invention contains an ion of a metal which belongs to Groups 3-12 of the periodic table. What is the most important for the metal ion used for the catalyst (D) is to have a moderate Lewis acidity. From this standpoint, ions of metals which belong to Groups 3-12 of the periodic table are used. Among these, ions of metals which belong to Group 3 or 12 of the periodic table are preferable due to their moderate Lewis acidities; ions of zinc, yttrium and gadolinium are more preferable. Above all, a catalyst (D) containing a zinc ion is most suitable because it has an extremely high catalytic activity and a modified EVOH (C) superior in thermostability would be obtained.

The ion of a metal which belongs to Groups 3-12 of the periodic table is added preferably in an amount of 0.1-20 μmol/g, in terms of molar number of metal ion based on the weight of the EVOH (A). When a too large amount of ion is added, the EVOH may gelate during its melt-kneading. Therefore, the amount of the ion is more preferably not more than 10 μmol/g. On the other hand, when a too small amount of ion is added, no satisfactory effect of the addition of the catalyst (D) may be obtained. Therefore, the amount of the ion is more preferably not less than 0.5 μmol/g. It is to be noted that an appropriate amount of the ion of a metal which belongs to Groups 3-12 of the periodic table may vary depending upon the kind of the metal to be employed and the kind of the anion described later and, therefore, should be adjusted appropriately in view of these factors.

The anion species in the catalyst (D) containing an ion of a metal which belongs to Groups 3-12 of the periodic table is not limited particularly, but it is desirable for the catalyst to contain a monovalent anion the conjugate acid of which is a strong acid as strong as or stronger than sulfuric acid. This is because an anion the conjugate acid of which is a strong acid is usually hard to react with a monofunctional epoxy compound (B) because of its low nucleophilicity and the anion can prevent the loss of catalytic activity caused by consumption of anionic species through a nucleophilic reaction. In addition, that is also because when having such an anion as a counter ion, the catalyst (D) has an improved Lewis acidity and, therefore, its catalytic activity is improved.

Examples of the monovalent anion the conjugate acid of which is a strong acid as strong as or stronger than sulfuric acid include sulfonate ions such as methanesulfonate ion, ethanesulfonate ion, trifluoromethanesulfonate ion, benzenesulfonate ion and toluenesulfonate ion; halide ion such as chloride ion, bromide ion and iodide ion; perchlorate ion; anions having four or more fluorine atoms such as tetrafluoroborate ion ($BF_4^-$), hexafluorophosphate ion ($PF_6^-$), hexafluoroarsinate ion ($AsF_6^-$) and hexafluoroantimonate ion; ions of tetraphenyl borate derivatives such as tetrakis (pentafluorophenyl) borate ion; and ions of carborane derivatives as tetrakis(3,5-bis(trifluoromethyl)phenyl) borate, bis (undecahydride-7,8-dicarbaundecaborate) cobalt (III) ion, bis(undecahydride-7,8-dicarbaundecaborate) iron (III) ion.

When using a catalyst (D) including an anionic species such as, for example, hexafluorophosphate or tetrafluoroborate of the anionic species mentioned above, the anion species itself is thermostable and has a very low nucleophilicity. However, the anion species may react with a hydroxy group in an EVOH to form hydrogen fluoride, giving a bad influence to the thermostability of a resin. In addition, carborane derivative ions of cobalt or the like do not react with EVOH and their anionic species themselves are thermostable. However, they are very expensive.

A sulfonate ion is preferable as the anionic species of the catalyst (D) because it does not react with an EVOH, it is thermostable as an anionic species itself and also it is appropriately priced. Examples of suitable sulfonic acid ions include methanesulfonate ion, trifluoromethanesulfonate ion, benzenesulfonate ion and toluenesulfonate ion. Trifluoromethanesulfonate ion is most suitable.

The following formula (X) shows a presumed mechanism of the reaction between the EVOH (A) and the monofunctional epoxy compound (B) when a zinc ion and a trifluoromethanesulfonate ion are used, respectively, as the cationic species and the anionic species of the catalyst (D).

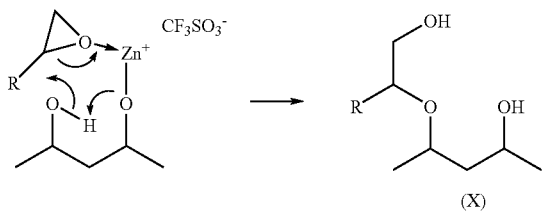

(X)

Briefly speaking, it is presumed that the oxygen atom of the epoxy group of the monofunctional epoxy compound (B) coordinates to the zinc ion bonding to the hydroxyl group of the EVOH in the form of a metal alkoxide and, via a 6 membered-ring transition state, the epoxy ring opens. Because the conjugate acid of a trifluoromethanesulfonate ion, which is the counter ion of a zinc ion in the transition state, is a strong acid, the Lewis acidity of the zinc ion becomes high and the catalytic activity improves. On the other hand, because the trifluoromethanesulfonate ion itself which is present as a counter ion never reacts with a hydroxyl group of the EVOH or an epoxy group of the monofunctional epoxy compound (B) and is thermostable. Therefore, the ring-opening reaction proceeds smoothly without causing any side reaction.

As described above, it is preferable that the catalyst (D) used in the present invention contain a monovalent anion the conjugate acid of which is a strong acid as strong as or stronger than sulfuric acid, but it is not necessary that all the anionic species in the catalyst (D) be same anionic species. It is rather desirable that the catalyst (D) also contains an anion the conjugate acid of which is a weak acid. If the reaction mechanism represented by the formula (X) is true, when an EVOH reacts with a catalyst (D) to form a metal alkoxide, one of the anions is liberated as a conjugate acid into the system. If this is a strong acid, it may react with a monofunctional epoxy compound (B) and at the same time it may give an adverse effect to the melt stability of the EVOH.

Examples of the anion the conjugate ion of which is a weak acid include alkyl anion, aryl anion, alkoxide, aryloxy anion, carboxylate and acetylacetonato and its derivative. Above all, alkoxide, carboxylate and acetylacetonato and its derivative are suitably employed.

It is desirable that the molar number of the anion the conjugate acid of which is as strong as or stronger than sulfuric acid be 0.2-1.5 times the molar number of the metal ions in the catalyst(D). When the above-mentioned molar ratio is less than 0.2 times, the catalytic activity may be insufficient. The molar ratio is more preferably not less than 0.3 times, and still more preferably not less than 0.4 times. On the other hand, when the above-mentioned molar ratio exceeds 1.5 times, the EVOH may gelate. The molar ratio is more preferably not more than 1.2 times. The molar ratio is most preferably 1 time. In addition, when the EVOH (A), which is a raw material, contains an alkali metal salt such as sodium acetate, the molar number of the anion the conjugate acid of which is as strong as or stronger than sulfuric acid may be increased by an amount corresponding to the anion neutralized and consumed by the salt.

The method for preparing the catalyst (D) is not limited particularly, but an example of a preferable method is a method in which a compound of a metal which belongs to Groups 3-12 of the periodic table is dissolved or dispersed in a solvent and then a strong acid (e.g. sulfonic acid) the conjugate acid of which is as strong as or stronger than sulfuric acid is added to the resulting solution or suspension. Examples of the compound of a metal which belongs to Group 3-12 of the periodic table to be used as a raw material include alkyl metal, aryl metal, metal alkoxide, metal aryloxide, metal carboxylate and metal acetylacetonato. When the strong acid is added to the solution or suspension of the compound of a metal which belongs to Group 3-12 of the periodic table, it is preferable that the strong acid be added in small portions. The thus obtained solution containing the catalyst (D) may be introduced directly to an extruder.

As the solvent in which the compound of the metal which belongs to Group 3-12 of the periodic table is dissolved or dispersed, organic solvents, especially ether solvents, are preferable. This is because it is hard to react even at a temperature in the extruder and at the same time they have a good solubility of the metal compound. Examples of the ether solvents include dimethyl ether, diethyl ether, tetrahydrofuran, dioxane, 1,2-dimethoxyethane, diethoxyethane, diethylene glycol dimethyl ether and trienthylene glycol dimethyl ether. As a solvent to be used, preferred are those which are superior in solubility of metal compounds, are of relatively low boiling point, and can be removed almost completely through a vent formed in an extruder. From this standpoint, diethylene glycol dimethyl ether, 1,2-dimethoxyethane and tetrahydrofuran are particularly preferable.

In addition, in the above-mentioned method for the preparation of the catalyst (D), an ester of a strong acid (e.g. sulfonate) may be used instead of the strong acid to add. The ester of a strong acid may cause no reaction with the metal compound at room temperature because it generally has a reactivity lower than that of the strong acid itself. However, when it is introduced into an extruder of high temperature which is held at about 200° C., a catalyst (D) having an activity in the extruder can be formed.

As a method for preparing the catalyst (D), the alternate method described below may be adopted. First, a water-soluble compound of a metal which belongs to Group 3-12 of the periodic table and a strong acid (e.g. sulfonic acid) the conjugate acid of which is as strong as or stronger than sulfuric acid are mixed in an aqueous solution to form a aqueous catalyst solution. At this time, the aqueous solution may contain an appropriate amount of alcohol. An EVOH (A) containing the catalyst (D) can be obtained by contacting the resulting aqueous catalyst solution into contact with the EVOH (A) and then drying. Specifically, a preferable method is one in which pellets of the EVOH (A), especially porous hydrous pellets, are immersed in the aqueous catalyst solution. In this case, the dry pellets thus obtained may be introduced into an extruder.

When a catalyst (D) is used, it is preferable to set the temperature in the extruder to 180-250° C. In this case, the catalyst (D) is present during the reaction between the EVOH (A) and the monofunctional epoxy compound (B). The reaction between the EVOH (A) and the monofunctional epoxy compound (B) can, therefore, be allowed to proceed efficiently even if melt-kneading is carried out at a relatively low temperature. When the temperature exceeds 250° C., EVOH may deteriorate; the temperature is more preferably not higher than 240° C. On the other hand, when the temperature is lower than 180° C., the reaction between the EVOH (A) and the monofunctional epoxy compound (B) may not proceed sufficiently; the temperature is more preferably not lower than 190° C.

The method for causing the catalyst (D) to be present when reacting the EVOH (A) and the monofunctional epoxy compound (B) together is not limited particularly. A preferable method is one in which a solution of the catalyst (D) is prepared and then the solution is added to an extruder. The method for preparing the solution of the catalyst (D) is the same as that mentioned previously. According to this method, can be achieved a productivity higher than that achieved by the alternate method described later. In addition, because the catalyst (D) can be supplied steadily, it is possible to stabilize the quality of products. The position where the solution of the catalyst (D) is introduced into an extruder is not limited particularly. However, it is preferable to add the solution at a position where the EVOH (A) is in a completely molten state because the solution can be mixed uniformly. In particular, it is desirable to add the solution at or about the position where the monofunctional epoxy compound (B) is added. This is because when the catalyst (D) and the monofunctional epoxy compound (B) are added almost simultaneously, the degradation of the EVOH (A) resulting from the influence of the catalyst (D), which is a Lewis acid, can be kept to a minimum and a sufficient reaction time can be secured. Therefore, the most suitable way is to prepare a mixed liquid of a solution of the catalyst (D) and the monofunctional epoxy compound (B) in advance, followed by adding it at a single position into an extruder.

An alternative method for causing the catalyst (D) to be present during the melt-kneading may be a method in which hydrous pellets of the EVOH (A) are immersed in a solution of the catalyst (D) and then dried. What were described previously about the alternative method for the preparation of the catalyst (D) are also applicable to this method. In this case, the resulting dry pellets are to be introduced into the extruder from a hopper. However, the problem is that an expensive catalyst is disposed as waste liquid and this is liable to cause an increase in cost. Another alternative method is a method comprising impregnating dried pellets with a catalyst in a liquid state or mixing dried pellets with a catalyst in a solid state and then, as required, drying the pellets. A problem with this method is that the increase of the number of steps is liable to result in the increase in cost. In addition, it is not necessarily easy to blend the catalyst uniformly. In any of the above alternative methods, the EVOH (A) may deteriorate in the course of melt-kneading under conditions where no monofunctional epoxy compound (B) is present and only the catalyst (D), which is a Lewis acid, is present.

As described above, to melt-knead the EVOH (A) and the monofunctional epoxy compound (B) together in the presence of the catalyst (D) in an extruder is desirable. It is more desirable to add a catalyst deactivator (E) after the melt-kneading and then carry out additional melt-kneading. When the catalyst (D) is not deactivated, the thermostability of a modified EVOH (C) to be obtained may be poor and some problems may arise in the use thereof depending upon the application.

The catalyst deactivator (E) to be used may be any one which is able to reduce the activity of the catalyst (D) as a Lewis acid and the kind thereof is not restricted particularly. Alkali metal salts are suitably employed. To deactivate a catalyst (D) containing a monovalent anion the conjugate acid of which is a strong acid as strong as or stronger than sulfuric acid, it is required to use an alkali metal salt containing an anion of an acid which is weaker than the conjugate acid of the monovalent anion. This is because when doing so, a counter ion of the ion of a metal belonging to Group 3-12 of the periodic table which constitutes the catalyst (D) is replaced with an ion of a weaker acid, resulting in reduction in the Lewis acidity of the catalyst (D). The cationic species of the alkali metal salt to be used for the catalyst deactivator (E) is not limited particularly and suitable examples thereof include sodium salts, potassium salts and lithium salts. The anionic species is not also limited particularly and suitable examples thereof include carboxylates, phosphates and phosphonates.

Even if a salt such as sodium acetate and dipotassium hydrogenphosphate is used as the catalyst deactivator (E), the heat stability is improved considerably but may be insufficient depending upon the application. This is assumed to be because the ion of the metal which belongs to Group 3-12 of the periodic table still has some activity as a Lewis acid and, therefore, can serve as a catalyst with respect to decomposition and gelation of a modified EVOH (C). As a method for further improving this problem, it is desirable to add a chelating agent which strongly coordinates to an ion of a metal which belongs to Group 3-12 of the periodic table. Such a chelating agent can coordinate to the metal ion strongly and, as a result, it can eliminate the Lewis acidity of the ion almost completely and can provide a modified EVOH (C) superior in thermostability. In addition, when the chelating agent is an alkali metal salt, it can neutralize a strong acid which is a conjugate acid of an anion contained in the catalyst (D) as described previously.

Examples of suitable chelating agents to be used as the catalyst deactivator (E) include hydroxycarboxylates, aminocarboxylates and aminophosphonates. Specific examples of the hydroxycarboxylates include disodium citrate, disodium tartrate and disodium malate. Examples of the aminocarboxylates include trisodium nitrilotriacetate, disodium ethylenediaminetetraacetate, trisodium ethylenediaminetetraacetate, tripotassium ethylenediaminetetraacetate, trisodium diethylenetriaminepentaacetate, trisodium 1,2-cyclohexanediaminetetraacetate, monosodium ethylenediaminediacetate, monosodium N-(hydroxyethyl) iminodiacetate. Examples of the aminophosphonates include hexasodium nitrilotrismethylenephosphonate and octasodium ethylenediaminetetra(methylenephosphonate). Above all, polyaminopolycarboxylic acids are suitable and alkali metal salts of ethylenediaminetetraacetic acid are most suitable in view of performance and cost. A presumed reaction mechanism in the case of using trisodium ethylenediaminetetraacetate is shown in the following formula (XI).

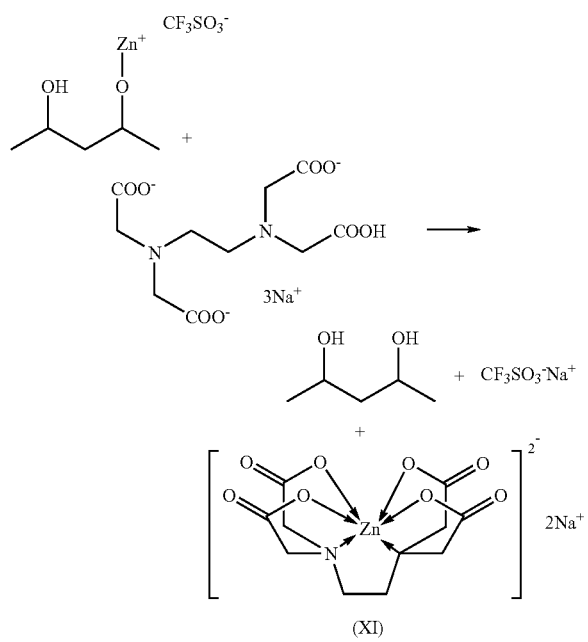

(XI)

The amount of the catalyst deactivator (E) to be added is not limited particularly and may be adjusted appropriately depending upon the kind of the metal ion contained in the catalyst (D) and the number of coordination sites of the chelating agent. It is suitable to set the amount so that the ratio (E/D) of the molar number of the catalyst deactivator (E) to the molar number of the metal ion contained in the catalyst (D) may become 0.2-10. When the ratio (E/D) is less than 0.2, the catalyst (D) may not be deactivated sufficiently; the ratio is preferably not less than 0.5, more preferably not less than 1. On the other hand, when the ratio (E/D) exceeds 10, a resulting modified EVOH (C) may get colored and the production cost may increase; the ratio is preferably not more than 5, more preferably not more than 3.

The method for introducing the catalyst deactivator (E) into an extruder is not limited particularly, but in order to disperse it uniformly, it is preferable to introduce the catalyst deactivator (E) in the form of a solution thereof to a modified EVOH (C) in a molten state. Taking the solubility of the catalyst deactivator (E), the influence to the peripheral environment, etc. into consideration, it is preferable to add it in the form of an aqueous solution.

The position where the catalyst deactivator (E) is added to the extruder may be any position where the EVOH (A) and the monofunctional epoxy compound (B) have been melt-kneaded in the presence of the catalyst (D). However, it is preferable to add the catalyst deactivator (E) after melt-kneading the ethylene-vinyl alcohol copolymer (A) and the monofunctional epoxy compound (B) in the presence of the catalyst (D) and then removing unreacted monofunctional epoxy compound (B). This is because in the case of adding the catalyst deactivator (E) in the form of an aqueous solution as described previously, addition of the catalyst deactivator (E) before the removal of unreacted monofunctional epoxy compound (B) will result in incorporation of water into a monofunctional epoxy compound (B) which is removed through a vent or the like and used after recovery, causing separation operations to require much labor. In addition, it is also preferable to remove water through a vent or the like after addition of the aqueous solution of the catalyst deactivator (E).

In the production method of the present invention, an example of a suitable production process using a catalyst deactivator (E) is a process comprising the steps of:
(1) melting EVOH (A);
(2) adding a mixture of a monofunctional epoxy compound (B) and a catalyst (D);
(3) removing unreacted monofunctional epoxy compound (B);
(4) adding an aqueous solution of a catalyst deactivator (E); and
(5) removing water under reduced pressure.

It is preferable that the modified EVOH (C) contain 0.1-20 μmol/g of an ion of a metal which belongs to any of Groups 3-12 of the periodic table. The metal ion is one which may be contained as a catalyst residue formed when a catalyst (D) was used in the above-mentioned production method. The kinds of preferable metal ions are the same as those recited in the description previously made for the catalyst (D). The content of the ion is more preferably not less than 0.5 μmol/g, and more preferably not more than 10 μmol/g.

In addition, the modified EVOH (C) preferably contains a sulfonic acid ion. The sulfonic acid ion is one which may be contained as a catalyst residue formed when a catalyst (D) was used in the above-mentioned production method. The kinds of preferable sulfonic acid ions are the same as those recited in the description previously made for the catalyst (D). The content of the sulfonic acid ion is preferably 0.1-20 μmol/g, and more preferably not less than 0.5 μmol/g and, in addition, more preferably not more than 10 μmol/g.

Furthermore, the content of an alkali metal ion in the modified EVOH (C) is preferably 1-50 times (in molar ratio) the content of the sulfonic acid ion. The alkali metal ion is one which may be contained as a residue formed when the catalyst deactivator (E) was used in the above-mentioned production method and may be contained due to derivation from the starting EVOH (A). If the content of the alkali metal ion is less than 1 time the content of the sulfonic acid ion, the deactivation of the catalyst (D) has not been performed sufficiently in the production process and, in such an occasion, some problem in thermostability of the modified EVOH (C) may arise. Therefore, the content of the alkali metal ion is more preferably at least 2 times. On the other hand, if the content of the alkali metal ion exceeds 50 times the content of the sulfonic acid ion, the modified EVOH (C) may get colored. Therefore, the content of the alkali metal ion is preferably 30 times at most.

To the modified EVOH (C), at least one substance selected from the group consisting of alkali metal salts, alkaline earth metal salts, carboxylic acids and phosphoric acid compounds may be added after the formation of the modified EVOH (C) through the reaction between the EVOH (A) and the epoxy compound (B). Generally, for the purpose of improvement in various properties of EVOH, e.g. improvement in adhesiveness and control of coloration, at least one substance selected from the group consisting of alkali metal salts, alkaline earth metal salts, carboxylic acids and phosphoric acid compounds is often added to the EVOH as required. However, as described previously, the addition of various compounds shown above may cause coloration, reduction in viscosity and the like during the reaction between the EVOH (A) and the epoxy compounds (B) in an extruder. Therefore, it is preferable to add at least one substance selected from the group consisting of alkali metal salts, alkaline earth metal salts, carboxylic acids and phosphoric acid compounds to a modified EVOH (C) resulting from a reaction between an EVOH (A) and an epoxy compound (B) followed by removal of the remaining epoxy compound (B) through a vent. When this addition method is adopted, the modified EVOH (C) is obtained without occurrence of problems such as coloration and reduction in viscosity.

The thus obtained modified EVOH (C) preferably has a melting point of 160° C. or lower. This can minimize the melting point differences between the modified EVOH (C) and resins having lower melting points such as the polyolefin resin (G) and can lower the molding temperature employed when the resin composition is melt molded. The melting point of the modified EVOH (C) is preferably 150° C. or lower and more preferably 140° C. or lower.

The resin composition of the present invention is a resin composition comprising from 1 to 99% by weight of the modified EVOH (C) and from 1 to 99% by weight of a thermoplastic resin (T1) other than (C).

The thermoplastic resin (T1) which is incorporated to the modified EVOH (C) is not particularly restricted. Examples thereof include EVOH not having the aforementioned structural unit (I), polyolefin, polyamide, polyester, polystyrene, polyvinyl chloride, poly(meth)acrylic ester, polyvinylidene chloride, polyacetal, polycarbonate, polyvinyl acetate, polyurethane and polyacrylonitrile. Various kinds of copolymers may also be employed. Specifically, various types of thermoplastic resins which are provided as examples of the thermoplastic resin (T2), described later, which is to be laminated to the resin composition of the present invention, can be employed.

The thermoplastic resin (T1) preferably has an oxygen transmission rate measured at 20° C. and 65% RH of 1000 cc·20 μm/m$^2$·day·atm or lower. This means that the volume of the oxygen which permeates a day through a 20 μm thick film having an area of 1 m$^2$ under conditions where there is an oxygen pressure difference of 1 atm is 1000 ml or less when being measured at 20° C. at 65% RH. Incorporation of a modified EVOH (C) can improve the secondary processability, fatigue resistance and interlayer adhesiveness of the thermoplastic resin (T1), which inherently has good barrier properties. Examples of thermoplastic resin (T1) having an oxygen transmission rate measured at 20° C. at 65% RH of 1000 cc·20 μm/m$^2$·day·atm or less include EVOH free of the structural unit (I), polyamide, polyester, polyvinyl chloride, polyvinylidene chloride and polyacrylonitrile. The oxygen transmission rate is more preferably not more than 100 cc·20 μm/m$^2$·day·atm and still more preferably not more than 10 cc·20 μm/m$^2$·day·atm.

In particular, it is preferable to use an EVOH (F) having an ethylene content of 5-55 mol % and being free of the structural unit (I) as the thermoplastic resin (T1). This is because it can greatly improve the secondary processability, fatigue resistance, stretchability and interlayer adhesiveness without seriously deteriorating the barrier properties or transparency which are inherent to EVOH (F). Although the same resins as the aforementioned EVOH (A) used as a raw material for the modified EVOH (C) can be used as EVOH (F), they are appropriately selected depending on the composition of a modified EVOH (C) to be incorporated and the application of a resulting resin composition.

For example, from the viewpoint of heat stability, the ethylene content of the EVOH (F) is preferably not less than 20 mol %, more preferably not less than 25 mol %, and still more preferably not less than 27 mol %. From the viewpoint of gas barrier properties, the ethylene content of the EVOH (F) is preferably not more than 50 mol %, more preferably not more than 45 mol %, and still more preferably not more than 38 mol %. The degree of saponification of the EVOH (F) is preferably 99% or more, and more preferably 99.5% or more.

The combination of the ethylene contents of the modified EVOH (C) and EVOH (F) is adjusted in according to the application and purpose of the resin composition. For example, the difference between the ethylene content of the modified EVOH (C) and that of the EVOH (F) is preferably from 2 to 30 mol %. The difference is more preferably 5 mol % or more, but not more than 20 mol %.

In the case where there is a difference between the ethylene contents of the modified EVOH (C) and EVOH (F), when the ethylene content of the modified EVOH (C) is greater than that of the EVOH (F), the modified EVOH (C), which is excellent in flexibility, can be incorporated into the EVOH (F), which is of good gas barrier properties, while the characteristics of the EVOH (F) are maintained. As a result, a resin composition can be provided which is excellent in secondary processabilities such as thermoformability and stretchability, or flexibility or flexing resistance, and gas barrier properties as well. This embodiment is one of the particularly useful embodiments. Conversely, in some cases, it is preferable that the ethylene content of the modified EVOH (C) be smaller than that of the EVOH (F). In such cases, an advantage may be enjoyed when molding is intended to be performed at low temperature because the melting points of both resins are close.

On the other hand, in some cases, it is preferable that the difference between the ethylene contents of the modified EVOH (C) and EVOH (F) be small. In such cases, the difference is preferably not more than 2 mol %. It is preferable to use a modified EVOH (C) and an EVOH (F) which have substantially the same ethylene content. When rendering the difference between the ethylene contents of the modified EVOH (C) and EVOH (F) small, it is possible to obtain a resin composition excellent in barrier properties and transparency while improving flexibility, secondary processabilities, fatigue resistance or interlayer adhesiveness.

The resin composition comprising the modified EVOH (C) and the EVOH (F) is one comprising from 1 to 99% by weight of the modified EVOH (C) and from 1 to 99% by weight of the EVOH (F). It is preferable that the resin composition comprise from 1 to 50% by weight of the modified EVOH (C) and from 50 to 99% by weight of the EVOH (F). In other words, it is preferable that the unmodified EVOH (F) be a major ingredient and the modified EVOH (C) be a minor ingredient.

This can impart flexibility and secondary processability to the resin composition without causing a serious damage in gas barrier properties which the EVOH (F) inherently has. In addition, this is also economically beneficial because the modified EVOH (C) requires much production cost than the unmodified EVOH (F). The content of the modified EVOH (C) is more preferably not less than 5% by weight, and still more preferably not less than 10% by weight. At this time, the content of the EVOH (F) is more preferably not more than 95% by weight, and still more preferably not more than 90% by weight. On the other hand, the content of the modified EVOH (C) is more preferably not more than 40% by weight, and still more preferably not more than 30% by weight. At this time, the content of the EVOH (F) is more preferably not less than 60% by weight, and still more preferably not less than 70% by weight.

In addition, it is also preferable to use a polyolefin (G) as the thermoplastic resin (T1). The polyolefin (G) is of great usefulness because of its superior mechanical properties, superior processabilities and low cost, but has low barrier properties. Incorporation of the modified EVOH (C) to the polyolefin (G) can improve the barrier properties of the polyolefin (G) without causing serious damages in impact resistance, fatigue resistance, processabilities and the like.

The polyolefin (G) used herein is not particularly restricted. Specifically, it is possible to employ various kinds of polyolefins which are provided as examples of the thermoplastic resin (T2), described later, which is to be laminated to the resin composition of the present invention. These polyolefins (G) may be used singly or as a mixture of two or more of them. Among them, polypropylene, polyethylene, ethylene-propylene copolymer and ethylene-vinyl acetate copolymer are preferably employed. In particular, polyethylene and polypropylene are preferably employed.

The resin composition comprising the modified EVOH (C) and the polyolefin (G) is one comprising from 1 to 99% by weight of the modified EVOH (C) and from 1 to 99% by weight of the polyolefin (G). It is preferable that the resin composition comprise from 10 to 60% by weight of the modified EVOH (C) and from 40 to 90% by weight of the polyolefin (G). In other words, the resin composition containing the polyolefin (G) in an amount of not less than half thereof is preferable. This can impart barrier properties to the resin composition without causing serious damages in mechanical performance and processability which the polyolefin (G) inherently has. That is an economically advantageous incorporation proportion because the modified EVOH (C) requires a remarkably higher production cost than the polyolefin (G). The content of the modified EVOH (C) is more preferably not less than 20% by weight. At this time, the content of the polyolefin (G) is not more than 80% by weight. On the other hand, the content of the modified EVOH (C) is more preferably not more than 50% by weight. At this time, the content of the polyolefin (G) is more preferably not less than 50% by weight.

In addition, it is also preferable to employ a compatibilizer (H) as the thermoplastic resin (T1). In such an occasion, a thermoplastic resin other than the modified EVOH (C) and the compatibilizer (H) is contained simultaneously and the compatibilizer (H) is to improve the compatibility of the thermoplastic resin with the modified EVOH (C). The thermoplastic resin the compatibility of which with the EVOH (C) is improved by the compatibilizer (H) is not particularly restricted, but polyolefin (G), polystyrene and the like are preferable. In a particularly preferable case, the thermoplastic resin the compatibility of which is improved is a polyolefin (G). In other words, preferred is a resin composition in which a thermoplastic resin (T1) comprises the polyolefin (G) and the compatibilizer (H).

Examples of a compatibilizer (H) preferably employed include polyolefin, polystyrene, diene polymer or copolymers thereof having a carboxyl group (including acid anhydride group), a boron-containing substituent, an epoxy group, an amino group and the like. Among them, those having a carboxyl group or a boron-containing substituent are preferred, examples of which include those resulting from modification with maleic anhydride, those resulting from copolymerization with (meth)acrylic acid, and those resulting from introduction of boronic acid (ester) group. Polyolefin is preferable as a base polymer to which these substituents are introduced. Particularly preferred are polyethylene and polypropylene. Moreover, block copolymers of styrene and diene or hydrogenated products thereof are also examples of preferable base polymers. Specific examples include carboxylic acid-modified polyolefin and boronic acid-modified polyolefin.

The amount of the compatibilizer (H) incorporated is preferably from 1 to 20% by weight, and more preferably 20% by weight or more but not more than 10% by weight.

Use of two or more kinds of resins which are preferable as the thermoplastic resin (T1) sometimes may result in a synergistic effect thereof. For example, a resin composition comprising the modified EVOH (C), the EVOH (F) and the polyolefin (G) has characteristics similar to those of the aforementioned resin composition comprising the modified EVOH (C) and the polyolefin (G), but has an advantage in its lower production cost. It is also preferable to incorporate the compatibilizer (H) in addition to the above three resins.

Various additives may be incorporated to the resin composition of the present invention as required. Examples of such additives include antioxidants, plasticizers, heat stabilizers, ultraviolet absorbers, antistatic agents, lubricants, colorants, fillers or other high molecular compound. These may be blended unless the effect of the present invention is adversely affected. The following are specific examples of such additives.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), etc.

Ultraviolet absorber: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, etc.

Plasticizer: dimethyl phthalate, diethyl phthalate, dioctyl phthalate, wax, liquid paraffin, phosphates, etc.

Antistatic agent: pentaerythritol monostearate, sorbitan monopalmitate, sulfated polyolefins, polyethylene oxide, Carbowax, etc.

Lubricant: ethylene bisstearoamide, butyl stearate, etc.

Colorant: carbon black, phthalocyanine, quinacridon, indoline, azo pigments, red oxide, etc.

Filler: glass fiber, asbestos, vallastonite, calcium silicate, etc.

In addition, to the resin composition of the present invention, one kind or two or more kinds of hydrotalcite compound, hindered phenol type heat stabilizer, hindered amine type heat stabilizer, metal salt of higher fatty acid (e.g. calcium stearate and magnesium stearate) may be added to an extent such that the effect of the present invention is not adversely affected (namely, 0.01-1% by weight) in order to improve melt stability or the like.

The method for blending the modified EVOH (C) and the thermoplastic resin (T1) in order to obtain the resin composition of the present invention is not particularly limited. For example, resin pellets may be dry blended and then subjected directly to melt molding. More preferably, resin pellets may be melt kneaded in a Banbury mixer, a single or twin screw extruder or the like, pelletized and then subjected to melt molding. For preventing deterioration of resin from proceeding during the blending operation, it is desirable to extrude the resin at low temperature while sealing the hopper inlet with nitrogen. In addition, it is preferable to make the dispersion of the resins fine and homogeneous by use of an extruder with a high kneading intensity because the barrier properties and transparency are improved and the generation or admixture of gels or pimples is prevented.

The kneading is a significant operation in the present invention because each resin ingredient is dispersed well in the resin composition. The most suitable kneading machines for obtaining a composition having a high dispersion include continuous kneading machines such as continuous intensive mixers and kneading-type twin screw extruders (co-rotating or counter-rotating). However, batch type kneading machines such as Banbury mixers, intensive mixers and pressure kneaders are also available. As another type of continuous kneading machine, those utilizing a rotary disc having a grinding mechanism such as a stone mill, for example, a KCK kneading extruder manufactured by KCK Co., Ltd. may be employed. Kneading machines commonly employed include those comprising a single screw extruder having a kneading section (e.g. Dulmage, CTM, etc.), or simple kneading machines such as Brabender mixers.

Above all, the most suitable for the purpose of the present invention are continuous intensive mixers. Commercially available models thereof include FCM from Farrel Corp., CIM from The Japan Steel Works, Ltd., and KCM, LCM and ACM from Kobe Steel, Ltd. In practical production, it is preferable to employ an apparatus in which a single screw extruder is arranged under such a kneading machine, where kneading and extrusion pelletization are performed simultaneously. A twin screw kneading extruder containing a kneading disc or a rotor for kneading, e.g. TEX from The Japan Steel Works, Ltd., ZSK from Werner & Pfleiderer Co., TEM from Toshiba Machine Co., Ltd. and PCM from Ikegai Ltd. are employed for the purpose of kneading in the invention.

In use of such continuous kneading machines, the shapes of rotors and discs play important roles. In particular, a gap between a mixing chamber and a rotor chip or a disc chip, the gap being called a chip clearance, is important; neither a too narrow clearance nor a too wide clearance results in a resin composition having a satisfactory dispersion. The optimum chip clearance ranges from 1 to 5 mm.

The range of the rotation speed of the rotor of a kneading machine is from 100 to 1200 rpm, preferably from 150 to 1000 rpm, and still more preferably from 200 to 800 rpm. The inner diameter (D) of the chamber of a kneading machine is 30 mm or more, and preferably ranges from 50 to 400 mm. The ratio of the chamber length (L) of the kneading machine to the inner diameter, L/D, is preferably from 4 to 30. Only one kneading machine may be employed. Alternatively, two or more kneading machines connected together may be used. The longer the kneading time, the better the result. However, in view of prevention of resin deterioration or economical considerations, the kneading time ranges from 10 to 600 seconds, preferably from 15 to 200 seconds, and optimally from 15 to 150 seconds.

The resin composition of the present invention preferably has an oxygen transmission rate at 20° C. and 65% RH of not more than 100 cc·20 μm/m²·day·atm. The upper limit of the oxygen transmission rate is more preferably not more than 50 cc·20 μm/m²·day·atm, still more preferably not more than 20 cc·20 μm/m²·day·atm, and particularly preferably not more than 10 cc·20 μm/m²·day·atm. The resin composition of the present invention is suitably used as a barrier material and is particularly suitably used as a container for food packaging because it is a resin composition having such a low oxygen transmission rate.

In addition, the resin composition of the present invention preferably has a carbon dioxide gas transmission rate at 20° C. and 65% RH of not more than 500 cc·20 μm/m²·day·atm. The upper limit of the carbon dioxide gas transmission rate is more preferably not more than 200 cc·20 μm/m²·day·atm, still more preferably not more than 100 cc·20 μm/m²·day·atm, and particularly preferably not more than 50 cc·20 μm/m²·day·atm. The resin composition of the present invention is suitably used as a barrier material and is particularly suitably used as a container for carbonated beverage packaging because it is a resin composition having such a low carbon dioxide gas transmission rate.

The resin composition of the present invention, in particular, a resin composition comprising a modified EVOH (C) and an unmodified EVOH (F) preferably has a Young's modulus in a tensile strength/elongation measurement at 23° C. and 50% RH of not more than 200 kgf/mm², and more preferably not more than 180 kgf/mm². Use of such a resin composition makes molded articles flexible which are obtained therefrom such as sheets and films. In addition, the use makes these articles possible to be secondarily processed well during the stretching or thermoforming thereof. In usual, the Young's modulus is not less than 50 kgf/mm².

It is preferable that the resin composition of the present invention, in particular, a resin composition comprising a modified EVOH (C) and an unmodified EVOH (F) have a tensile strength at yield of from 4.0 to 10.0 kgf/mm² and a tensile elongation at break of 200% or more in a tensile strength/elongation measurement at 23° C. and 50% RH because molded articles obtained therefrom such as sheets and films demonstrate good moldability when being stretched or thermoformed. In usual, the tensile elongation at break is not more than 500%.

The resin composition comprising the modified EVOH (C) and the thermoplastic resin (T1) has been described above. A resin composition obtainable through a dynamic crosslinking treatment, which is another embodiment of the present invention, is described below. The description made for the above-described resin composition composed of the modified EVOH (C) and the thermoplastic resin (T1) is applied, unless otherwise described.

The resin composition obtainable through a dynamic crosslinking treatment, which is another embodiment of the present invention, is also called a thermoplastic polymer composition because the composition has a thermoplasticity though crosslinked grains are dispersed therein. In other words, it is a resin composition obtainable by mixing 100 parts by weight of a modified EVOH (C) containing 0.3-40 mol % of the following structural unit (I), 5-900 parts by weight of an elastomer (J) having a functional group capable of reacting with the following crosslinking agent (K) and 0.05-30 parts by weight, based on 100 parts by weight of the elastomer (J), of a crosslinking agent (K) under melt condition and performing a dynamic crosslinking treatment. In the following description, this resin composition is sometimes referred to as a dynamically crosslinked resin composition.

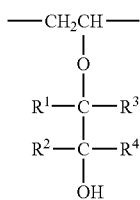

[In the formula, $R^1$, $R^2$, $R^3$ and $R^4$ denote a hydrogen atom, an aliphatic hydrocarbon group having 1-10 carbon atoms (e.g. alkyl and alkenyl), an alicyclic hydrocarbon group having 3-10 carbon atoms (e.g. cycloalkyl and cycloalkenyl) or an aromatic hydrocarbon group having 6-10 carbon atoms (e.g. phenyl). $R^1$, $R^2$, $R^3$ and $R^4$ may be the same group or may differ. $R^3$ and $R^4$ may be combined together, unless both $R^3$ and $R^4$ are hydrogen atoms. $R^1$, $R^2$, $R^3$ and $R^4$ may have other groups than described above, e.g. a hydroxyl group, a carboxyl group and a halogen atom.]

Almost the same Modified EVOHs as those employed in the previously described resin composition with a thermoplastic resin (T1) are available as the modified EVOH (C) used in the dynamically crosslinked resin composition. However, the preferably available modified EVOH (C) differs from those in the previously described resin composition with respect to EVOH (A) used as a raw material thereof. This corresponds to the differences in production method and applications of the resin compositions. Accordingly, the composition of the preferable modified EVOH (C) is also different because of the difference in EVOH (A) as a raw material.

The EVOH (A), which is a raw material of the modified EVOH (C) used for the dynamically crosslinked resin composition is a copolymer comprising mainly ethylene units (—$CH_2CH_2$—) and vinyl alcohol units (—$CH_2$—CH(OH)—). Examples thereof include known ones such as those used for molding applications. It should be noted that the ethylene unit content in the EVOH (A) is preferably from 10 to 99 mol %, more preferably from 20 to 75 mol %, still more preferably from 25 to 60 mol %, and particularly preferably from 25 to 50 mol % from the viewpoints of the degrees of barrier properties to gas, organic liquid and the like or the degree of molding processability. The EVOH (A) is, as described later, typically a saponified product of an ethylene-fatty acid vinyl ester copolymer. When the EVOH (A) is a saponified product of an ethylene-fatty acid vinyl ester copolymer, the degree of saponification of the fatty acid vinyl ester units is preferably not less than 50 mol %, more preferably not less than 90 mol %, still more preferably not less than 95 mol %, and particularly preferably not less than 98 mol % from the viewpoint of the degrees of barrier properties and heat stability of a resulting EVOH (A). The melt flow rate (measured under conditions including a temperature of 210° C. and a load of 2.16 kg by the method provided in ASTM D1238) of the EVOH (A) is preferably from 0.1 to 100 g/10 minutes, more preferably from 0.5 to 50 g/10 minutes, and particularly preferably from 1 to 20 g/10 minutes from the viewpoint of the degree of molding processability. The limiting viscosity of the EVOH (A) in a mixed solvent composed of 85% by weight of phenol and 15% by weight of water at a temperature of 30° C. is preferably from 0.1 to 5 dl/g and more preferably from 0.2 to 2 dl/g.

The EVOH (A) may have, in addition to ethylene units and vinyl alcohol units, other constitutional units if in a small amount (preferably up to 10 mol % based on the whole constitutional units). Examples of the "other constitutional units" include units derived from a-olefins such as propylene, isobutylene, 4-methylpentene-1,1-hexene and 1-octene; carboxylic acid vinyl esters such as vinyl acetate, vinyl propionate, vinyl versatate, vinyl pivalate, vinyl valerate, vinyl caprate and vinyl benzoate; unsaturated carboxylic acids and their derivatives (e.g. salts, esters, nitrites, amides and anhydrides) such as itaconic acid, methacrylic acid, acrylic acid and maleic anhydride; vinyl silane compounds such as vinyl trimethoxysilane; unsaturated sulfonic acids and their salts; N-methylpyrrolidone; etc. The EVOH (A) may have a functional group such as an alkylthio group at its terminal.

The method for producing the EVOH (A) is not particularly limited. For example, the EVOH (A) can be produced by preparing an ethylene-fatty acid vinyl ester copolymer according to a known method and then saponifying the resulting copolymer. The ethylene-fatty acid vinyl ester can be obtained, for example, polymerizing monomers mainly comprising ethylene and fatty acid vinyl ester using a radical polymerization initiator such as benzoyl peroxide and azobisisobutyronitrile under pressure in an organic solvent such as methanol, t-butyl alcohol and dimethyl sulfoxide. Examples of available fatty acid vinyl ester include vinyl acetate, vinyl propionate, vinyl versatate, vinyl pivalate, vinyl valerate and vinyl caprate. Above all, vinyl acetate is preferable. For the saponification of the ethylene-fatty acid vinyl ester copolymer, an acid catalyst or an alkali catalyst may be employed.

The elastomer (J) having a functional group capable of reacting with a crosslinking agent (K) used in the dynamically crosslinked resin composition is not particularly limited if it has in the molecule a functional group capable of reacting with the crosslinking agent (K). For example, available are thermoplastic elastomers such as styrene-based elastomer, olefin-based elastomer, synthetic rubber and natural rubber.

Examples of the styrene-based elastomer include a block copolymer comprising mainly vinyl aromatic polymer blocks and conjugated diene polymer blocks. Examples of the vinyl aromatic monomer used for the formation of the vinyl aromatic polymer blocks constituting the block copolymer include vinyl aromatic compounds such as styrene, α-methylstyrene, β-methylstyrene, o-, m-, p-methylstyrene, t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene, vinylanthracene, indene and acetonaphthylene. The vinyl aromatic polymer blocks may have structural units comprised only of one kind of vinyl aromatic compound or, alternatively, the blocks may have structural units comprised of two or more kinds of vinyl aromatic compounds. The vinyl aromatic polymer blocks are preferably comprised mainly of structural units derived from styrene.

The vinyl aromatic polymer block may optionally have, in addition to structural units derived from vinyl aromatic compounds, structural units derived from other copolymerizable monomers, the proportion of which is preferably not more than 30% by weight and more preferably not more than 10% by weight based on the weight of the vinyl aromatic polymer block.

Examples of the other copolymerizable monomer units include units of monomers, e.g. 1-butene, pentene, hexene, butadiene, isoprene and methyl vinyl ether.

Examples of the conjugate diene compound used for the formation of the conjugate diene polymer block in the block copolymer comprised mainly of a vinyl aromatic polymer block and a conjugated diene polymer block include isoprene, butadiene, hexadiene, 2,3-dimethyl-1,3-butadiene and 1,3-pentadiene. The conjugated diene polymer block may be constituted of either one of these conjugated diene compounds or two or more of them. When the conjugated diene polymer block includes structural units derived from two or more kinds of conjugated diene compounds, the linking mode thereof may be any of random, tapered, partially block and combinations of two or more foregoing modes.

Above all, the conjugated diene polymer block is preferably a polyisoprene block made of monomer units comprised mainly of isoprene units or a hydrogenated polyisoprene block resulting from hydrogenation of part or all of the unsaturated bonds of the polyisoprene block; a polybutadiene block made up of monomer units comprised mainly of butadiene units or a hydrogenated polybutadiene block resulting from hydrogenation of part or all of the unsaturated bonds of the polybutadiene block; or an isoprene/butadiene copolymer block made up of monomer units comprised mainly of isoprene units and butadiene units or a hydrogenated isoprene/butadiene copolymer block resulting from hydrogenation of part or all of the unsaturated bonds of the isoprene/butadiene copolymer block.

In the above-mentioned polyisoprene block, which is capable of becoming a constitutional block of the conjugated diene polymer block, the units derived from isoprene comprise, before hydrogenation of the block, at least one group selected from the group consisting of a 2-methyl-2-butene-1,4-diyl group [—$CH_2$—C($CH_3$)=CH—$CH_2$—; 1,4-bonding isoprene unit], an isopropenylethylene group [—CH(C($CH_3$)=$CH_2$)—$CH_2$—; 3,4-bonding isoprene unit] and a 1-methyl-1-vinylethylene group [—C($CH_3$)(CH=$CH_2$)—$CH_2$—; 1,2-bonding isoprene group]. The proportion of each kind of units is not particularly limited.

In the above-mentioned polybutadiene block, which is capable of becoming a constitutional block of the conjugated diene polymer block, before hydrogenation of the block, it is preferable that from 70 to 20 mol %, especially from 65 to 40 mol %, of the butadiene units be 2-butene-1,4-diyl groups (—$CH_2$—CH=CH—$CH_2$—; 1,4-bonding butadine unit) and from 30 to 80 mol %, especially from 35 to 60 mol % of the butadiene units be vinylethylene groups [—CH(CH=$CH_2$)—$CH_2$—; 1,2-bonding butadine unit].

In the isoprene/butadiene copolymer block which can be the constitutional block of the conjugated diene polymer block, the units derived from isoprene comprise, before hydrogenation, at least one kind of group selected from the group consisting of a 2-methyl-2-butene-1,4-diyl group, an isopropenylethylene group and a 1-methyl-1-vinylethylene group and the units derived from butadiene comprise a 2-butene-1,4-diyl group and/or a vinylethylene group. The proportion of each unit is not particularly restricted. In the isoprene/butadiene copolymer block, the arrangement of the isoprene units and the butadiene units may be any of a random mode, a block mode or a tapered block mode. The molar ratio of the isoprene units to the butadiene units is preferably from 1:9 to 9:1, more preferably, from 3:7 to 7:3.

In the block copolymer comprised mainly of vinyl aromatic polymer blocks and conjugated diene polymer blocks, it is preferable that part or all of the unsaturated double bonds in the conjugated diene polymer block be added with hydrogen (henceforth referred to "hydrogenated") from the viewpoint of achieving excellent heat resistance and weather resistance of the resin composition. In this case, the hydrogenation rate of the conjugated diene polymer block is preferably 50 mol % or more, more preferably 60 mol % or more and further preferably 80 mol % or more.

In the block copolymer, the molecular weights of the vinyl aromatic polymer block and the conjugated diene polymer block are not particularly limited. However, in a state before hydrogenation, the number average molecular weight of the vinyl aromatic polymer block preferably ranges from 2,500 to 75,000 and the number average molecular weight of the conjugated diene polymer block preferably ranges from 10,000 to 150,000, from the viewpoints of mechanical properties and formability of the resin composition. It is noted that the number average molecular weight of an elastomer (J) referred to in this specification indicates a value calculated from a standard polystyrene calibration curve by means of gel permeation chromatography (GPC).

Although not particularly limited, the block copolymer can be produced by ion polymerization such as anion polymerization and cation polymerization, single site polymerization, radical polymerization, and the like.

In the case of anion polymerization, the block copolymer can be manufactured by polymerizing a vinyl aromatic compound, a conjugated diene compound, a monomer having a functional group reactable with a crosslinking agent and the like sequentially using an alkyl lithium compound or the like as a polymerization initiator in an inert organic solvent such as n-hexane and cyclohexane to obtain a diblock or triblock copolymer having a desired molecular structure and a desired molecular weight, and then stopping the polymerization by addition of an active hydrogen compound such as alcohol, carboxylic acid, water and the like.

Examples of olefin-based elastomer available as elastomer (J) in the present invention which has a functional group capable of reacting with the crosslinking agent (K) include ethylene-propylene copolymer (EPR), ethylene-propylene-nonconjugated diene copolymer (EPDM) and ethylene-α-olefin copolymer obtained by use of a metallocene-based polymerization catalyst.

Examples of synthetic rubber available as elastomer (J) include polybutadiene, polyisoprene, polybutyl rubber, styrene-butadiene random copolymer, styrene-isoprene random copolymer, acrylonitrile-butadiene copolymer and polychloroprene. Moreover, natural rubber may be employed as elastomer (J). The double bonds contained in the above-mentioned synthetic rubber or natural rubber may be hydrogenated.

Of those mentioned above, styrene-based elastomers are preferable and block copolymer comprised mainly of vinyl aromatic polymer blocks and conjugated diene polymer blocks are more preferable as elastomer (J) because a resulting resin composition is excellent in flexibility and it is easy to introduce thereto a functional group capable of reacting with the crosslinking agent (K).

Examples of the functional group contained in the elastomer (J) which is capable of reacting with the crosslinking agent (K) include hydroxyl group (e.g. primary hydroxyl group (—$CH_2OH$)), amino group, alkylamino group, epoxy group, ether group (e.g. alkoxyl group), carboxyl group, ester group (e.g. alkoxycarbonyl group and acyloxyl group), amide group (e.g. carbamoyl group, alkylcarbamoyl group and acylamino group), bromo group, group with a dicarboxylic anhydride structure (e.g. maleic anhydride group), boronic acid group, boron-containing group capable of being converted into a boronic acid group in the presence of water, and double bond (e.g. vinyl group). It is preferable that the functional group capable of reacting with the crosslinking agent (K) be selected appropriately depending on the combination with the crosslinking agent (K) so that the functional group demonstrates a higher reactivity to the crosslinking agent (K) used than that demonstrated by a secondary hydroxyl group (>CH—OH) the modified EVOH (C) has or a primary hydroxyl group (—CH$_2$OH) derived from the structure of a monofunctional epoxy compound employed for modification.

The above-mentioned boronic acid group which the elastomer (J) can contain in the present invention is a group represented by the following formula (a):

(a)

Examples of the boron-containing group which is capable of being converted into a boronic acid group in the presence of water and which the elastomer (J) can contain (henceforth, the group being abbreviated to a boron-containing group) include any boron-containing group capable of being converted into a boronic acid group when the elastomer (J) is hydrolized in water, a mixed liquid composed of water and an organic solvent (e.g. toluene, xylene and acetone), or a mixed liquid composed of a 5% aqueous boronic acid solution and the aforementioned organic acid under conditions including a reaction time of from 10 minutes to 2 hours and a reaction temperature of from room temperature to 150° C. Typical examples include a boronic acid ester group represented by the following formula (b), a boronic anhydride group represented by the following formula (c) and a group composed of a boronic acid salt represented by the following formula (d):

(b)

[In the formula, each of X and Y represents a hydrogen atom, an aliphatic hydrocarbon group (e.g. a linear or branched alkyl or alkenyl group having from 1 to 20 carbon atoms), an alicyclic hydrocarbon group (e.g. cycloalkyl group and cycloalkenyl group) or an aromatic hydrocarbon group (e.g. phenyl group and biphenyl group), provided that X and Y may be the same or may differ; X and Y may be combined together; a case where both X and Y are hydrogen atoms is excluded.]

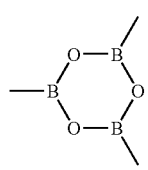
(c)

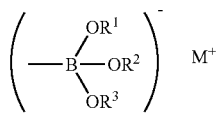
(d)

[In the formula, each of $R^1$, $R^2$ and $R^3$ represents a hydrogen atom, aliphatic hydrocarbon group, alicyclic hydrocarbon group and aromatic hydrocarbon group the same as those represented by X and Y; $R^1$, $R^2$ and $R^3$ may represent the same group or different groups; and M represents alkali metal or alkaline earth metal.] [Moreover, each of X, Y, $R^1$, $R^2$ and $R^3$ may have another group such as a hydroxyl group, carboxyl group and a halogen atom.]

Specific examples of the boronic acid ester group, boronic anhydride group and boronic acid base group represented by formula (b) to (d) include boronic ester groups such as boronic acid dimethyl ester group, boronic acid diethyl ester group, boronic acid dibutyl ester group, boronic acid dicyclohexyl group, boronic acid ethylene glycol ester group, boronic acid propylene glycol ester group (boronic acid 1,2-propanediol ester group and boronic acid 1,3-propanediol ester group), boronic acid neopentyl ester group, boronic acid catechol ester group, boronic acid glycerin ester group, boronic acid trimethylolethane ester group, boronic acid trimethylolethane ester group and boronic acid diethanolamine ester group; boronic anhydride groups; a group of alkali metal salt of boronic acid, and a group of alkaline earth metal salt of boronic acid.

Of the foregoing functional groups, preferred are groups having a dicarboxylic anhydride structure such as maleic anhydride group or boronic acid ester groups such as boronic acid ethylene glycol ester group, boronic acid propylene glycol ester group, boronic acid trimethylene glycol ester group, boronic acid 1,3-butanediol ester group and boronic acid glycerin ester group because they are very reactive and they can control the degree of crosslinking of elastomer (J) easily.

The average content of the functional groups is preferably not less than 0.5 groups, more preferably from 1 to 50 groups and still more preferably within a range of from 3 to 30 groups in one molecule of elastomer (J). The method for introducing a functional group into elastomer (J) is not particularly restricted. Examples of the method include (1) a method which uses a copolymerizable monomer having a functional group capable of reacting with a crosslinking agent (K), a polymerization initiator, a chain transfer agent, a terminator or the like during the polymerization of the monomer for forming the elastomer (J); (2) a method in which a copolymerizable monomer which forms a functional group capable of reacting with a crosslinking agent (K) through a reaction such as leaving, hydrolysis or the like of a protective group, polymerization initiator, chain transfer agent, terminator or the like is used during the polymerization of monomers for forming elastomer (J) and, after the polymerization, a functional group is formed; and (3) a method using a polymer reaction in which an oxidizing agent or the like is allowed to react on a polymer free of functional group under melt condition to introduce a functional group. When the functional group which the elastomer (J) has is a group having a dicarboxylic anhydride structure or a boronic acid ester group, the functional group can be introduced by the above-mentioned method (3) including an appropriate selection of a compound (oxidizing agent) having a structure corresponding to the functional group.

The functional group may be introduced to any position in the elastomer (J), e.g. a position in a main chain, short branch chain or terminal of a molecular chain.

The crosslinking agent (K) for use in the present invention is not particularly restricted if it is a compound with two or more functionalities which is capable of reacting with a functional group of the elastomer (J) and which is liquid or solid but does not decompose the modified EVOH (C) at a melt kneading temperature in the production of a resin composition.

For example, when the functional group of the elastomer (J) is a group having a dicarboxylic anhydride structure, diamines such as 1,9-nonanediamine and 2-methyl-1,8-octanediamine and diols such as 1,6-hexanediol and 1,9-nonanediol are suitable employed as the crosslinking agent (K).

On the other hand, when the functional group of the elastomer (J) is a boronic acid ester group, compounds having four or more hydroxyl groups in one molecule, such as pentaerythritol, inositol, glucose, heptose and lactose, are suitably employed as the crosslinking agent (K).

The blending proportions of the above-mentioned components (C), (J) and (K) in the dynamically crosslinked resin composition of the present invention are 100 parts by mass of the modified EVOH (C), from 5 to 900 parts by mass, preferably from 40 to 800 parts by mass, based on 100 parts by mass of the modified EVOH (C), of the elastomer (J) having a functional group capable of reacting with the crosslinking agent (K), and from 0.05 to 30 parts by mass, preferably from 0.2 to 20 parts by mass, based on 100 parts by mass of the elastomer (J), of the crosslinking agent (K).

When the compounding amount of the elastomer (J) based on 100 parts by mass of the modified EVOH (C) is less than 5 parts by mass, a resulting resin composition should have a poor flexibility. On the other hand, when over 900 parts by mass, a resulting resin composition should have poor gas barrier properties.

When the compounding amount of the elastomer (K) based on 100 parts by mass of the elastomer (J) is less than 0.05 part by mass, a resulting resin composition should have poor gas barrier properties. When over 30 parts by mass, a molded article comprised of the composition should have a poor surface appearance.

The dynamically crosslinked resin composition of the present invention can be prepared by dynamically crosslinking the above-mentioned components (C), (J) and (K) under melt conditions. This process includes melt kneading the modified EVOH (C) and the elastomer (J) to form fine and homogeneous dispersion and further forming crosslinkages between functional groups of the elastomer (J) by action of the crosslinking agent (K).

For the melt kneading, any melt kneading device capable of mixing the components homogeneously may be employed. Examples of such a melt kneading device include a single screw extruder, a twin screw extruder, a kneader and a Banbury mixer. Above all, a twin screw extruder, which generates great shear force during kneading and can be driven continuously, is preferably employed.

The dynamically crosslinked resin composition of the present invention can be produced concretely through a process described below. That is, the modified EVOH (C) and the elastomer (J) are mixed and introduced into a hopper of an extruder. Some part of the modified EVOH (C) may be added at the middle of the extruder. The crosslinking agent (K) may be added either at the beginning together with the modified EVOH (C) and the elastomer (J) or at the middle of the extruder. Moreover, the components may be melt kneaded stepwise by use of two or more extruders.

The melt kneading temperature is preferably from about 160 to about 280° C., and more preferably from 200° C. to 240° C. The melt kneading time is preferably from 30 seconds to 5 minutes.

The resin composition obtained in the manner described above has a structure such that elastomer (J) crosslinked by crosslinking agent (K) is dispersed in a matrix of modified EVOH (C). The diameter of the dispersion particles of the crosslinked elastomer (J) is preferably from 0.1 to 30 μm more preferably from 0.1 to 20 μm.

Moreover, the dynamically crosslinked resin composition of the present invention may contain paraffin oil for having an enhanced flexibility. In general, oils used as process oil or the like are mixtures of components having aromatic rings such as a benzene ring and a naphthene ring and paraffin components (chain hydrocarbon) and the like. Oil such that the number of the carbon atoms constituting paraffin chains accounts for at least 50% by mass of all carbon atoms in the oil is called "paraffin oil". As the paraffin oil used in the dynamically crosslinked resin composition of the present invention, any oil which is called "paraffin oil" can be used. Oils such that the content of the component having aromatic rings is up to 5% by mass are preferably employed.

The compounding amount of the paraffin oil is preferably up to 200 parts by mass based on 100 parts by mass of the elastomer (J). The kinematic viscosity of the paraffin oil at 40° C. is preferably from $20 \times 10^{-6}$ to $800 \times 10^{-6}$ m$^2$/sec, more preferably from $50 \times 10^{-6}$ to $600 \times 10^6$ m$^2$/sec. The pour point is preferably from −40 to 0° C., more from −30 to 0° C. The flash point is preferably from 200 to 400° C., more from 250 to 350° C. In the production of the resin composition, the paraffin oil may be melt kneaded after the elastomer (J) is impregnated therewith or may be added from the middle of melt kneading. Moreover, both the impregnation and the midway addition may be used together.

The dynamically crosslinked resin composition of the present invention may contain, in addition to the above-mentioned components, other polymers as required unless the effect of the present invention is substantially adversely affected. Examples of the polymers which can be incorporated include resins such as polyethylene, polypropylene, polyamide and polyester.

Moreover, the dynamically crosslinked resin composition of the present invention may, as required, contain inorganic filler, dye and pigment, etc. for the purposes of reinforcement, extending, coloring, and the like. Examples of inorganic filler, dye and pigment include calcium carbonate, talc, clay, synthetic silicon, titanium oxide, carbon black and barium sulfate. The amount of the inorganic filler, dye and pigment incorporated is preferably within a range such that the barrier properties of the resin composition to gases and organic liquids are not damaged. In general, the amount is preferably up to 50 parts by mass based on 100 parts by mass of the modified EVOH (C) and elastomer (J) in total.

The dynamic crosslinked resin composition of the present invention may contain, in addition to the above-mentioned components, one or two or more other components such as crosslinking aid, lubricant, light stabilizer, flame retardant, antistatic agent, silicone oil, anti-blocking agent, ultraviolet absorber, antioxidant, mold lubricant, foaming agent and perfume, as required.

The applications of the resin composition of the present invention will be described below. In the description on the applications, the resin composition encompasses both embodiments of a resin composition comprising a modified EVOH (C) and a thermoplastic resin (T1) and a resin composition resulting from dynamic crosslinking treatment. However, unless otherwise stated, the resin composition is suitable for the applications of the resin composition comprising the modified EVOH (C) and the thermoplastic resin (T1).

The resin composition of the present invention is molded into various molded articles such as films, sheets, containers, pipes, hoses and fibers suitably by melt molding. These molded articles may be crushed and molded again for the purpose of recycling. In addition, films, sheets, fibers and the like may be drawn uniaxially or biaxially. As a method of melt molding, available are extrusion molding, melt spinning, injection molding, injection blow molding and the like. The melting temperature of the resin composition may vary depending upon the melting point or the like of the thermoplastic resin (T1) and the modified EVOH (C), but it is preferably about 120-270° C.

The resin composition of the present invention is preferably used in the form of an extruded article. The method for producing the extruded article is not limited particularly, but preferable examples thereof include film extrusion cast molding, sheet extrusion cast molding, pipe extrusion molding, hose extrusion molding, profile extrusion molding, extrusion blow molding and inflation extrusion molding. Extrusion molded articles obtained by such molding methods can be subjected to secondary processing such as uniaxial or biaxial stretching and thermoforming.

As described previously, conventional EVOHs are superior in transparency and gas barrier properties, but they have drawbacks of being poor in stretchability, flexibility and flexing resistance. On this account EVOH is often required to be laminated with other resin or resins when the EVOH is used for an application where the impact resistance is required, such as a bottle, and for an application where the flexibility and the flexing resistance are required, such as a film and a flexible packaging container. However, the resin composition of the present invention can be used in the form of a monolayer molded article even in an application where the impact resistance and/or the flexing resistance is required because it shows superior performances with respect to barrier properties, transparency, stretchability, flexibility and flexing resistance. From a viewpoint of such expansion of applications, the present invention is of great significance.

From a viewpoint of effective utilization of the resin composition of the present invention which is superior in barrier properties, impact resistance, flexibility and flexing resistance, a film, an extrusion blow molded article (suitably, a bottle, etc.), a flexible packaging container (suitably, a flexible tube, a flexible pouch, etc.), a pipe, a hose and a profile extruded article are desirable as a monolayer molded article of the resin composition. In addition, a oriented film is particularly preferable as the above-mentioned film from a viewpoint where the characteristic of the resin composition of the present invention of being superior in stretchability can be used. Above all, preferred is a oriented film stretched at least uniaxially two times or more. Furthermore, it is preferable to use the oriented film as a heat shrinkable film.

Of these monolayer molded articles, for applications in which a high degree of barrier property is required even the wall is thin or for applications in which transparency is required, it is preferable to use an EVOH (F) free of the aforementioned structural unit (I) as the thermoplastic resin (T1) to be incorporated to the modified EVOH (C). Examples of such applications include oriented films, thermoformable films, heat shrinkable films and flexible packaging containers. On the other hand, in molded articles which are not required for transparency, thick-walled molded articles, molded articles which are not required for high barrier properties, etc., it is preferable to use other thermoplastic resin, especially polyolefin (G) as the thermoplastic resin (T1) incorporated to modified EVOH (C). Examples of such applications include thick-walled injection molded articles, complex-shaped injection molded articles, monolayer pipes or hoses, and monolayer extrusion blow molded containers. Examples of the thick-walled injection molded articles include caps for food packaging containers, and fillers and joints of fuel tanks. Examples of the complex-shaped injection molded articles include pouring openings with a pull ring. Moreover, in the case where the resin composition is one recycled from molded articles, it is preferable to use a polyolefin (G) as thermoplastic resin (T1). This is because use of modified EVOH (C) improves the recyclability.

For improvement in barrier property and shape retainability at high temperature and high humidity and for improvement in shrinkability when used in a heat shrinkable film application or the like, the resin composition of the present invention may be provided with a crosslinking structure to an extent where the effect of the present invention is not adversely affected. There are no particular limitations for the method for forming the crosslinking structure and a preferable method is one comprising irradiation with energy rays. Examples of the energy rays include ionizing radiation such as ultraviolet rays, electron beam, X-rays, α-rays and γ-rays. Electron beam is preferred.

An example of the method of irradiation with electron beam include a method in which after a primary processing by extrusion molding, a resulting molded article is introduced to an electron beam irradiation apparatus and then the article is irradiated with electron beam. The amount of the electron beam applied is not limited particularly, but it is preferably within the range of 1-40 Mrad. If the amount of the electron beam applied is less than 1 Mrad, crosslinking will become hard to proceed. On the other hand, if the amount of the electron beam applied exceeds 40 Mrad, deterioration of the molded article becomes easy to proceed. It is more preferable that the amount of the electron beam be within the range of 2-30 Mrad.

For a molded article which requires to be subjected to secondary forming such as stretching (uniaxially or biaxially) and thermoforming after the primary molding, it is preferable to perform the electron beam irradiation between the primary molding and the secondary forming. In the above-mentioned crosslink treatment, as an electron beam which can be used, those with an energy of 150-10000 KeV released from various kinds of electron beam accelerators such as Cockcroft-Watson type, Van der Graaff type, resonance transformer type, insulated core transformer type, linear accelerator, dynamitron type and high frequency cyclotron are used, but the electron beam used is not limited thereto.

In addition, it is desirable to use a resin composition containing a crosslinking aid when performing the above-mentioned crosslink treatment. Preferable examples of the crosslinking aid include allyl compounds and (meth)acrylic compounds having at least two functional groups. Specific examples include triaryl cyanurate (TAC), triaryl isocyanurate (TAIC), pentaerythritol tetramethacrylate (PETMA), glutaraldehyde (GA), ethylene glycol dimethacrylate (EGDMA), diallyl maleate (DAM), dipropagyl maleate (DPM), dipropagyl monoallylcyanurate (DPMAC), trimethylolpropane triacrylate (TMPTAT), tetraethylene glycol diacrylate (TEGDA), 1,6 hexaglycol diacrylate, tetramethylol methane tetraacrylate, dipropagyl succinate, diallyl fumarate and dially phthalate. Among these, triallyl cyanate and triaryl isocyanate are particularly desirable.

The resin composition of the present invention is offered for practical use also as a single-layer molded article as described above. However, it is also desirable to use it in the form of a multilayer structure in which the resin composition and a thermoplastic resin (T2) are laminated. When the resin composition of the present invention, which is often used as a barrier material, is designated as Barrier, an adhesive resin is designated as Ad, a resin other than said barrier material is designated as R and a scrap recovery layer is designated as Reg, the layer constitution of the multilayer structure may be, but not limited to, Barrier/R, R/Barrier/R, Barrier/Ad/R, Reg/

Barrier/R, R/Ad/Barrier/Ad/R and R/Reg/Ad/Barrier/Ad/Reg/R and the like. In addition, when layers of thermoplastic resin (T2) are disposed on both sides of a layer of the resin composition of the present invention, the layers disposed may be of the same kind or alternatively of different kinds. Furthermore, a recovered resin may be blended in the resin other than the resin composition of the present invention. In the multilayer structures, each layer may be single-layered, or, as the case may be, multilayer.

The method of producing the multilayer structure as above is not specifically defined. For example, employable are a method of melt-extruding, onto a molding (e.g. film or sheet) of the resin composition of the present invention, the thermoplastic resin (T2); a method of melt-extruding the resin composition of the present invention onto a substrate of the thermoplastic resin (T2); a method of coextruding the resin composition of the present invention along with the thermoplastic resin (T2); and a method of laminating a molding obtained from the resin composition of the present invention and a film or sheet of the thermoplastic resin (T2) via a known adhesive of, for example, organotitanium compounds, isocyanate compounds and polyester compounds therebetween. Of those, preferred is the method of coextruding the resin composition of the present invention along with the thermoplastic resin (T2).

As the thermoplastic resin (T2) to be laminated with the resin composition of the present invention, preferred is at least one selected resin from the group consisting of polyolefin, polyamide, polyester, polystyrene, polyvinylidene chloride, polyvinyl chloride, polyacrylonitrile, thermoplastic polyurethane and polycarbonate. Among these, polyolefin, polyamide, polystyrene, polyester and thermoplastic polyurethane are preferably used.

The polyolefin used as the thermoplastic resin (T2) in the present invention is not specifically defined and may, for example, be a homopolymer or copolymer of an olefin such as linear low density polyethylene, low density polyethylene, medium density polyethylene, high density polyethylene, ethylene-vinyl acetate copolymer, ethylene-propylene copolymer, polypropylene, propylene-α-olefin copolymer (α-olefin having 4-20 carbon atoms), polybutene, polypentene. Examples of the copolymerizing components other than these α-olefins include diolefins, vinyl compounds such as N-vinylcarbazole, vinyl chloride, vinylidene chloride, styrene, acrylonitrile and vinyl ether; unsaturated carboxylic acids, such as maleic acid, acrylic acid, methacrylic acid, ethacrylic acid, fumaric acid and itaconic acid, their esters and anhydrides; and components resulting from addition of a hydroxyl group or an epoxy group to the foregoing components. For example, various copolymers such as copolymers of a graftable monomer and a polyolefin and ionomer resins, which are reaction products of α-olefin/α,β-unsaturated carboxylic acid copolymers with ionic metal compounds, may be used. As the polyolefin, chlorinated polyethylene, chlorinated polypropylene and the like may also be used. These polyolefin resins may be used alone or may be used in combination of two or more. Among the examples shown above, polypropylene, polyethylene, ethylene-propylene copolymer and ethylene-vinyl acetate copolymer are used particularly preferably.

Examples of the polyamide used as the thermoplastic resin (T2) in the present invention include polycapramide (nylon-6), poly-ω-aminoheptanoic acid (nylon-7), poly-ω-aminononanoic acid (nylon-9), polyundecamide (nylon-11), polylauryl lactam (nylon-12), polyethylene adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,6), polydodecamethylene sebacamide (nylon-12,10) or caprolactam/lauryl lactam copolymer (nylon-6/12), caprolactam/ω-aminononanoic acid copolymer (nylon-6/9), caprolactam/hexamethylene adipamide copolymer (nylon-6/6,6), lauryl lactam/hexamethylene adipamide copolymer (nylon-12/6,6), hexamethylene adipamide/hexamethylene sebacamide copolymer (nylon-6,6/6,10), ethylene adipamide/hexamethylene adipamide copolymer (nylon-2,6/6,6), caprolactam/hexamethylene adipamide/hexamethylene sebacamide copolymer (nylon-6/6,6/6,10), polyhexamethylene isophthalamide, polyhexamethylene terephthalamide and hexamethylene isophthalamide/terephthalamide copolymer. These polyamide may be used alone or alternatively may be used in combination of two or more. Among these polyamides, preferred are polyamides containing a caproamide component, for example, nylon-6, nylon-6,12, nylon-6/12, nylon-6/6,6.

The polyester used as the thermoplastic resin (T2) in the present invention is not specifically defined. Suitable examples thereof include poly(ethylene terephthalate) poly(butylene terephthalate), poly(ethylene terephthalate/isophthalate) and poly(ethylene glycol/cyclohexanedimethanol/terephthalate). Among these, particularly preferred is poly(ethylene terephthalate). In addition, as the polyester, polyesters containing as a copolymerizing component diols, such as ethylene glycol, butylene glycol, cyclohexanedimethanol, neopentyl glycol and pentane diol, and dicarboxylic acids, such as isophthalic acid, benzophenone dicarboxylic acid, diphenyl sulfonedicarboxylic acid, diphenylmethane dicarboxylic acid, propylenebis(phenylcarboxylic acid), diphenyl oxide dicarboxylic acid, oxalic acid, malonic acid, succinic acid, glutaric acid, adipic acid, pimelic acid, suberic acid, azelaic acid, sebacic acid and diethylsuccinic acid, may also be employed.

In addition, it is also preferable to use an elastomer as the thermoplastic resin (T2) to be laminated with the resin composition of the present invention. The elastomer for use in the present invention is not specifically defined. Suitable examples thereof include polyurethane-based elastomers, polystyrene-based elastomers, polyamide-based elastomers, polyester elastomers, polyolefin-based elastomers, elastomers comprising copolymers of vinyl aromatic compounds with conjugated diene compounds.

The polyurethane-based elastomer used as the thermoplastic resin (T2) in the present invention may usually be, but is not limited to, those made up of two or three constituents such as a high molecular diol and organic diisocyanate and/or low molecular diol. Specific examples of each component are as follows.

The high molecular diol is a diol which is a high molecular compound resulting from polycondensation, addition polymerization (for example, ring opening polymerization) or polyaddition, typical examples of which include polyester diol, polyether diol, polycarbonate diol or their cocondensate (for example, polyester and ether diol). These may be used alone or alternatively may be used in combination of two or more.

As the polyester diol, polyester diols obtained from an aliphatic diol such as ethylene glycol, propylene glycol and 1,5-pentane diol or a mixture there of and an aliphatic or aromatic dicarboxylic acids such as glutaric acid, adipic acid and terephthalic acid or a mixture thereof may be used. Alternatively, polylactone diol such as polycaprolactone glycol, polypropiolactone glycol and polyvalerolactone glycol may be used suitably. As the polyether diol, polyalkylene ether diol such as polyethylene ether glycol, polytetramethylene ether glycol and polyhexamethylene ether glycol may be used suitably. Furthermore, as the polycarbonate diol, a polycarbonate diol resulting from condensation polymerization by applying diphenyl carbonate or phosgene to an aliphatic diol having 2-12 carbon atoms such as 1,4-butanediol, 1,5-pentanediol, 1,6-hexane diol, 1,8-octanediol and 1,10-decane diol or a mixture thereof may be used suitably.

It is desirable that the average molecular weight of the high molecule diol be within the range of 500-3000, more preferably within the range of 500-2500. If the average molecular weight is too small, the compatibility with an organic diisocyanate will be too good and the elasticity of a resulting polyurethane will be poor. On the other hand, if the average molecular weight is too large, the compatibility with an organic diisocyanate will be bad and blending in a polymerization process will be unsuccessful, producing gel-like blocks or failing to form stable polyurethane.

Examples of the second raw material, the low molecular diol, include low molecular diols with a molecular weight of less than 500 e.g. aliphatic, alicyclic or aromatic diols such as ethylene glycol, propylene glycol, 1,4-butanediol, 1,5-pentane diol, 3-methylpentane glycol, 1,6-hexane diol and 1,4-bishydroxyethylbenzene. These may be used alone or alternatively may be used in combination of two or more.

Examples of the organic diisocyanate include aromatic, alicyclic or aliphatic diisocyanates such as 4,4-diphenylmethane diisocyanate, tolylene diisocyanate, 1,3- or 1,4-bis(isocyanatemethyl)benzene, 1,3- or 1,4-bis(isocyanatemethyl)cyclohexane, 4,4'-dicyclohexylmethane diisocyanate and isophorone diisocyanate. These organic diisocyanates may be used alone or alternatively may be used in combination of two or more.

The nitrogen content of the polyurethane-based elastomer used as the thermoplastic resin (T2) in the present invention is determined through appropriate selection of the proportions of the high molecular diol, low molecular and organic diisocyanate. However, it is preferably within the range of 1-7% in practical use. Moreover, when a thermoplastic polyurethane is used, an appropriate catalyst which promotes the reaction between the organic diisocyanate and the diol may be employed as required. In addition, various additives such as coloring agents, fillers, oxidation inhibitors and ultraviolet absorbers or lubricants may also be added for each purpose.

The polyolefin-based elastomer used as the thermoplastic resin (T2) in the present invention may suitably be, but are not limited specifically to, ethylene-propylene copolymer elastomer (EPR). The ethylene-propylene copolymer may be, but is not limited specifically to, random copolymers and block copolymers of ethylene and propylene. As for the content of each constituent, in order for the copolymer to have a sufficient flexibility, it is preferable that one constituent exist in an amount at least 10% by weight or more, more preferably 20% by weight or more.

The elastomer comprising a copolymer of a vinyl aromatic compound and a conjugated diene compound used as the thermoplastic resin (T2) in the present invention is not limited specifically. Examples of such a vinyl aromatic compound include styrenes such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene and t-butoxystyrene; aromatic compounds containing a vinyl group such as 1-vinylnaphthalene and 2-vinylnaphthalene; aromatic compounds containing a vinylene group such as indene and acenaphthylene. The vinyl aromatic monomer unit may be of one kind or may be of two or more kinds. However, it is preferably a unit derived from styrene.

In addition, a conjugated diene compound used for copolymer comprising of vinyl aromatic compound and conjugated diene compound is not limited particularly. Examples of the conjugated diene compound include butadiene, isoprene, 2,3-dimethylbutadiene, pentadiene and hexadiene. The conjugated diene compound may be partially or completely hydrogenated. Examples of the partially hydrogenated copolymer of a vinyl aromatic compound and a conjugated diene compound include hydrogenation products of styrene-ethylene•butylene-styrene triblock copolymers (SEBS), styrene-ethylene•propylene-styrene triblock copolymers (SEPS) and styrene-conjugated diene copolymers.

Among the elastomers shown above as examples, use of the polyurethane-based elastomer is preferable because it is superior in interlayer adhesiveness between a layer of the elastomer and a layer of the resin composition of the present invention, particularly, a resin composition comprising the modified EVOH (C) and an EVOH (F).

As described previously, a multilayer structure in which the resin composition of the present invention and the thermoplastic resin (T2) are laminated is produced suitably by coextrusion of the resin composition and the thermoplastic resin (T2). Depending upon the type of the resin which is laminated to the resin composition, the resin composition and the thermoplastic resin (T2) may be laminated via an adhesive resin. The adhesive resin used in this occasion is preferably an adhesive resin comprising a carboxylic acid-modified polyolefin. The carboxylic acid-modified polyolefin is a modified olefinic polymer having carboxyl groups that may be prepared by chemically bonding an ethylenic unsaturated carboxylic acid or its anhydride to an olefinic polymer, for example, through addition reaction or grafting reaction. The olefinic polymer includes, for example, polyolefins such as polyethylenes (produced in low-pressure, middle-pressure or high-pressure process), linear low density polyethylenes, polypropylenes and polybutenes; copolymers of olefins with comonomers capable of copolymerizing with olefins (e.g. vinyl esters and unsaturated carboxylates), such as ethylene-vinyl acetate copolymers and ethylene-ethyl acrylate copolymers. Of those, preferred are linear low density polyethylenes, ethylene-vinyl acetate copolymers (having a vinyl acetate content of from 5 to 55% by weight), and ethylene-ethylacrylate copolymers (having an ethyl acrylate content of from 8 to 35% by weight); and more preferred are linear low density polyethylenes and ethylene-vinyl acetate copolymers. The ethylenic unsaturated carboxylic acid and its anhydride include, for example, ethylenic unsaturated monocarboxylic acids and their esters, ethylenic unsaturated dicarboxylic acids and their mono- or di-esters and anhydrides. Of those, preferred are ethylenic unsaturated dicarboxylic acid anhydrides. Concretely, they include maleic acid, fumaric acid, itaconic acid, maleic anhydride, itaconic anhydride, monomethyl maleate, monoethyl maleate, diethyl maleate and monomethyl fumarate. Above all, most preferred is maleic anhydride.

The amount of the ethylenic unsaturated carboxylic acid or its anhydride to be added to or grafted on the olefinic polymer (that is, the degree of modification) is between 0.0001 and 15% by weight of the olefinic polymer, preferably between 0.001 and 10% by weight. Addition reaction or grafting reaction of the ethylenic unsaturated carboxylic acid or its anhydride to the olefinic polymer is effected, for example, through radical polymerization in a solvent (e.g. xylene) in the presence of a catalyst (e.g. peroxide). The melt flow rate (MFR) of the thus-prepared carboxylic acid-modified polyolefin, when measured at 190° C. and under a load of 2160 g, is preferably 0.2-30 g/10 min, more preferably 0.5-10 g/10 min. These adhesive resins may be used alone or alternatively may be used in combination of two or more.

When the resin composition of the present invention is coextrusion molded with the thermoplastic resin (T2), there are merits described below in comparison with a normal EVOH. One of the merits is that because the resin composition of the present invention has superior barrier properties, transparency, stretchability, flexibility and flexing resistance, it is possible to impart such superior physical properties also to multilayer molded articles containing a layer comprising the resin composition.

Another merit is one derived from the fact that the modified EVOH (C) used in the present invention has a lower melting point in comparison with normal EVOHs. The melting point of the modified EVOH (C) may vary depending upon the content of the above-mentioned structural unit (I), but the melting point of the modified EVOH (C) having the structural unit (I) is lower than those of normal unmodified EVOHs. This merit is noticeable in the case of a resin composition comprising the modified EVOH (C) and a polyolefin (G).

EVOH is often used in the form of a laminate with polyolefin. Such a laminate is often produced by coextrusion molding. However, because an EVOH having an ethylene content of 5-55 mol % is generally a resin having a melting point higher than those of polyolefin and the like, there used to be a necessity, in an occasion where the EVOH and a polyolefin is melt molded by coextrusion molding, of carrying out the molding at a temperature higher than the melting point of the EVOH. In other words, as for the molding temperature of polyolefin, coextrusion molding thereof used to be carried out at a molding temperature which was not always optimum.

However, use of the resin composition of the present invention has made it possible to carry out coextrusion molding at a molding temperature near the optimum molding temperature of polyolefin. Because the range of the molding temperature employed in coextrusion molding has been widened, it has become easier to adjust a viscosity matching of a polyolefin and the resin composition of the present invention and it has become possible to obtain coextrusion molded articles at more favorable operating conditions. From such viewpoints, the present invention is of high significance.

The method of coextruding the resin composition of the present invention and the thermoplastic resin (T2) is not limited specifically. Suitable examples thereof include the multimanifold method, the feedblock method and the multislot die method. By such molding methods, a multilayer film, a multilayer sheet, a multilayer pipe, a multilayer hose, a multilayer profile molded article and the like are produced. In addition, the coextrusion inflation molding method, the coextrusion blow molding method and the like can provide a multilayer film and a multilayer bottle.

The thus-obtained coextruded multilayer structures can be secondarily fabricated into various shaped articles (e.g. films, sheets, tubes or bottles), which include the following:

(1) Multilayer co-stretched sheets or films, which are produced by uniaxially or biaxially stretching multilayer structures (e.g. sheets or films), or biaxially stretching them, and thereafter thermally treating them.
(2) Multilayer rolled sheets or films, which are produced by rolling multilayer structures (e.g. sheets or films).
(3) Multilayer tray or cup containers, which are produced through thermoforming process such as vacuum forming, pressure forming and vacuum-pressure forming of multilayer structures (e.g. sheets or films).
(4) Multilayer bottle or cup containers, which are produced through stretch blow molding of multilayer structures (e.g. pipes).

The method for secondary fabrication of the multilayer structures is not limited to the above, and any other known fabricating methods (e.g. blow molding) could be employed.

Because the resin composition of the present invention is superior in barrier properties, transparency, stretchability, flexibility and flexing resistance, a multilayer structure containing a layer comprising the resin composition of the present invention can be employed for various applications. For example, it is desirably employed for a flexible film, a flexible packaging material, a thermoformed container, a blow molded article (e.g. a multilayer coextrusion blow molded container and a multilayer coinjection blow molded container), a heat shrinkable film (e.g. a skin packaging film), a hose or a balloon. Above all, preferable examples of the applications in which the effect of the flexing resistance can be shown sufficiently include a flexible packaging material (e.g. a flexible pouch and a tube) and a flexible film.

Of these multilayer moldings, for applications in which a high degree of barrier property is required even if the resin composition layer is thin or for applications in which transparency is required, it is preferable to use unmodified EVOH (F) as the thermoplastic resin (T1) to be incorporated to modified EVOH (C). Examples of such applications include oriented films, thermoforming films, thermoforming sheets, heat-shrinkable films, flexible packaging containers, blow molded containers, pipes, hoses and balloons. Above all, in applications where secondary processability is required such as oriented films, thermoforming films, thermoforming sheets, heat-shrinkable films and blow molded containers, the difference in ethylene content between modified EVOH (C) and EVOH (F) is preferably from 2 to 30 mol %. In particular, it is preferable that the ethylene content of modified EVOH (C) be greater than that of EVOH (F) because an excellent secondary processability is achieved while characteristics of the EVOH (F) having good gas barrier properties are maintained.

On the other hand, in molded articles which are not required for transparency, thick-walled molded articles, molded articles which are not required for high barrier properties, etc., it is preferable to use other thermoplastic resin, especially polyolefin (G) as the thermoplastic resin (T1) incorporated to modified EVOH (C). Examples of such applications include two-color molded articles, insert molded articles, coinjection molded articles, thick-walled multilayer pipes or hoses, and thick-walled multilayer blow molded containers.

In addition, a multilayer structure in which the resin composition of the present invention and the thermoplastic resin (T2) are laminated is preferably employed as a wallpaper or a decoration board. Because EVOH has a superior antifouling property and superior barrier properties to a plasticizer, a multilayer structure containing an EVOH layer is suitably employed as a wallpaper. However, a wallpaper is often handled in the form of a roll during its transportation or its storage in a warehouse. When the transportation is repeated many times, the increase in frequency of bending of a wallpaper may render its appearance poor through formation of wrinkles in the EVOH layer or, when the wrinkles are severe, may cause whitening. However, the resin composition of the present invention is very suitable for such applications because it has superior flexibility and flexing resistance while holding a superior barrier property to a plasticizer. For this application, it is desirable to use the EVOH (F) as the thermoplastic resin (T1) to be incorporated to the modified EVOH (C).

Moreover, it is also preferable that a flexible film comprising the resin composition of the present invention be laminated with artificial leather or the like to be employed as a book jacket because the flexible film is superior in the antifouling property, flexibility and flexing resistance as described above. It is also preferable to use it for a cover of a book, a cover of a notebook or the like, etc. Also for this application, it is desirable to use the EVOH (F) as the thermoplastic resin (T1) to be incorporated to the modified EVOH (C).

Moreover, when a multilayer structure having a layer of the resin composition of the present invention and a layer of the thermoplastic resin (T2) is used in the form of a multilayer pipe, a multilayer pipe superior in crack resistance can be obtained. In a preferred embodiment, the multilayer pipe is a multilayer pipe comprising a laminate having an intermediate layer of the resin composition of the present invention and an inner and outer layers of a polyolefin. It is particularly preferable that the multilayer pipe be employed as a fuel pipe or a pipe for warm water circulation. The fuel pipe is available as a fuel pipe for cars and a so-called fuel line for transporting fuel from oil fields. These multilayer pipes are usually used while being joined together through connectors. When the multilayer pipes are joined together through connectors, in many cases, the pipes are expanded slowly first through their several expansions of the diameters of their ends by means of a special expansion jig.

In such a process, a conventional multilayer pipe containing a normal EVOH as a middle layer used to be suffered from cracking in the EVOH in the portion where the diameter of the multilayer pipe has been expanded. In particular, during the task done in an environment where the outdoor temperature is very low, for example, in an area where floor heating pipes are laid, large cracks are sometimes formed in a layer of EVOH. The cracks may reduce the oxygen barrier property in the connected portions of the multilayer pipes. However, because the resin composition of the present invention is superior in flexibility, it is possible to inhibit effectively the formation of cracks in a layer of the resin composition even during such a step of connecting pipes.

On the other hand, the multilayer pipe is also used as a fuel pipe suitably. In this case, the fuel pipe is employed as a fuel pipe of cars very suitably. It is used as a fuel pipe for supplying fuel from a fuel tank to an engine. In such an embodiment, cracks are easily formed in the barrier layer because a load caused by vibration of an engine or vibration occurring during the running of a car is applied continuously to the fuel pipe. However, because the resin composition of the present invention is superior in flexibility, it is possible to inhibit effectively the formation of cracks in a layer of the resin composition even when the pipe is used as a fuel pipe.

From the viewpoints described above, it is very advantageous to employ a multilayer structure containing a layer of the resin composition of the present invention in the form of a multilayer pipe. In particular, it is preferable to use the multilayer pipe as a fuel pipe or a pipe for warm water circulation. For this application, it is desirable to use the EVOH (F) as the thermoplastic resin (T1) to be incorporated to the modified EVOH (C).

In addition, it is also preferable to use the multilayer structure containing a layer of the resin composition of the present invention as a multilayer hose. Because a hose is softer than a pipe, the multilayer hose can enjoy a great merit derived from the use of the resin composition of the present invention which is superior inflexibility. In particular, the multilayer hose is employed as a fuel hose suitably. Also for this application, it is desirable to use the EVOH (F) as the thermoplastic resin (T1) to be incorporated to the modified EVOH (C).

In addition, when the multilayer structure containing a layer of the resin composition of the present invention is used as a multilayer blow molded article, a multilayer blow molded article superior in impact resistance can be obtained. As the blow molded article, a multilayer coextrusion blow molded container is preferred. As the multilayer blow molded container, preferred is one containing the resin composition as an intermediate layer and polyolefin as inner and outer layers. In particular, it is preferable to use polyethylene or polypropylene as the polyolefin. Also for this application, it is desirable to use the EVOH (F) as the thermoplastic resin (T1) to be incorporated to the modified EVOH (C).

Moreover, the multilayer blow molded container is suitably used as a fuel container for cars or a fuel container for motorcycles. When the multilayer coextrusion blow molded container is used as a fuel container, it is preferable to use a high density polyethylene as the polyolefin. The high density polyethylene may usually be employed after being selected suitably from commercially available products. In particular, from the viewpoints of rigidity, impact resistance, moldability, drawdown resistance, gasoline resistance, etc., the density of the high density polyethylene is preferably 0.95-0.98 $g/cm^3$ and more preferably 0.96-0.98 $g/cm^3$. The melt flow rate (MFR) of the high density polyethylene used for an inner and outer layers of a multilayer fuel container is preferably 0.01-0.5 g/10 min (at 190° C. under a load of 2160 g), and more preferably 0.01-0.1 g/10 min (at 190° C. under a load of 2160 g).

Another preferable embodiment of the multilayer blow molded container in which the resin composition of the present invention and the thermoplastic resin (T2) are laminated is a coinjection stretch blow molded container.

Thermoplastic polyester (PES) containers as produced through stretch blow molding have various excellent properties including good transparency, good mechanical properties and good flavor barrier properties, and are sanitary and safe as releasing few residual monomers and other harmful additives when employed to be a molded article. Therefore, they have many applications in various fields. However, since their gas barrier properties are not always satisfactory, drinks, foods and others in them could be stored for only a relatively short period of time.

In order to overcome the drawback, various methods for combining a thermoplastic polyester with an EVOH with good gas barrier properties to give laminated structures have been proposed. Prior to stretch blowing, a parison is first formed. For forming the parison, employed are coinjection molding, coextrusion molding, multi-stage injection molding, etc. Of those, coinjection molding is characterized in that it may be effected in simple apparatus, that it gives few scraps such as trimmings and others, and that the moldings produced through it could have a structure with an EVOH layer completely covered with such as a PES layer and therefore, even though the moldings have no adhesive resin (Ad) layer between the EVOH layer and the PES layer they could be a multilayer containers with good appearance owing to the contact effect by the ambient atmospheric pressure.

However, when containers filled with drinks, foods and others are shocked, for example, by dropping them, the PES layer and the EVOH layer constituting them are easily delaminated, thereby causing a serious problem of worsening the appearance of the containers. In order to solve this problem, some technologies have been developed. For example, JP-A-11-348194 (EP0949056) discloses a coinjection stretch blow molded container comprising a thermoplastic polyester layer (layer a) and an ethylene-vinyl alcohol copolymer layer (layer b), with the layer a being kept in direct contact with the both surfaces of the layer b, wherein the ethylene-vinyl alcohol copolymer satisfies the following formulas (1) and (2) and its differential scanning calorimetry (DSC) gives a single peak for crystal fusion:

$$25 \leq ETb \leq 48 \quad (1)$$

$$92 \leq SDb \leq 99 \quad (2)$$

wherein:
ETb indicates the ethylene content (mol %) of the ethylene-vinyl alcohol copolymer; and
SDb indicates the degree of saponification (%) of the ethylene-vinyl alcohol copolymer.

JP-A-2001-277341 (EP1120223) discloses a coinjection stretch blow molded container which comprises a thermoplastic polyester layer (layer a) and an ethylene-vinyl alcohol copolymer layer (layer b), with the layer a being kept in direct contact with the both surfaces of the layer b, wherein the above ethylene-vinyl alcohol copolymer is a mixture of two ethylene-vinyl alcohol copolymers (b1, b2) in a ratio by weight (b1/b2) falling between 50/50 and 90/10, and satisfies the following formulas (3) through (8):

$$25 \leq ETb1 \leq 40 \quad (3)$$

$$99 \leq SDb1 \quad (4)$$

$$35 \leq ETb2 \leq 48 \quad (5)$$

$$92 \leq SDb2 \leq 99 \quad (6)$$

$$4 \leq ETb2 - ETb1 \leq 23 \quad (7)$$

$$1 \leq SDb1 - SDb2 \leq 8 \quad (8)$$

wherein:
Etb1 indicates the ethylene content (mol %) of the ethylene-vinyl alcohol copolymer (b1);
SDb1 indicates the degree of saponification (%) of the ethylene-vinyl alcohol copolymer (b1);
Etb2 indicates the ethylene content (mol %) of the ethylene-vinyl alcohol copolymer (b2); and
SDb2 indicates the degree of saponification (%) of the ethylene-vinyl alcohol copolymer (b2

The delamination resistance of a coinjection stretch blow molded container comprising an EVOH layer and a PES layer has been greatly improved by the above-mentioned technologies in comparison with that conventionally achieved. However, today, the market of the blow molded container has expanded than before and such containers have come to be used for various applications. As a result of such expansion of applications, the blow molded container has increasing demands for further improvement in delamination resistance and for improvement in transparency.

The coinjection stretch blow molded container of the present invention is a multilayer container having a layer of the resin composition of the present invention and a layer of a thermoplastic resin (T2). Thus, even when a coinjection stretch blow molded container is applied with impact or the like, the occurrence of delamination between a layer of the resin composition of the present invention and a layer of a thermoplastic resin (T2) can be prevented effectively. Using such a constitution, it is possible to provide a coinjection stretch blow molded container which is superior in transparency and gas barrier properties as well as in delamination resistance.

As the resin composition used for coinjection stretch blow molding container, those previously mentioned can be used. At this time, it is desirable to use the EVOH (F) as the thermoplastic resin (T1) to be incorporated to the modified EVOH (C). This application particularly requires transparency and also requires high barrier properties. Therefore, a smaller difference in ethylene content between the modified EVOH (C) and the EVOH (F) is preferred. Specifically, the difference is preferably up to 2 mol %.

In addition, the use of the resin composition of the present invention can also improve the moldability. The moldability can be judged from the coloration of the appearance of a bottomed parison, the conditions of occurrence of gels and streaks in the bottomed parison and the condition of the edge, which may henceforth be referred to as a leading edge, of the resin composition layer in the opening of a container. A schematic view showing a part of a bottomed parison having leading edge in a good condition and a schematic view showing a part of a bottomed parison having a leading edge in a bad condition are shown in FIG. 10 and FIG. 11, respectively. In the opening 11 of the container, a boundary between the multilayer portion 12 of PES/EVOH and the single layer portion 13 of PES is the leading edge 14. A desirable condition of the leading edge is a condition where the line of the leading edge is approximately horizontal when the bottomed parison is placed with its bottom portion down.

In the coinjection stretch blow molded container of the present invention, the thermoplastic resin (T2) to be laminated with the resin composition of the present invention is not specifically limited, but it is preferable to use at least one selected from the group consisting of polyester, polypropylene and polyethylene. It is more preferable to use a high density polyethylene as the polyethylene.

So far as the object of the invention is not adversely affected, the layer of the thermoplastic resin (T2) may be composed of plural layers and may have a layer of a recovery layer; but a layer constitution comprising exclusively a layer of the resin composition of the present invention and a layer of the thermoplastic resin (T2) is preferred. More preferred is a layer constitution in which a layer of the thermoplastic resin (T2) is formed on each side of a layer of the resin composition. Specifically, when a layer of the resin composition of the present invention is designated as C, and a layer of the thermoplastic resin is designated as T, examples of suitable layer constitutions include (outer)T/C/T(inner), (outer)T/C/T/C/T (inner) and the like. In the above description, (inner) indicates the inner layer, i.e., a layer that will contact with the content.

As the polyester (PES) to be used as the thermoplastic resin (T2), condensation polymers including aromatic dicarboxylic acids or alkyl esters thereof and diols as main components are used. In particular, PES including ethylene terephthalate as the main component is preferable in attaining the purpose of the present invention. Concretely, the total proportion (mol %) of the terephthalic acid unit and the ethylene glycol unit is preferably 70 mol % or more, more preferably 90 mol % or more, of total moles of all the structural units of the PES. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal shrinkage is so large that it may not be put in practical use. Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems are not caused. The proportion (mol %) thereof is preferably 30 mol % or less, more preferably 20 mol % or less, and even more preferably 10 mol % or less, of the total moles of all the structural units of the PES. Examples of such a bifunctional compound unit include a dicarboxylic acid unit, a diol unit, and a hydroxycarboxylic acid unit. Such bifunctional compound units may either be aliphatic, alicyclic, or aromatic bifunctional compound units. Specific examples thereof include a neopentyl glycol unit, a cyclohexanedimethanol unit, a cyclohexanedicarboxylic acid unit, an isophthalic acid unit, and a naphthalenedicarboxylic acid unit.

Among these, an isophthalic acid unit is advantageous since the resultant PES provides a broad range of conditions under which good products can be produced and provides good moldability. This results in an advantage of a lowered defective production rate. This is also advantageous in that the molded article is prevented from whitening caused by a suppressed crystallization rate. Also preferable are a 1,4-cyclohexanedimethanol unit and 1,4-cyclohexanedicarboxylic acid unit because the resultant molded article has even better strength against dropping. Naphthalene dicarboxylic acid unit is also preferable in that the resultant PES has a high glass transition temperature and the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8% by weight based on the weight of dicarboxylic acid.

Among these, antimony compounds are preferable in view of the cost of the catalyst, and antimony trioxide is especially preferable. On the other hand, germanium compounds are preferable in that the resultant PES has a good color tone, and germanium dioxide is especially preferable. In view of moldability, the germanium compounds are more preferable than the antimony compounds. The PES obtained by the polymerization reaction with an antimony compound as a catalyst has a higher crystallization rate than the case using a germanium compound as a catalyst. This means that in the case of using an antimony compound, crystallization tends to proceed easily by heating during injection molding or blow molding. The resultant bottles are likely to generate whitening and may be poor in transparency. The degree of orientation by drawing may also be lowered, and the moldability may deteriorate. This narrows the range of conditions under which good products can be produced, which tends to increase the rate of production of defective products.

In particular, when polyethylene terephthalate containing no copolymerized component other than diethylene glycol units as a by-product is used as the PES used for the present invention, it is preferable to use a germanium compound as the catalyst to suppress the crystallization rate when producing the PES.

The method for producing the coinjection blow molded container of the present invention including at least one layer made of the resin composition and at least one PES layer is not specifically defined. In coinjection blow molding, the container is produced by subjecting a container precursor (parison) obtained by coinjection molding to stretch blow molding.

In the coinjection molding, in general, the resins to constitute the layers of the multilayer structure are guided to a concentric nozzles from two or more injection cylinders and are injected into a single mold simultaneously or alternately at non-synchronized timings, and one clamping operation is performed for molding. For example, parisons are produced by, but not limited to, the following methods: (1) PES layer for the inner and outer layers is first injected, and then a resin composition for the intermediate layer is injected to give a three-layer container of PES/resin composition/PES; or (2) PES layer for the inner and outer layers is first injected, then a resin composition is injected while, at the same time, or after the injection of the resin composition, PES layer is again injected to give a five-layer container of PES/resin composition/PES/resin composition/PES. In addition, in the above-mentioned layer constitution, an adhesive resin layer may be disposed between the resin composition layer and the PES layer, if necessary.

A multiplayer container containing at least one layer comprising the resin composition and at least one PES layer, which is one of the preferable embodiments of the present invention, can have a high transparency and is excellent in ability to maintain the quality of a content. It, therefore, is best suited to food packaging and the like. Regarding the layer structure of the multilayer container, an adhesive resin layer may be provided between the resin composition layer and the PES layer as described previously. However, the multilayer container in which the PES layers are in direct contact with both surfaces of the resin composition layer is particularly preferable because the following advantages of the present invention can be provided to a sufficient extent: a better transparency can be obtained and the resistance to impact delamination between the resin composition layer and the PES layer is excellent.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded articles may have non-molten substances (fish eyes), by which their appearance may be worsened, moreover, which may cause the degradation of the mechanical strength of the molded articles. In some extreme cases, the screw torque for the injection of the resin composition may increase, so that the molding machine may have operational malfunctions. If the injection temperature for PES exceeds 330° C., PES may be highly decomposed, which may lead to a lowered molecular weight, so that the mechanical strength of the molded articles may be lowered. Moreover, the PES decomposition gives off some vapors of acetaldehyde and the like, and thus the properties of the materials to be filled in the molded articles may be worsened. Moreover, the oligomers resulting from the PES decomposition may contaminate the mold significantly, and the resultant molded articles may have a poor appearance.

The resin composition of the present invention is preferably injected at a temperature in the range of 160 to 240° C., more preferably 175 to 230° C., and still more preferably 185 to 225° C. If the injection temperature for the resin composition is lower than 160° C., the resin composition is not sufficiently melted, and the resulting molded articles may have non-molten substances (fish eyes), and thus their appearance may be worsened. In some extreme cases, the screw torque for the injection of the resin composition may increase, so that the molding machine may have operational malfunctions. On the other hand, if the injection temperature for the resin composition exceeds 250° C., the deterioration of the resin composition may proceed, so that the gas barrier properties of the resin composition may be degraded. In addition, the molded articles may be unfavorably colored and contain gelled materials, so that the appearance of the resulting molded articles may be poor. Moreover, the fluidity will be disordered or damaged by a decomposition gas and the gelled materials, so that the layer of the resin composition may have failed areas. In some extreme cases, the gelled materials may make it impossible to continue the injection molding operation. In order to suppress the progress of the oxidation of the composition during melting, it is preferable to seal the supply hopper with nitrogen.

The temperature of the hot runner parts through which PES and the resin composition run is preferably in the range of 220 to 300° C., more preferably 240 to 280° C., still more preferably 250 to 270° C. If the temperature of the hot runner parts is lower than 220° C., the PES may crystallize and solidify in the hot runner parts. If so, the molding operation will become difficult. If the temperature of the hot runner parts exceeds 300° C., the deterioration of the resin composition proceeds so that the gas barrier properties of the resin composition may be degraded. In addition, the molded articles may be unfavorably colored and contain gelled materials, so that the appearance of the resulting molded articles may be poor. Moreover, the fluidity will be disordered or blocked by the decomposition gas and by the gelled materials, so that the layer of the resin composition may have failed areas. In some extreme cases, the gelled materials may make it impossible to continue the injection molding operation.

The mold temperature is preferably in the range of 0 to 70° C., more preferably 5 to 50° C., even more preferably 10 to 30° C. With this, the crystallization of the PES, the modified EVOH (C) or the thermoplastic resin (T1) of the parisons can be suppressed and their uniform stretchabilities are secured, so that molded articles having improved delamination resistance, transparency, and good shape retentivity can be obtained. If the mold temperature is lower than 0° C., the dew formed around the mold may worsen the appearance. of the parisons, and thus good molded articles may not be obtained. On the other hand, if the mold temperature is higher than 70° C., the crystallization of the PES, the modified EVOH (C) or the thermoplastic resin (T1) which constitutes a parison will not be suppressed and the parison can not be stretched uniformly. As a result, a molded article to be obtained will have reduced delamination resistance and reduced transparency. Moreover, it will become difficult to obtain a molded article of an intended shape.

The total thickness of the thus obtained parison is preferably in the range of 2 to 5 mm, and the total thickness of the layer or layers of the resin composition of the present invention is preferably in the range of 10 to 500 µm in total.

The above parison is directly in its high-temperature state, or after having been re-heated with heating means such as a block heater, an infrared heater, or the like, transferred to the next stretch blowing stage. In the stretch blowing stage, the heated parison is stretched one- to five-fold in the machine direction, and thereafter blown one- to four-fold with compressed air or the like so that the injection-blown molded multilayer container of the present invention can be produced. The temperature of the parison is preferably 75 to 150° C., more preferably 85 to 140° C., even more preferably 90 to 130° C., and still more preferably 95 to 120° C. If the temperature of the parison exceeds 150° C., the PES may easily crystallize, so that the resultant container may be whitened and its appearance may become poor. In addition, the delamination of the stretch-blown container will increase unfavorably. On the other hand, if the temperature of the parison is less than 75° C., the PES may be crazed to be pearly, so that the transparency may be lost.

The total thickness of the body part of the thus obtained multilayer container of the present invention is generally 100 to 2000 µm, preferably 150 to 1000 µm, and may vary depending on the use of the container. In this case, the total thickness of the layer of the resin composition of the present invention is preferably in the range of 2 to 200 µm, more preferably 5 to 100 µm.

In the manner described above, a multilayer container comprising of a layer of the resin composition of the present invention and a PES layer, which is one preferred embodiment of the present invention, can be obtained. The containers can have a good transparency and also have excellent gas barrier properties. The containers are therefore suitable for contents susceptible to degradation in the presence of oxygen, such as foods and medicines. Especially, they can be used most suitably as containers for beverages such as beer.

In addition, another preferred embodiment of the present invention is a multilayer container containing at least one layer of the resin composition of the present invention and at least one layer of polypropylene. As the polypropylene for use in the present invention, can be used random or block copolymers with other olefin compound such as ethylene or the like, in addition to homopolypropylene. Among them, copolymers with ethylene are preferred from the viewpoints of transparency and outer appearance of molded products. In addition, the melt index of the polypropylene is preferably 0.1 to 100 g/10 min (at 230° C. under a load of 2160 g), more preferably 0.2 to 50 g/10 min, and most preferably 0.5 to 20 g/10 min.

As to conditions for injection molding, the molding temperature of the polypropylene is preferably within the range of 180 to 250° C., and more preferably 200 to 250° C., from the viewpoint of fluidity of the polypropylene on melting as well as the appearance and strength of a container to be obtained. The production conditions employed for producing the multilayer parison containing a layer of polypropylene and a layer of the resin composition of the present invention and the production conditions employed for the stretch blow molding of the multilayer parison are the same as those employed for the production of a coinjection blow molded container including a PES layer and a layer of the resin composition of the present invention previously described.

The thus obtained coinjection stretch blow molded container of the present invention including a polypropylene layer and a layer of the resin composition of the present invention is superior in flavor retainability, organic solvent resistance and delamination resistance. This multilayer container is suitable for storing various contents for a long time, and is useful as a container for storing various drinks including customarily hot-filled red tea, foods, cosmetics, blood samples and the like.

Also in the case of a resin composition obtained by a dynamic crosslinking treatment (dynamically crosslinked resin composition), which is another embodiment of the present invention, it can be employed as a molding material while being formed in advance into any desired form such as pellet and powder. Since the dynamically crosslinked resin composition of the present invention has thermoplasticity, it can be molded or processed by use of normal molding or processing method and molding or processing equipment used for typical thermoplastic resin. As a method for molding or processing, any method may be adopted such as injection molding, extrusion molding, compression molding, blow molding, calender molding and vacuum molding. Molded articles comprising the dynamically crosslinked resin composition of the present invention produced by such methods include those of various shapes such as pipe, sheet, film, disc, ring, bag, bottle, rope and fiber. Laminate or composite structures made of the composition and another material are also included. The adoption of a laminate of the composition and another material makes it possible to introduce characteristics of the "other materials" such as humidity resistance and mechanical properties.

In molded articles comprising at least one layer composed of the dynamically crosslinked resin composition of the present invention and at least one layer of the other material, the other material can be selected appropriately according to the properties required and applications intended. Examples of the other material include thermoplastic resin such as polyolefin (e.g. high density polyethylene, medium density polyethylene, low density polyethylene, linear low density polyethylene, ethylene-propylene copolymer, polypropylene), ionomers, ethylene-vinyl acetate copolymer (EVA), ethylene-acrylic acid ester copolymer (EEA), polystyrene (PS), vinyl chloride resin (PVC) and vinylidene chloride resin (PVDC).

In molded articles having this laminate structure, an adhesive layer may exist between a layer of the dynamically crosslinked resin composition of the present invention and a substrate layer of the other material. The existence of the adhesive layer results in a firm connection of the layer of the dynamically crosslinked resin composition of the present invention and substrate layer of the other material which are disposed on both side thereof. Examples of available adhesives in the adhesive layer include diene-based polymers modified with acid anhydrides; polyolefins modified with acid anhydrides; and mixtures of macromolecular polyols (e.g. polyesterpolyol obtained by polycondensing a glycol compound such as ethylene glycol and propylene glycol with a dibasic acid such as adipic acid; and a partially saponificated product of a copolymer of vinyl acetate and vinyl chloride) and polyisocyanate compounds (e.g. a reaction product in a molar ratio of 1:2 of a glycol compound such as 1,6-hexamethylene glycol with a diisocyanate compound such as 2,4-tolylenediisocyanate; and a reaction product in a molar ratio of 1:3 of a triol compound such as trimethylol propane with a diisocyanate compound such as 2,4-tolylenediisocyanate). For the formation of the laminate structure, known method may be employed such as coextrusion, coinjection and extrusion coating.

The molded articles comprising the dynamically crosslinked resin composition of the present invention possess both superior barrier properties to many kinds of gasses, organic liquids, etc. and superior flexibility. Therefore, they can be employed in the form of daily necessaries, packaging materials and machine parts and the like. Examples of applications where the features of the dynamically crosslinked resin composition of the present invention can be demonstrated particularly effectively include packaging materials for foods and beverages, containers and packings for containers. In the molded articles for use in these applications, the resin composition is only required to form at least one layer. The molded articles may be selected appropriately from those having a monolayer structure of the resin composition and those having a laminate structure composed of at least one layer of the resin composition and at least one layer of another material. The above-mentioned packaging materials for foods and beverages, containers and packings for containers are superior in ability of preserving contents for a long time because they can prevent permeation of both oxygen gas in the atmosphere and volatile components contained in the contents.

The molded articles comprising the dynamically crosslinked resin composition of the present invention can be reused by being melted at the time of their disposal.

Figure 1:
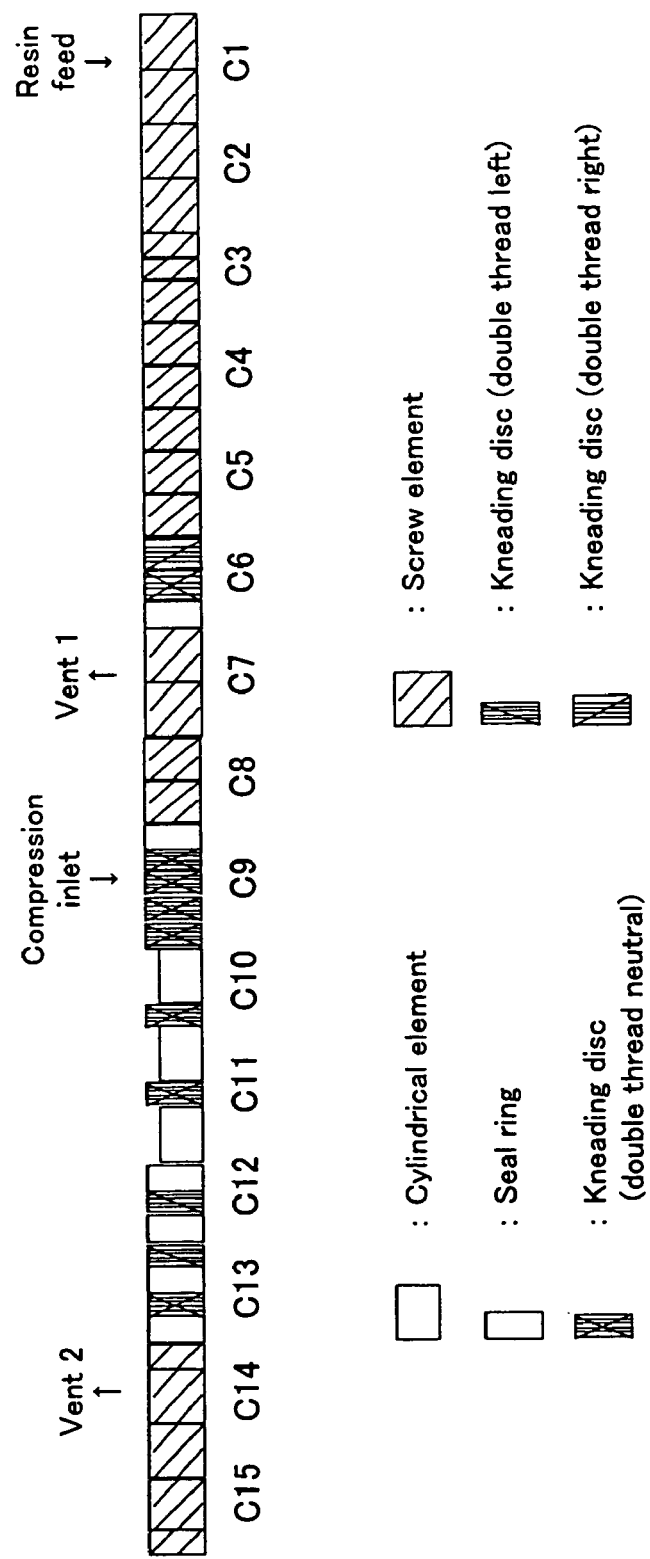
FIG. 1 is a schematic view of the constitution of the extruder used for producing the modified EVOHs (C) in Synthesis Examples 1, 5, 6 and 7.

The numerals in the drawings are explained below.
1 Preheating heater
2 Upper mold
3 Multilayer film
4 Lid material
5 Content (Sliced Ham)
6 Heat sealer
7 Lower mold
8,9 Tube for vacuuming
10 Table for heat sealer
11 Opening of container
12 PES/EVOH multilayer portion
13 PES monolayer portion
14 Leading edge
15 Pouring opening with a pull ring 16 Ring
17 Joint of ring and plug
18 Thin-walled portion for imparting easy-openability
19 Cap
20 Pouring opening
21 Hinge
22 Lid
23 Cap of container
24 Screw channel

BEST MODE FOR CARRYING OUT THE INVENTION

The invention will now be described in more detail with reference to the following Examples, but these Examples should not be construed to limit the invention at all. The analyses for EVOH (A), modified EVOH (C), EVOH (F) and resin composition were conducted according to the following methods.

(1) Ethylene Content and Degree of Saponification of EVOH (A) EVOH (F)

The ethylene content and the degree of saponification of EVOH were calculated based on the spectra obtained by $^1$H-NMR (nuclear magnetic resonance) measured using a deuterated dimethyl sulfoxide as a solvent ("JNM-GX-500Model" manufactured by JEOL Ltd. was used for measurement).

(2) Intrinsic Viscosity of EVOH (A)

0.20 g of dry pellets of dry EVOH (A) as a sample were weighed precisely. The pellets were dissolved in 40 ml of hydrous phenol (water/phenol=15/85: weight ratio) by heating at 60° C. for 3-4 hours and then measured with an Ostwald viscometer (t0=90 sec) at a temperature of 30° C. The intrinsic viscosity [η] was determined from the following formulae.

$[\eta] = (2 \times (\eta sp - 1 m rel))^{1/2} / C$ (L/g)

$\eta sp = t/t0 - 1$ (specific viscosity)

$\eta rel = t/t0$ (relative viscosity)

C: EVOH concentration (g/L)
t0: The time when a blank (hydrous phenol) passes the viscometer
t: The time when the hydrous phenol solution containing a dissolved sample passes the viscometer (3) Quantification of Contents of Acetic Acid in EVOH (A) and EVOH (F)

Into 100 ml of ion-exchange water were added 20 g of dried pellets of EVOH (A) as a sample, and the mixture was heated and extracted at 95° C. for 6 hours. The extract was subjected to neutralization titration with a 1/50 N aqueous NaOH solution using phenolphthalein as an indicator. Thus, the content of acetic acid was quantitatively determined.

(4) Quantifications of Na ion, K ion, Mg ion and Ca ion in EVOH (A), Modified EVOH (C) and EVOH (F)

Into 50 ml of a 0.01 N aqueous hydrochloric acid solution were added 10 g of dried pellets of EVOH (A) or modified EVOH (C) as a sample, and the mixture was stirred at 95° C. for 6 hours. The resulting solution after the stirring was quantitatively analyzed by ion chromatography and the amounts of ions of Na, K, Mg and Ca were determined. The used column was ICS-C25 manufactured by Yokogawa Electric Corporation, and the eluent was an aqueous solution containing tartaric acid of 5.0 mM and 2,6-pyridinedicarboxylic acid of 1.0 mM. For the quantifications, employed were calibration curves prepared for aqueous solutions of sodium chloride, potassium chloride, magnesium chloride, and calcium chloride.

(5) Quantifications of Phosphate ion and Trifluoromethane Sulfonate ion in EVOH (A), Modified EVOH (C) and EVOH (F)

Into 50 ml of a 0.01 N aqueous hydrochloric acid solution were added 10 g of dried pellets of EVOH (A) or modified EVOH (C) as a sample, and the mixture was stirred at 95° C. for 6 hours. The resulting solution after the stirring was quantitatively analyzed by ion chromatography and the amounts of phosphate ion and trifluoromethane sulfonate ion were determined. As the column, used was ICS-A23 (from Yokogawa Electric Corporation), for which the eluent was an aqueous solution containing sodium carbonate of 2.5 mM and sodium hydrogen carbonate of 1.0 mM. For the quantifications, employed were calibration curves prepared for aqueous solutions of sodium dihydrogenphosphate and sodium trifluoromethane sulfonate.

(6) Quantification of zinc ion and yttrium ion in Modified EVOH (C)

Into 50 ml of a 0.01 N aqueous hydrochloric acid solution were added 10 g of dried pellets of modified EVOH (C) as a sample, and the mixture was stirred at 95° C. for 6 hours. The aqueous solution after the stirring was analyzed by ICP emission analysis. As an apparatus, used was Optima 4300DV available from Perkin-Elmer Inc. As the measuring wavelength, used were 206.20 nm in the measurement of zinc ion and 360.07 nm in the measurement of yttrium ion. For the quantifications, employed were calibration curves prepared for standard solutions of zinc and yttrium, both commercially available.

(7) Melting Points of EVOH (A), Modified EVOH (C) and EVOH (F)

The measurements of the melting points of EVOH (A) and modified EVOH (C) were carried out according to JIS K7121 using a differential scanning calorimeter (DSC) RDC220/SSC5200H Model (manufactured by Seiko Instruments & Electronics Ltd.). For temperature calibration, used are indium and lead.

(8) Melt Flow Rates (MFR) of EVOH (A), Modified EVOH (C), EVOH (F) and Resin Composition The melt flow rates were measured by use of a melt indexer L244 (manufactured by Takara Industry). Concretely, chips of resin for measurement (EVOH (A), modified EVOH (C), EVOH (F) or resin composition) are filled into a cylinder having an inner diameter of 9.55 mm and a length of 162 mm, melted therein at 190° C. (in Example 10, melted at 210° C.). To the resulting resin melt, uniformly applied was a load of a plunger having a weight of 2,160 g and a diameter of 9.48 mm, by which the resin was extruded out of the cylinder through the center orifice having a diameter of 2.1 mm, whereupon the flow rate (g/10 min) of the resin melt being extruded out was measured. The measurement was used as the melt flow rate (MFR) of the resin.

SYNTHESIS EXAMPLE 1

100 parts by weight of hydrous pellets (water content: 130% (dry basis)) of an ethylene-vinyl alcohol copolymer having an ethylene content of 32 mol %, a degree of saponification of 99.6% and an intrinsic viscosity of 0.0882 L/g were immersed and stirred in 370 parts by weight of an aqueous solution containing acetic acid and potassium dihydrogenphosphate in amounts of 0.1 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 53 ppm, a phosphoric acid compound content of 20 ppm (in terms of phosphate radical) and an alkaline earth metal salt content of 0 ppm. In addition, the dry pellets had an MFR of 8 g/10 minutes (at 190° C., under 2160 g load). The EVOH thus obtained was used as an EVOH (A). Moreover, 1,2-epoxybutane was used as a monofunctional epoxy compound (B) having a molecular weight of not more than 500.

Using a TEM-35BS extruder (37 mmφ, L/D=52.5) manufactured by Toshiba Machine Co., Ltd., a screw constitution, vents and a compression inlet were arranged as shown in FIG. 1. Barrel C1 was cooled with water. Barrels C2-C3 were set at 200° C. and barrels C4-C15 were set at 240° C. The extruder was driven at a screw rotation speed of 400 rpm. The EVOH (A) was fed from a resin feed opening of C1 at a rate of 11 kg/hr and was molten. Then, water and oxygen were removed through vent 1 and 1,2-epoxybutane was fed from a compression inlet of C9 at a rate of 2.5 kg/hr (pressure during the feed: 6 MPa). After that, unreacted 1,2-epoxybutane was removed through vent 2 and a modified EVOH (C) was thereby obtained. The modified EVOH (C) obtained had an MFR of 2.5 g/10 minutes (at 190° C., under 2160 g load) and a melting point of 141° C.

The chemical structure of the thus obtained modified EVOH (C) modified with 1,2-epoxybutane was determined by trifluoroacetylating the modified EVOH (C) and then subjecting it to NMR measurement according to the following procedures. At this time, model compounds shown below were prepared and peaks in the NMR measurement chart of the modified EVOH (C) were assigned through comparison with the NMR measurement charts of the model compounds.

(1) Trifluoroacetylation and NMR Measurement of Modified EVOH (C)

Figure 3:
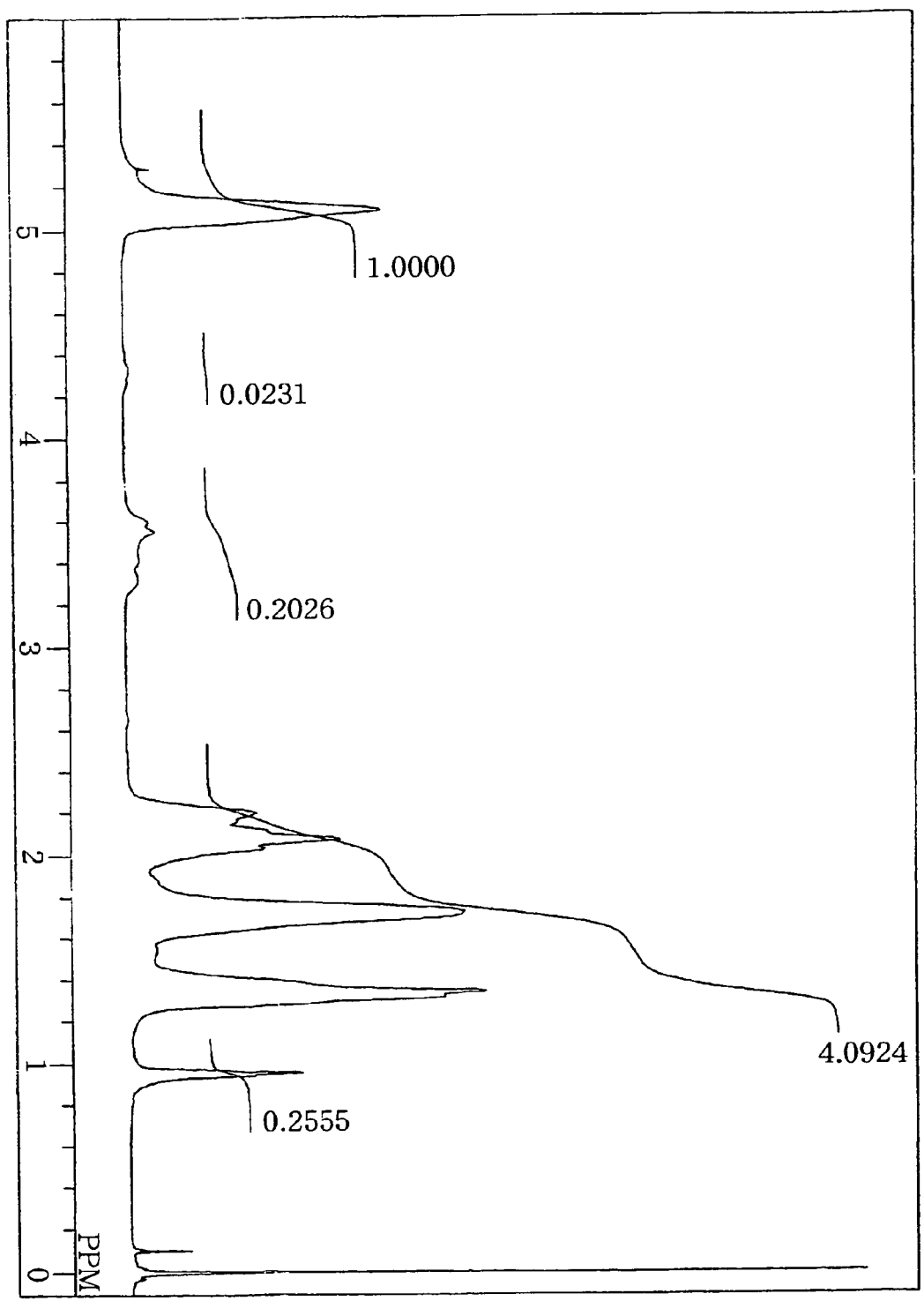
FIG. 3 is a $^1$H-NMR chart of the modified EVOH (C) obtained in Synthesis Example 1.

The modified ethylene-vinyl alcohol copolymer (C) prepared above was pulverized to a particle size not greater than 0.2 mm and 1 g of this powder was placed into a 100 ml eggplant type flask. Furthermore, 20 g of dichloromethane and 10 g of trifluoroacetic anhydride were added and stirred at room temperature. When one hour had passed since the beginning of the stirring, the polymer dissolved completely. After additional stirring for one hour since the complete dissolution of the polymer, the solvent was removed using a rotary evaporator. The resulting trifluoroacetylated modified ethylene-vinyl alcohol copolymer (C) was dissolved in a concentration of 2 g/L in a mixed solvent of deuterate chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart obtained is shown in FIG. 3.

(2) Synthesis of 1-isopropoxy-2-butanol and 1-(1-isopropoxy-2-butoxy)-2-butanol

Into a 1 L separable flask equipped with a stirrer and a condenser, 180 g of isopropanol and 216 g of epoxybutane were introduced. After filling with nitrogen, 1.6 g of sodium was added and then refluxed for 16 hours. After addition of 5 g of phosphoric acid to the mixture, 1-isopropoxy-2-butanol (boiling point: 100° C./120 mmHg) and 1-(1-isopropoxy-2-butoxy)-2-butanol (boiling point: 105° C./50 mmHg) were obtained by fractional distillation under reduced pressure. 1-isopropoxy-2-butanol thus obtained is a model compound in the case where one molecule of 1,2-epoxybutane reacted with a hydroxyl group of EVOH and 1-(1-isopropoxy-2-butoxy)-2-butanol is a model compound in the case where two or more molecules of 1,2-epoxybutane reacted with a hydroxyl group of EVOH.

(3) Synthesis and NMR Measurement of 1-isopropoxy-2-trifluoroacetoxy-butane

After introduction of 530 mg of 1-isopropoxy-2-butanol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2-trifluoroacetoxy-butane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 4.

Figure 5:
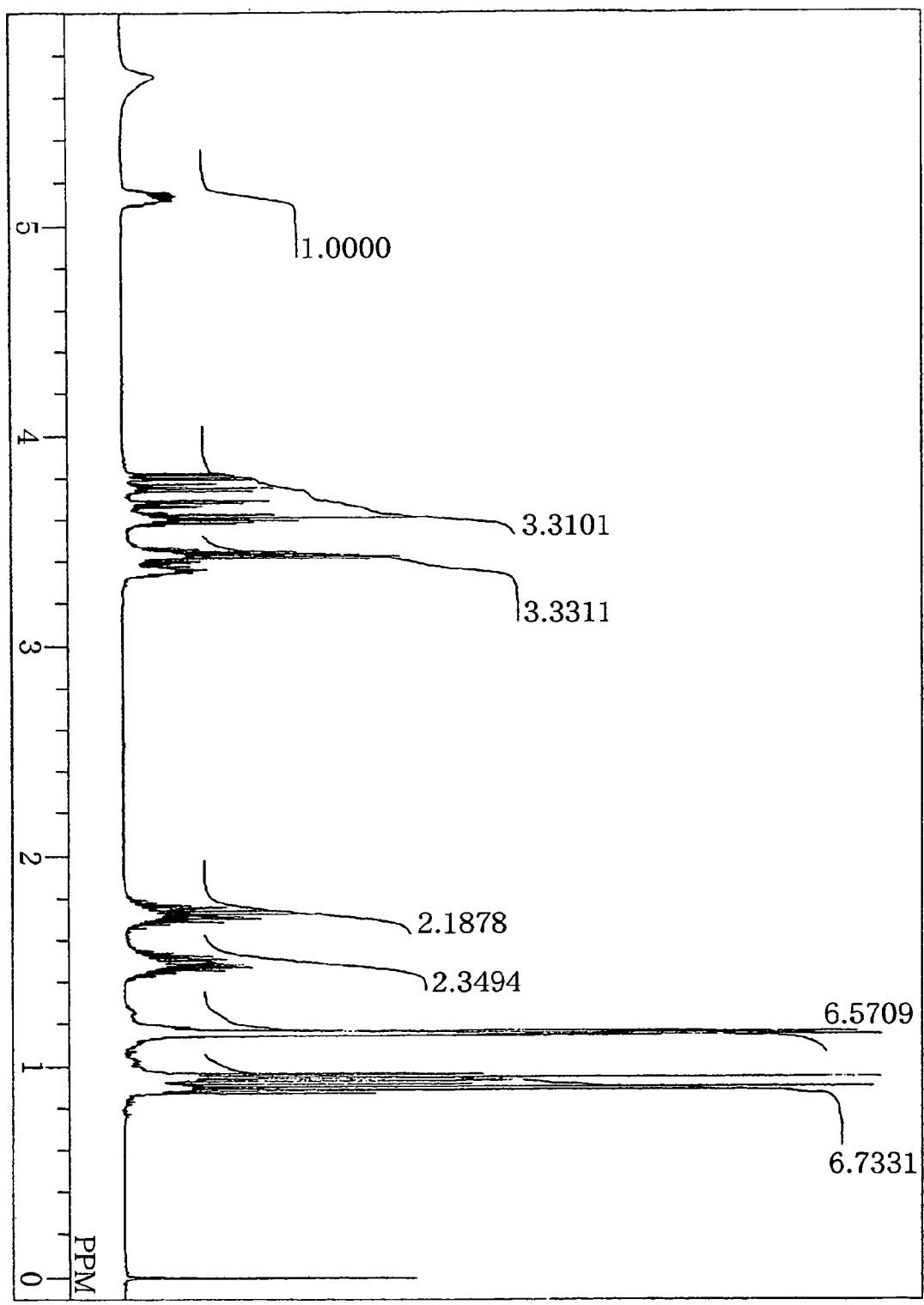
FIG. 5 is a $^1$H-NMR chart of 1-(1-isopropoxy-2-butoxy)-2-trifluoroacetoxy-butane, which is one of the model compounds.

(4) Synthesis and NMR Measurement of 1-(1-isopropoxy-2-butoxy)-2-trifluoroacetoxy-butane After introduction of 820 mg of 1-(1-isopropoxy-2-butoxy)-2-butanol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2-trifluoroacetoxy-butane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 5.

(5) Analysis of NMR Measurement Chart

Figure 4:
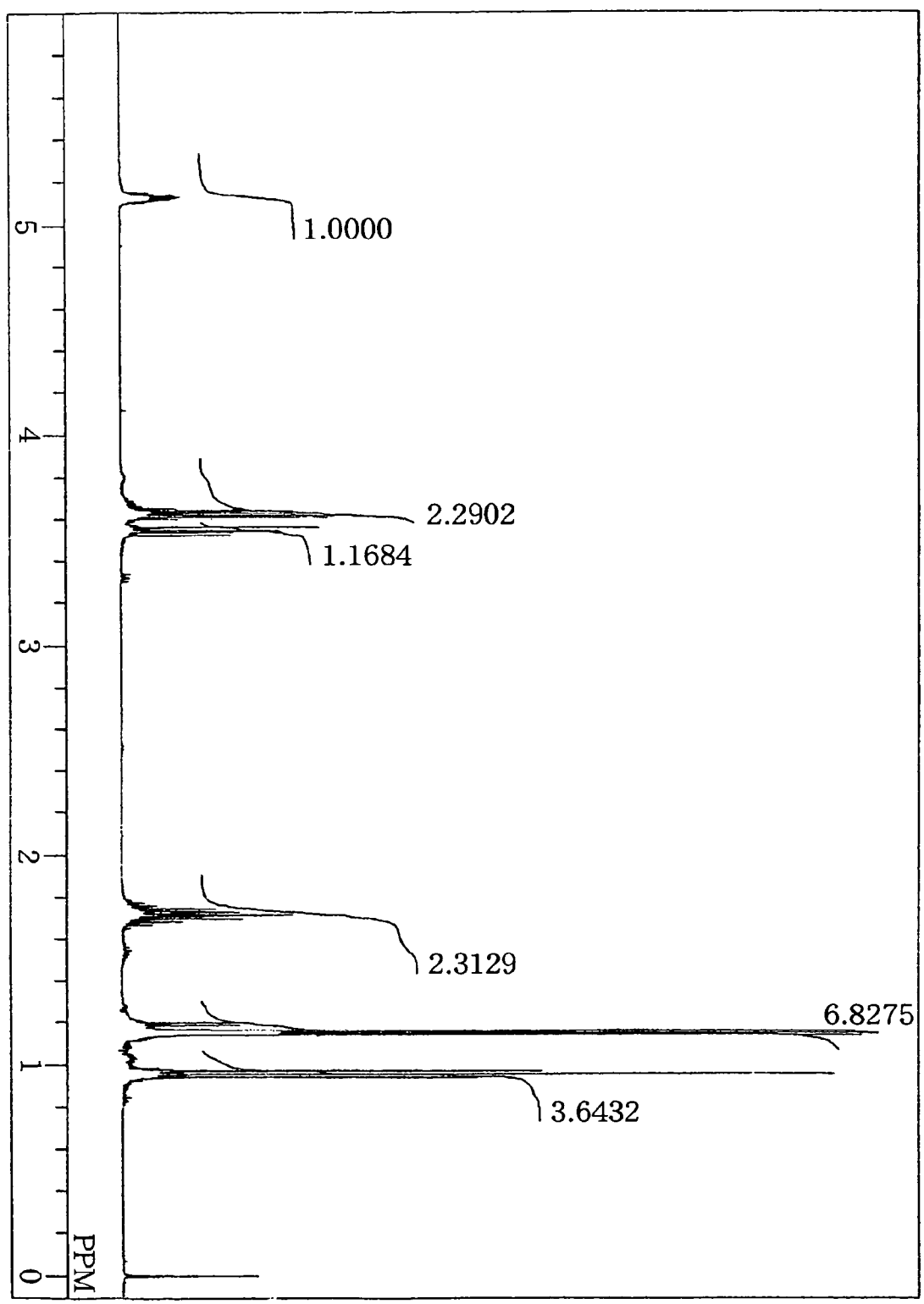
FIG. 4 is a $^1$H-NMR chart of 1-isopropoxy-2-trifluoroacetoxy-butane, which is one of the model compounds.

As is clear from FIG. 4, there was one signal due to methyl protons in the range of δ=0.8-1.1 ppm in the $^1$H-NMR of 1-isopropoxy-2-trifluoroacetoxy-butane. In addition, as is clear from FIG. 5, there were two signals due to methyl protons in the range of δ=0.8-1.1 ppm in the $^1$H-NMR of 1-(1-isopropoxy-2-butoxy)-2-trifluoroacetoxy-butane. On the other hand, as shown in FIG. 3, in the modified EVOH (C) prepared in Synthesis Example 1, there was one signal due to methyl protons in the range of δ=0.8-1.1 ppm; the modified EVOH (C) prepared in Synthesis Example 1 clearly had a structural unit (XII) shown below.

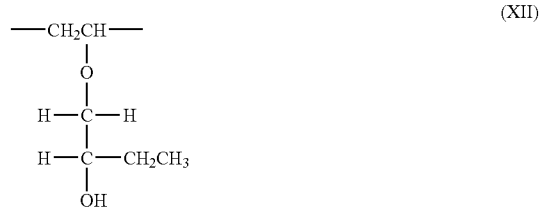

For the chemical structure in the modified EVOH (C) modified with 1,2-epoxybutane, the content of each structural unit shown below was determined.

w: Ethylene content (mol %)

x: Content (mol %) of unmodified vinyl alcohol unit y: Structural unit (mol %) represented by formula (XII) shown above z: Structural unit (mol %) represented by formula (XIII) shown below

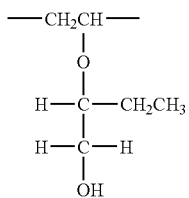

(XII)

There are relations represented by the following equations (1)-(4) for the w to z defined above.

$$4w+2x+4y+4z=A \quad (1)$$

$$3y+2z=B \quad (2)$$

$$2z=C \quad (3)$$

$$x+y=D \quad (4)$$

It is to be noted that in equations (1)-(4), each of A through D is an integral value of the signal(s) detected within the range shown below in the $^1$H-NMR measurement of the modified EVOH (C).

A: Integral value of signal(s) of δ=1.1-2.4 ppm
B: Integral value of signal(s) of δ=3.1-3.8 ppm
C: Integral value of signal(s) of δ=4.1-4.5 ppm
D: Integral value of signal(s) of δ=4.8-5.5 ppm From equations (1)-(4), the ethylene content of the modified EVOH (C) is determined as follows:

Ethylene content (mol %) of modified EVOH (C)={w/(w+x+y+z)}×100={(3A−2B−4C−6D)/(3A−2B+2C+6D)}×100

Similarly, the content of structural unit (I) of the modified EVOH (C) is determined as follows:

Content (mol %) of structural unit (I) in modified EVOH (C)={(y+z)/(w+x+y+z)}×100={(4B+2C)/(3A−2B+2C+6D)}×100

The modified EVOH (C) prepared in Synthesis Example 1 had an ethylene content of 32 mol % and a structural unit (I) content of 4.8 mol %. The production method and characteristics of the resulting modified EVOH (C) are summarized in Table 1.

SYNTHESIS EXAMPLE 2

Into a polyethylene bag, introduced was 5 kg of pellets of an EVOH having an ethylene content of 44 mol %, a degree of saponification of 99.8%, an intrinsic viscosity of 0.096 L/g and an MFR of 5 g/10 min (at 190° C. under a load of 2160 g) {acetic acid content: 53 ppm, sodium content: 1 ppm in terms of metal element, potassium content: 8 ppm in terms of metal element, phosphoric acid compound content: 20 ppm in terms of phosphate radical}. Then, an aqueous solution was prepared by dissolving 27.44 g (0.125 mol) of zinc acetate dihydrate and 15 g (0.1 mol) of trifluoromethane sulfonic acid in 500 g of water. The aqueous solution was added to the EVOH in the bag. The EVOH to which a catalyst solution had been added in the way described above was heated at 90° C. for 5 hours under occasional shaking with the opening of the bag closed. Thus the EVOH was impregnated with the catalyst solution. The resulting EVOH was dried at 90° C. under vacuum to yield an EVOH including a catalyst (D) containing zinc ion.

As EVOH (A), used was a blend obtained by dry blending 10 parts by weight of the EVOH including a catalyst (D) containing zinc ion to 90 parts by weight of the EVOH having an ethylene content of 44 mol %, a degree of saponification of 99.8% and an MFR of 5 g/10 min (at 190° C. under a load of 2160 g) (acetic acid content: 53 ppm, sodium content: 1 ppm in terms of metal element, potassium content: 8 ppm in terms of metal element, phosphoric acid compound content: 20 ppm in terms of phosphate radical). Moreover, 1,2-epoxybutane was used as a monofunctional epoxy compound (B) having a molecular weight of not more than 500.

Figure 2:
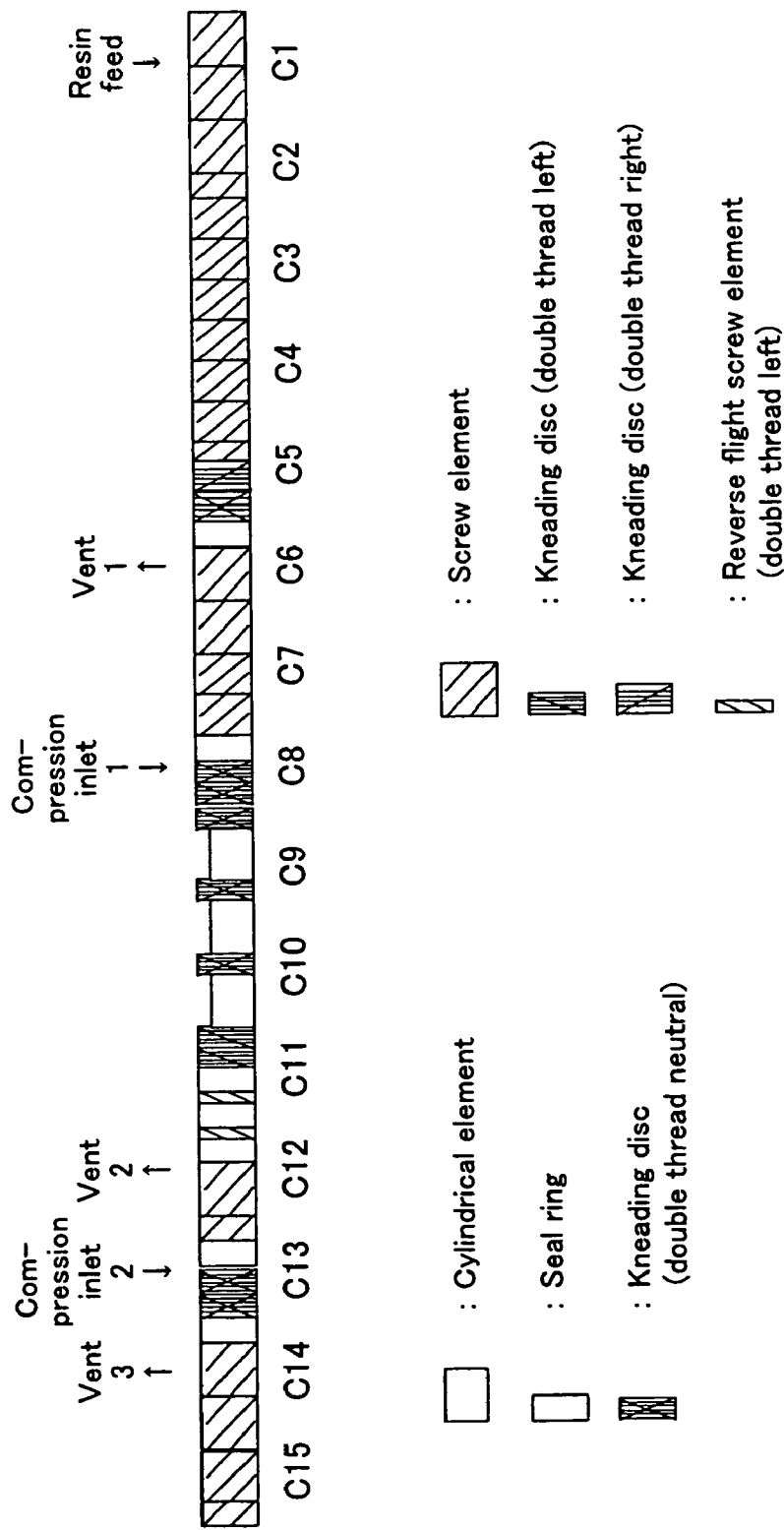
FIG. 2 is a schematic view of the constitution of the extruder used for producing the modified EVOHs (C) in Synthesis Examples 2, 3 and 4.

TEM-35BS extruder (37 mmφ, L/D=52.5) manufactured by Toshiba Machine Co., Ltd. was used, and screw constitution, vents and compression inlets were arranged as shown in FIG. 2. Barrel C1 was cooled with water. Barrels C2-C3 were set at 200° C. and barrels C4-C15 were set at 220° C. The extruder was driven at a screw rotation speed of 200 rpm. The EVOH (A) comprising the dry blended mixture and containing the catalyst (D) was fed from a resin feed opening of C1 at a rate of 11 kg/hr. Then, the inner pressure at vent 1 was reduced to 60 mmHg and epoxybutane was fed through a compression inlet of C8 at a rate of 2.5 kg/hr (pressure during the feed: 3.5 MPa). The inner pressure at vent 2 was reduced to 200 mmHg to remove unreacted epoxybutane. An aqueous trisodium ethylenediaminetetraacetate trihydrate solution of a concentration of 8.2% by weight was added through a compression inlet 2 of C13 at a rate of 0.14 kg/hr.

The mixing ratio of the monofunctional epoxy compounds (B) during the melt-kneading operation was 22.7 parts by weight per 100 parts by weight of the EVOH (A). The catalyst (D) was added in an amount of 2.5 μmol/g in terms of molar number of metal ion based on the weight of the EVOH (A). The ratio (E/D) of the molar number of the catalyst deactivator (E) to the molar number of the metal ion contained in the catalyst (D) was 1.

The inner pressure at vent 3 was reduced to 20 mmHg and the moisture was thereby removed. Thus, a modified EVOH (C) was obtained. The above-mentioned modified EVOH (C) obtained had an MFR of 5 g/10 min (at 190° C. under a load of 2160 g) and a melting point of 109° C. The zinc ion content was 150 ppm (2.3 μmol/g) and the alkali metal salt content was 168 ppm (7.1 μmol/g) in terms of metal elements [sodium: 160 ppm (6.9 μmol/g); potassium: 8 ppm (0.2 μmol/g)]. The trifluoromethane sulfonic acid ion content was 270 ppm (1.8 μmol/g). The alkali metal ion content was 3.9 times (in molar ratio) the trifluoromethane sulfonic acid ion.

The thus obtained modified EVOH (C) had an ethylene content of 44 mol % and a structural unit (I) content of 7 mol %. The production method and characteristics of the resulting modified EVOH (C) are summarized in Table 1.

SYNTHESIS EXAMPLE 3

A mixed solution was obtained by mixing 28 parts by weight of zinc acetylacetonato monohydrate and 957 parts by weight of 1,2-dimethoxyethane. To the resulting mixed solution, 15 parts by weight of trifluoromethane sulfonic acid was added under stirring, yielding a solution containing a catalyst (D). In other words, prepared was a solution in which 1 mol of trifluoromethane sulfonic acid was mixed per 1 mol of zinc acetylacetonato monohydrate.

100 parts by weight of hydrous pellets (water content: 130% (dry basis)) of an ethylene-vinyl alcohol copolymer having an ethylene content of 32 mol %, a degree of saponification of 99.6% and an intrinsic viscosity of 0.0882 L/g were immersed and stirred in 370 parts by weight of an aqueous solution containing acetic acid and potassium dihydrogenphosphate in amounts of 0.1 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 53 ppm, a phosphoric acid compound content of 20 ppm (in terms of phosphate radical) and an alkaline earth metal salt (Mg salt or Ca salt) content of 0 ppm. In addition, the dry pellets had an MFR of 8 g/10 min (at 190° C. under a load of 2160 g). The EVOH thus obtained was used as an EVOH (A). Moreover, epoxypropane was used as a monofunctional epoxy compound (B) having a molecular weight of not more than 500.

Using a TEM-35BS extruder (37 mmφ, L/D=52.5) manufactured by Toshiba Machine Co., Ltd., a screw constitution, vents and compression inlets were arranged as shown in FIG. 2. Barrel C1 was cooled with water. Barrels C2-C15 were set at 200° C. The extruder was driven at a screw rotation speed of 250 rpm. The EVOH (A) was fed from a resin feed opening of C1 at a rate of 11 kg/hr. The inner pressure at vent 1 was reduced to 60 mmHg. Epoxypropane and the solution of the catalyst (D) prepared by the method mentioned above were fed through a compression inlet of C8 after mixing thereof so that the epoxypropane and the catalyst solution were fed at rates of 1.5 kg/hr and 0.22 kg/hr, respectively (pressure during the feed: 3 MPa). Subsequently, unreacted epoxypropane was removed through vent 2 under atmospheric pressure and then an aqueous trisodium ethylenediaminetetraacetate trihydrate solution of a concentration of 8.2% by weight was added as a catalyst deactivator (E) through a compression inlet 2 of C13 at a rate of 0.11 kg/hr.

The mixing ratio of the monofunctional epoxy compounds (B) during the melt-kneading operation was 13.6 part by weight per 100 parts by weight of the EVOH (A). The catalyst (D) was added in an amount of 2 μmol/g, in terms of molar number of metal ion based on the weight of the EVOH (A). The ratio (E/D) of the molar number of the catalyst deactivator (E) to the molar number of the metal ion contained in the catalyst (D) was 1.

The inner pressure at vent 3 was reduced to 20 mmHg and the moisture was thereby removed. Thus, a modified EVOH (C) was obtained. The modified EVOH (C) obtained had an MFR of 7 g/10 min (at 190° C. under a load of 2160 g) and a melting point of 132° C. The zinc ion content was 120 ppm (1.9 μmol/g) and the alkali metal salt content was 138 ppm (5.9 μmol/g) in terms of metal elements [sodium: 130 ppm (5.7 μmol/g); potassium: 8 ppm (0.2 μmol/g)]. The trifluoromethane sulfonic acid ion content was 280 ppm (1.9 μmol/g). The alkali metal ion content was 3.1 times (in molar ratio) the trifluoromethane sulfonic acid ion.

The chemical structure of the thus obtained modified EVOH (C) modified with epoxypropane was determined by trifluoroacetylating the modified EVOH (C) and then subjecting it to NMR measurement according to the following procedures.

Figure 8:
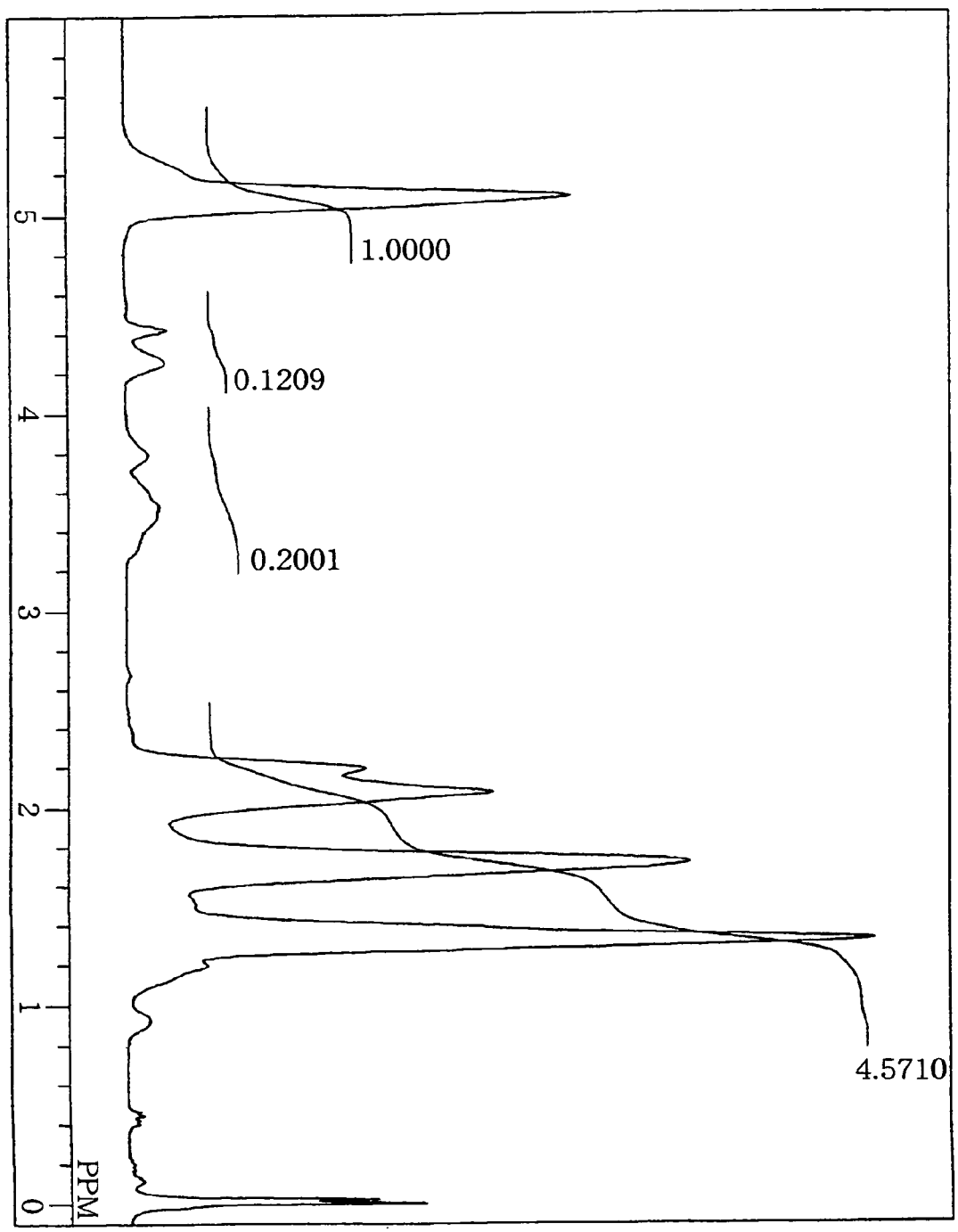
FIG. 8 is a $^1$H-NMR chart of the modified EVOH (C) obtained in Synthesis Example 3.

The modified EVOH (C) prepared above was pulverized to a particle size not greater than 0.2 mm and 1 g of this powder was placed into a 100 ml eggplant type flask. Furthermore, 20 g of dichloromethane and 10 g of trifluoroacetic anhydride were added and stirred at room temperature. When one hour had passed since the beginning of the stirring, the modified EVOH (C) dissolved completely. After additional stirring for one hour since the complete dissolution of the modified EVOH (C), the solvent was removed using a rotary evaporator. The resulting trifluoroacetylated modified EVOH (C) was dissolved in a concentration of 2 g/L in a mixed solvent of deuterated chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart is shown in FIG. 8.

For the chemical structure in the modified EVOH (C) modified with epoxypropane, the content of each structural unit shown below was determined.

w: Ethylene content (mol %):
x: Content (mol %) of unmodified vinyl alcohol unit
y: Structural unit (mol %) represented by formula (XVI) shown below
z: Structural unit (mol %) represented by formula (XVII) shown below

(XVI)

(XVII)

There are relations represented by the following equations (9)-(12) for the w to z defined above.

$$4w+2x+5y+5z=A \quad (9)$$

$$3y+2z=B \quad (10)$$

$$2z=C \quad (11)$$

$$x+y=D \quad (12)$$

It is to be noted that in equations (9)-(12), each of A through D is an integral value of the signal(s) detected within the range shown below in the $^1$H-NMR measurement of the modified EVOH (C).

A: Integral value of signal(s) of δ 1.1-2.5 ppm
B: Integral value of signal(s) of δ 3.1-4 ppm
C: Integral value of signal(s) of δ 4.1-4.6 ppm
D: Integral value of signal(s) of δ 4.8-5.6 ppm From equations (9)-(12), the ethylene content of the modified EVOH (C) is determined as follows:

Ethylene content (mol %) of modified EVOH (C)={w/(w+x+y+z)}×100={(2A−2B−3C−4D)/(2A−2B+C+4D)}×100

Similarly, the content of structural unit (I) of the modified EVOH (C) is determined as follows:

Content (mol %) of structural unit (I) in modified EVOH (C) ={(y+z)/(w+x+y+z)}×100={(8B+4C)/(6A−6B+3C+12D)}×100

The modified EVOH (C) prepared in Synthesis Example 3 had an ethylene content of 32 mol % and a structural unit (I) content of 5.5 mol %. The production method and characteristics of the resulting modified EVOH (C) are summarized in Table 1.

SYNTHESIS EXAMPLE 4

Pellets of an EVOH having an ethylene content of 44 mol %, a degree of saponification of 99.8%, an intrinsic viscosity of 0.096 L/g and an MFR of 5 g/10 min (at 190° C. under a load of 2160 g) (acetic acid content: 53 ppm, sodium content: 1 ppm in terms of metal element, potassium content: 8 ppm in terms of metal element, phosphoric acid compound content: 20 ppm in terms of phosphate radical) were used as EVOH (A). Epoxypropane was used monofunctional compound (B) having a molecular weight of not more than 500.

Using a TEM-35BS extruder (37 mmφ, L/D=52.5) manufactured by Toshiba Machine Co., Ltd., a screw constitution, vents and compression inlets were arranged as shown in FIG. 2. Barrel C1 was cooled with water. Barrels C2-C15 were set at 220° C. The extruder was driven at a screw rotation speed of 250 rpm. The EVOH (A) was fed from a resin feed opening of C1 at a rate of 11 kg/hr. The inner pressure at vent 1 was reduced to 60 mmHg. Epoxypropane and the solution of the catalyst (D) prepared by the method mentioned above were fed through a compression inlet of C8 after mixing thereof so that the epoxypropane and the solution of the catalyst (D) prepared in the same method as Synthesis Example 3 were fed at rates of 2.0 kg/hr and 0.22 kg/hr, respectively (pressure during the feed: 3 MPa). Subsequently, unreacted epoxypropane was removed through vent 2 under atmospheric pressure and then an aqueous trisodium ethylenediaminetetraacetate trihydrate solution of a concentration of 8.2% by weight was added as a catalyst deactivator (E) through a compression inlet 2 of C13 at a rate of 0.11 kg/hr.

The mixing ratio of the monofunctional epoxy compounds (B) during the melt-kneading operation was 18.3 parts by weight per 100 parts by weight of the EVOH (A). The catalyst (D) was added in an amount of 2 μmol/g in terms of molar number of metal ion based on the weight of the EVOH (A). The ratio (E/D) of the molar number of the catalyst deactivator (E) to the molar number of the metal ion contained in the catalyst (D) was 1.

The inner pressure at vent 3 was reduced to 20 mmHg and the moisture was thereby removed. Thus, a modified EVOH (C) was obtained. The above-mentioned modified EVOH (C) obtained had an MFR of 5 g/10 min (at 190° C. under a load of 2160 g) and a melting point of 105° C. The zinc ion content was 120 ppm (1.9 μmol/g) and the alkali metal salt content was 138 ppm (5.9 μmol/g) in terms of metal elements [sodium: 130 ppm (5.7 μmol/g); potassium: 8 ppm (0.2 μmol/g)]. The trifluoromethane sulfonic acid ion content was 280 ppm (1.9 μmol/g). The alkali metal ion content was 3.1 times (in molar ratio) the trifluoromethane sulfonic acid ion. The thus obtained modified EVOH (C) had an ethylene content of 44 mol % and a structural unit (I) content of 8 mol %. The production method and characteristics of the resulting modified EVOH (C) are summarized in Table 1.

SYNTHESIS EXAMPLE 5

A modified EVOH (C) having an MFR of 1.8 g/10 min (at 190° C. under a load of 2160 g) and a melting point of 135° C. was obtained by performing extrusion under the same conditions as Example 1 except changing, in Example 1, the feed rate of the EVOH (A) from the resin feed opening of C1 to 15 kg/hr and feeding glycidol in place of 1,2-epoxybutane as a monofunctional epoxy compound having a molecular weight of not more than 500 at a rate of 2.5 kg/hr from the compression inlet of C9.

The chemical structure of the thus obtained modified EVOH (C) modified with glycidol was determined by trifluoroacetylating the modified EVOH (C) and then subjecting it to NMR measurement according to the following procedures. At this time, model compounds shown below were prepared and peaks in the NMR measurement chart of the modified EVOH (C) were assigned through comparison with the NMR measurement charts of the model compounds.

(1) Trifluoroacetylation and NMR Measurement of Modified EVOH (C)

Figure 6:
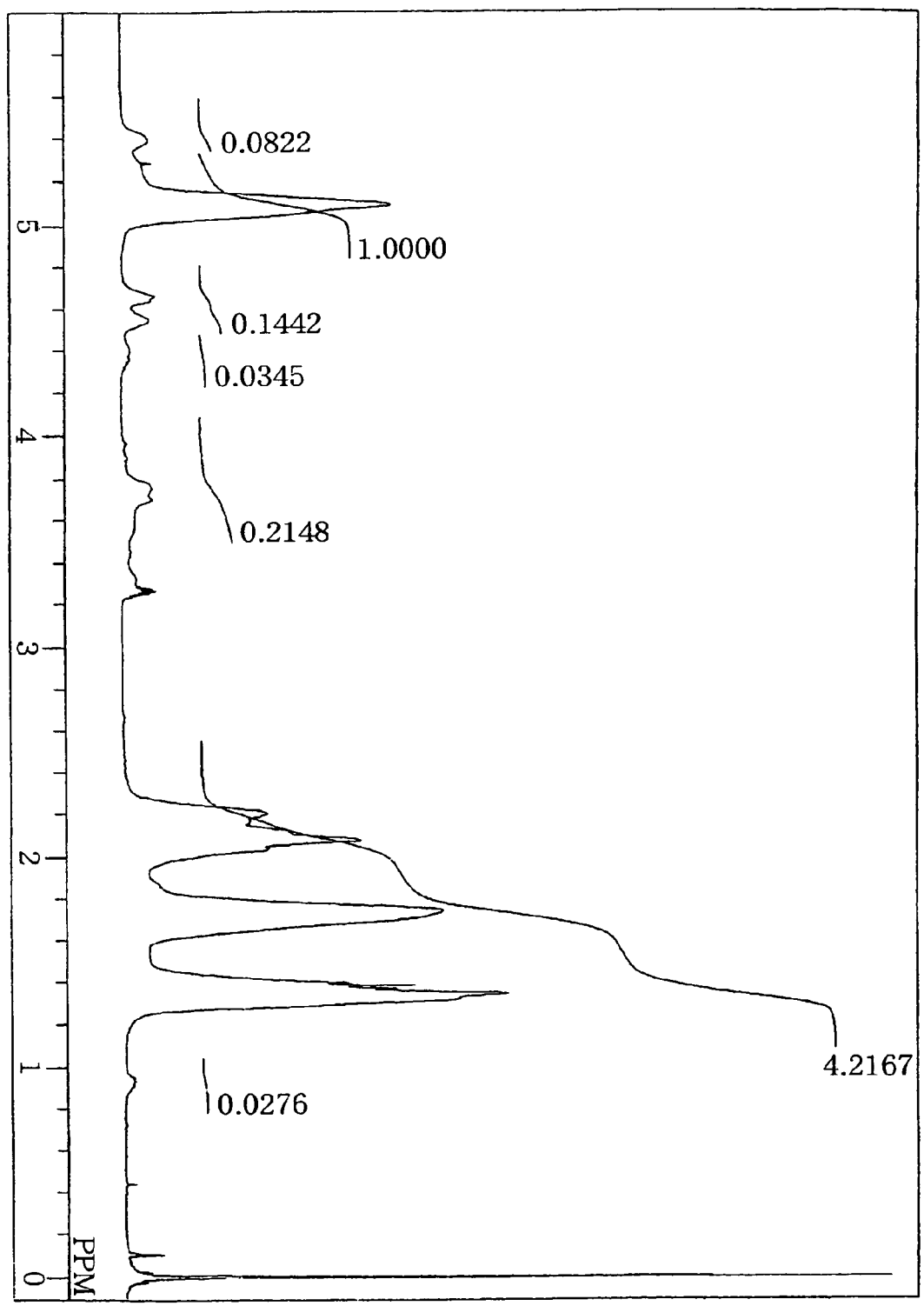
FIG. 6 is a $^1$H-NMR chart of the modified EVOH (C) obtained in Synthesis Example 5.

The modified ethylene-vinyl alcohol copolymer (C) prepared above was pulverized to a particle size not greater than 0.2 mm and 1 g of this powder was placed into a 100-ml eggplant type flask. Furthermore, 20 g of dichloromethane and 10 g of trifluoroacetic anhydride were added and stirred at room temperature. When one hour had passed since the beginning of the stirring, the polymer dissolved completely. After additional stirring for one hour since the complete dissolution of the polymer, the solvent was removed using a rotary evaporator. The resulting trifluoroacetylated modified ethylene-vinyl alcohol copolymer (C) was dissolved in a concentration of 2 g/L in a mixed solvent of deuterated chloroform and trifluoroacetic anhydride (deuterated chloroform/trifluoroacetic anhydride=2/1 (weight ratio)) and was subjected to 500 MHz $^1$H-NMR measurement using tetramethylsilane as an internal standard. The NMR measurement chart obtained is shown in FIG. 6.

(2) Synthesis of 3-isopropoxy-1,2-propanediol

Into a 3-L separable flask equipped with a stirrer and a condenser, 1200 g of isopropanol was introduced. Then 4.6 g of sodium was added and heated to 80° C. to dissolve. After complete dissolution of the sodium, 300 g of glycidol was dropped at 80° C. over 1 hour. After completion of the dropping, stirring was conducted for 3 hours. Then the stirring was stopped and the mixture was cooled to room temperature. At this time, the mixture separated into an upper layer and a lower layer. The upper layer was isolated and concentrated by an evaporator. Furthermore, 3-isopropoxy-1,2-propanediol (boiling point: 60° C./2 mmHg) was obtained through distillation under reduced pressure. 3-Isopropoxy-1,2-propanediol thus obtained is a model compound in the case where one molecule of glycidol reacted with a hydroxyl group of EVOH.

(3) Synthesis and NMR Measurement of 1-isopropoxy-2,3-ditrifluoroacetoxy-propane After introduction of 270 mg of 3-isopropoxy-1,2-propanediol prepared above and 5 g of dichloromethane into a 20 ml eggplant type flask, 1.7 g of trifluoroacetic anhydride was added. After stirring at room temperature for one hour, the solvent was removed using a rotary evaporator. The resulting 1-isopropoxy-2,3-ditrifluoroacetoxy-propane was subjected to 500 MHz $^1$H-NMR measurement using, as a solvent, a mixed solvent of deuterated chloroform and trifluoroacetic anhydride (deuterated chloroform/trifluoroacetic anhydride=2/1 (weight ratio)). The NMR measurement chart obtained is shown in FIG. 7.

(4) Analysis of NMR Measurement Chart

Figure 7:
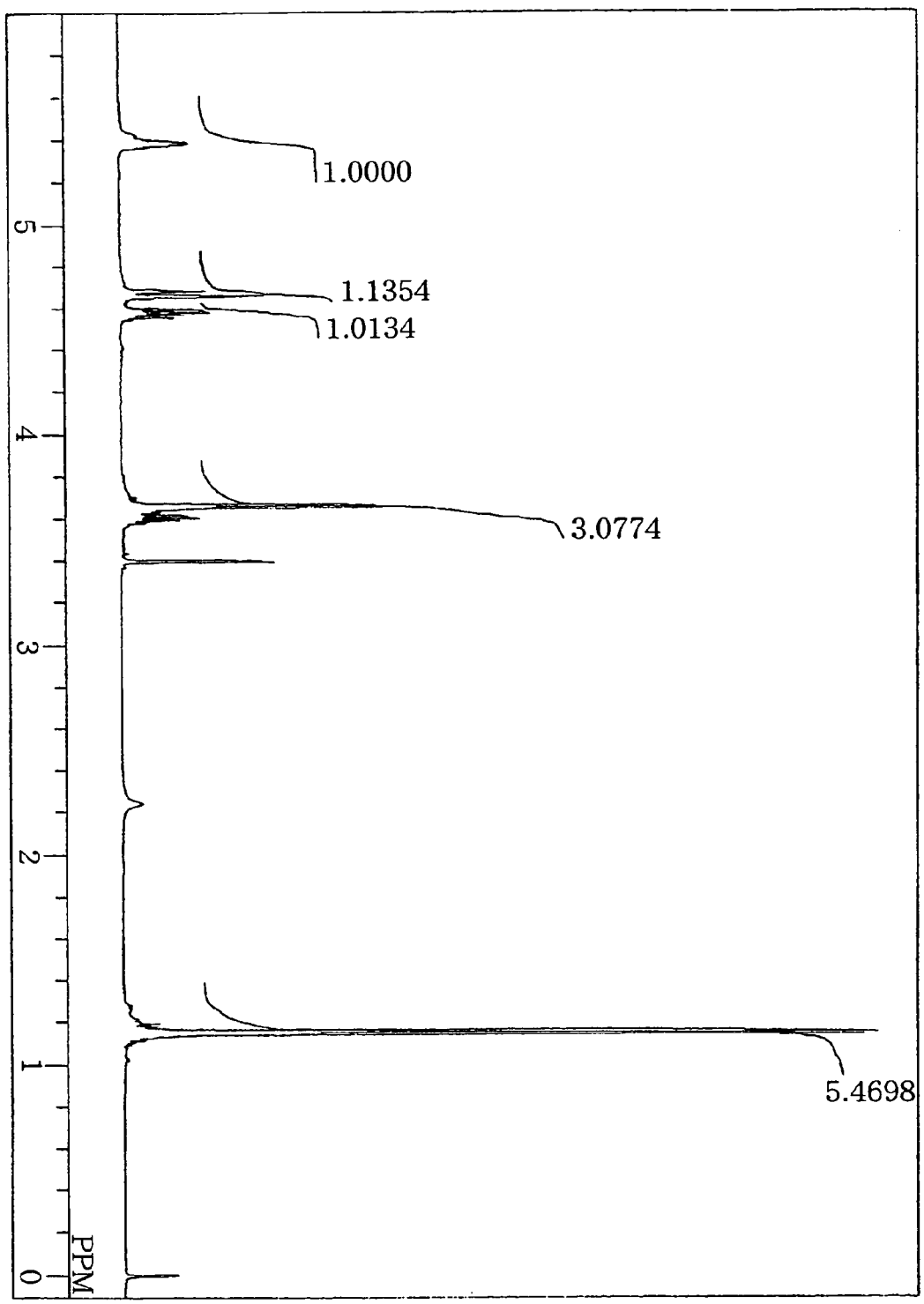
FIG. 7 is a $^1$H-NMR chart of 1-isopropoxy-2,3-ditrifluoroacetoxy-propane, which is one of the model compounds.

As is clear from a comparison of FIG. 6 to FIG. 7, the $^1$H-NMR of the model compound 1-isopropoxy-2,3-ditrifluoroacetoxy-propane and the $^1$H-NMR of the modified EVOH (C) prepared in Synthesis Example 5 had common characteristic signals at δ 3.5-3.9 ppm, 4.5-4.8 ppm and 5.3-5.5 ppm. When comparing 1-isopropoxy-2,3-ditrifluoroacetoxy-propane as the model compound to the modified EVOH (C) prepared in Synthesis Example 5, the ratio of an integral value of a signal at δ 3.5-3.9 ppm to an integral value of a signal at δ 4.5-4.8 ppm was about 3:2 for both compounds, which agreed very well with respect to the ratio. The facts described above clearly show that the modified EVOH (C) obtained in Synthesis Example 5 has the structural unit (XIV) shown below.

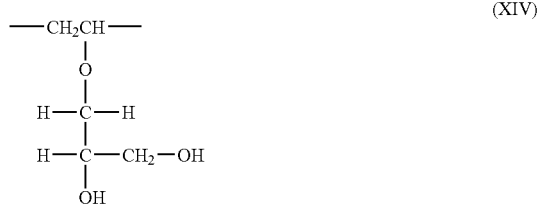

(XIV)

For the chemical structure in the modified EVOH (C) modified with glycidol, the content of each structural unit shown below was determined.

w: Ethylene content (mol %):
x: Content (mol %) of unmodified vinyl alcohol unit
y: Structural unit (mol %) represented by formula (XIV) shown above
z: Structural unit (mol %) represented by formula (XV) shown below

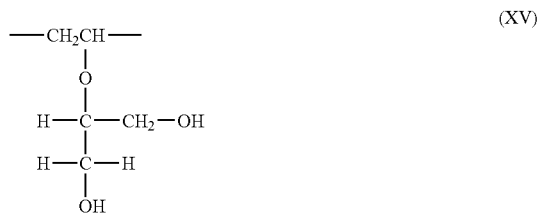

(XV)

There are relations represented by the following equations (5)-(8) for the w to z defined above.

$$4w+2x+2y+2z=A \quad (5)$$

$$4z=B \quad (6)$$

$$2y=C \quad (7)$$

$$x+y=D \quad (8)$$

It is to be noted that in equations (5)-(8), each of A through D is an integral value of the signal(s) detected within the range shown below in the $^1$H-NMR measurement of the modified EVOH (C).

A: Integral value of signal(s) of δ 1.1-2.4 ppm
B: Integral value of signal(s) of δ 4.2-4.5 ppm
C: Integral value of signal(s) of δ 4.5-4.8 ppm
D: Integral value of signal(s) of δ 4.8-5.6 ppm From equations (5)-(8), the ethylene content of the modified EVOH (C) is determined as follows:

Ethylene content (mol %) of modified EVOH (C)={w/(w+x+y+z)}×100={(2A−B−4D)/(2A+B+4D)}×100

Similarly, the content of structural unit (I) of the modified EVOH (C) is determined as follows:

Content (mol %) of structural unit (I) in modified EVOH (C)={(y+z)/(w+x+y+z)}×100={(2B+4C)/(2A+B+4D)}×100

The modified EVOH (C) prepared in Synthesis Example 5 had an ethylene content of 32 mol % and a structural unit (I) content of 5 mol %. The production method and characteristics of the resulting modified EVOH (C) are summarized in Table 1.

SYNTHESIS EXAMPLE 6

100 parts by weight of hydrous pellets (water content: 130% (dry basis)) of an ethylene-vinyl alcohol copolymer having an ethylene content of 44 mol %, a degree of saponification of 99.6% and an intrinsic viscosity of 0.0855 L/g were immersed and stirred in 370 parts by weight of an aqueous solution containing acetic acid and potassium dihydrogenphosphate in amounts of 0.12 g/L and 0.044 g/L, respectively, at 25° C. for 6 hours. The pellets obtained were dried at 105° C. for 20 hours, resulting in dry EVOH pellets. The dry EVOH pellets had a potassium content of 8 ppm (in terms of metal element), an acetic acid content of 62 ppm, a phosphoric acid compound content of 20 ppm (in terms of phosphate radical) and an alkaline earth metal salt content of 0 ppm. In addition, the dry pellets had an MFR of 12 g/10 min (at 190° C. under a load of 2160 g). The EVOH thus obtained was used as an EVOH (A). Moreover, glycidol was used as an epoxy compound (B).

Using a TEM-35BS extruder (37 mmφ, L/D=52.5) manufactured by Toshiba Machine Co., Ltd., a screw constitution, vents and a compression inlet were arranged as shown in FIG. 1. Barrel C1 was cooled with water. Barrels C2-C3 were set at 200° C. and barrels C4-C15 were set at 240° C. The extruder was driven at a screw rotation speed of 400 rpm. The EVOH (A) was fed from a resin feed opening of C1 at a rate of 15 kg/hr and was molten. Then, water and oxygen were removed through vent 1 and glycidol was fed through a compression inlet of C9 at a rate of 2.5 kg/hr (pressure during the feed: 7 MPa). After that, unreacted glycidol was removed through vent 2, yielding a modified EVOH (C) comprising a modified EVOH (C) having an MFR of 1.6 g/10 min (at 190° C. under a load of 2160 g), a structural unit (I) content of 6 mol % and a melting point of 127° C. The production method and characteristics of the resulting modified EVOH (C) are summarized in Table 1.

SYNTHESIS EXAMPLE 7

An EVOH modified with bisphenol A diglycidyl ether having an MFR of 2.5 g/10 min (at 190° C. under a load of 2160 g) was obtained by performing extrusion under the same conditions as Synthesis Example 1 except changing, in Synthesis Example 1, the feed rate of the EVOH (A) from the resin feed opening of C1 to 15 kg/hr and feeding bisphenol A diglycidyl ether (manufactured by Tokyo Kasei Kogyo Co., Ltd.) at a rate of 120 g/hr in place of epoxybutane from the compression inlet of C9. The production method and characteristics of the resulting modified EVOH are summarized in Table 1.

TABLE 1

| | MFR of EVOH (A) (g/10 min) | Epoxy compound (B) | Blending amount of (B) *1) (part by weight) | Metal ion of catalyst (D) | Melt kneading temperature (° C.) | Ethylene content (mol %) | Structural unit (I) content (mol %) | Melting point (° C.) | MFR (g/10 min) |
|---|---|---|---|---|---|---|---|---|---|
| Synthesis Example 1 | 8 | 1,2-Epoxybutane | 22.7 | No catalyst | 240 | 32 | 4.8 | 141 | 2.5 |
| Synthesis Example 2 | 5 | 1,2-Epoxybutane | 22.7 | Zinc ion | 220 | 44 | 7 | 109 | 5 |
| Synthesis Example 3 | 8 | Epoxypropane | 13.6 | Zinc ion | 200 | 32 | 5.5 | 132 | 7 |
| Synthesis Example 4 | 5 | Epoxypropane | 18.3 | Zinc ion | 220 | 44 | 8 | 105 | 5 |
| Synthesis Example 5 | 8 | Glycidol | 16.7 | No catalyst | 240 | 32 | 5 | 135 | 1.8 |
| Synthesis Example 6 | 12 | Glycidol | 16.7 | No catalyst | 240 | 44 | 6 | 127 | 1.6 |
| Synthesis Example 7 | 8 | *2) | 0.8 | No catalyst | 240 | 32 | *3) | *3) | 2.5 |

*1) The amount of epoxy compound (B) in part by weight based on 100 parts by weight of EVOH (A).
*2) Bisphenol A diglycidyl ether
*3) Not measured

EXAMPLE 1

(1) Production of Resin Composition 80 parts by weight of EVOH (F) having an ethylene content of 32 mol %, a degree of saponification of 99.9%, a melt flow rate (at 190° C. under a load of 2160 g) of 1.6 g/10 min and a melting point of 183° C. and 20 parts by weight of modified EVOH (C) prepared in Synthesis Example 1 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then hot air drying was carried out at 80° C. for 16 hour, yielding a resin composition. The contents of phosphoric acid compound (in terms of phosphate radical), acetic acid, and Na ion (in terms of metal element) in the EVOH (F) were measured to be 50 ppm, 300 ppm and 200 ppm, respectively. The melt flow rate (at 190° C. under a load of 2160 g) of the resin composition was 1.9 g/10 min.

(2) Preparation of Monolayer Film

Using the thus-obtained resin composition, film formation was carried out under the extrusion conditions shown below by means of a film forming machine composed of a 40φ extruder (PLABOR GT-40-A manufactured by Research Laboratory Of Plastics Technology Co., Ltd.) and a T-die. Thus, a monolayer film of 25 μm in thickness was obtained.
Type: Single screw extruder (non-vent type)
L/D: 24
Bore diameter: 40 mmφ
Screw: Single-thread full-flight type, nitrided surface steel
Screw rotation speed: 40 rpm
Die: Coat hanger die of 550 mm in width
Gap between lips: 0.3 mm
Temperatures Set for Cylinders and Die: C1/C2/C3/adaptor/die=180/200/210/210/210 (° C.)

Using the monolayer film prepared above, an oxygen transmission rate, a carbon dioxide gas transmission rate, a Young's modulus, a tensile strength at yield, a tensile elongation at break and a haze were measured and a flexing resistance test was carried out according to following methods shown below.

(2-1) Measurement of Oxygen Transmission Rate

The monolayer film prepared above was moisture conditioned at 20° C. and 65% RH for 5 days. For two samples of the moisture-conditioned monolayer film, oxygen transmission rates were measured using an apparatus, MOCON OX-TRAN 2/20, manufactured by Modern Control, Inc. according to JIS K7126 (Equal Pressure Method) under a 20° C. and 65% RH condition and the average thereof was calculated. The oxygen transmission rate was 0.5 cc·20 μm/m²·day·atm and a good gas barrier property was shown.

(2-2) Measurement of Carbon Dioxide Gas Transmission Rate

The monolayer film prepared above was moisture conditioned at 20° C. and 65% RH for 5 days. For two samples of the moisture-conditioned film, carbon dioxide gas transmission rates were measured using an apparatus, MOCON PERMA-TRANC-IV, manufactured by Modern Control, Inc. according to JIS K7126 (Equal Pressure Method) under a 20° C.-65% RH condition and the average thereof was calculated. The carbon dioxide gas transmission rate was 2.2 cc·20 μm/m²·day·atm and a good gas barrier property was shown.

(2-3) Measurement of Young's Modulus

The monolayer film prepared above was moisture conditioned in an atmosphere of 23° C. and 50% RH for 7 days, and then a specimen in the form of a strip 15 mm wide was made. Using this sample film, a Young's modulus was measured under conditions, a span of 50 mm and a tensile speed of 5 mm/min by an Autograph AGS-H manufactured by Shimadzu Corp. Measurements were conducted for ten samples and the average thereof was calculated. The Young's modulus was 176 kgf/mm².

(2-4) Measurements of Tensile Strength at Yield and Tensile Elongation at Break

The monolayer film prepared above was moisture conditioned in an atmosphere of 23° C. and 50% RH for 7 days, and then a specimen in the form of a strip 15 mm wide was made. Using this sample film, a tensile strength at yield and a tensile elongation at break were measured under conditions, a span of 50 mm and a tensile speed of 500 mm/min by an Autograph AGS-H manufactured by Shimadzu Corp. Measurements were conducted for ten samples and the average thereof was calculated. The tensile strength at yield and the tensile elongation at break were 6.4 kgf/mm² and 306%, respectively.

(2-5) Measurement of Haze

Using the monolayer film prepared above, a measurement of haze was conducted according to JIS D8741 using an integral type H.T.R meter manufactured by Nihon Seimitsu Kogaku Co., Ltd. The haze was 0.1%, and a very good transparency was shown.

(2-6) Evaluation of Flexing Resistance

From the monolayer film prepared above, fifty films of 21 cm×30 cm were cut out. Following moisture conditioning at 20° C. and 65% RH for 5 days, every cut film was flexed 50 times, 75 times, 100 times, 125 times, 150 times, 175 times, 200 times, 225 times, 250 times or 300 times using a Gelbo Flex Tester manufactured by Rigaku Kogyo Co., Ltd. according to ASTM F392-74. Then, the number of pinholes in the film was measured. For each number of flexures, measurements were conducted five times and the average thereof was used as the number of pinholes. The above measurements were plotted with numbers of flexures (P) as abscissa against numbers of pinholes (N) as ordinate. The number of flexures at which one pinhole is formed (Np1) is determined to a two-digit significant figure by extrapolation. As a result, Np1 was 90 times and an extremely superior flexing resistance was shown.

(3) Preparation of Monolayer Sheet

Using the thus-obtained resin composition, film formation was carried out under the extrusion conditions shown below by means of a film forming machine composed of a 40φ extruder (PLABOR GT-40-A manufactured by RESEARCH LABORATORY OF PLASTICS TECHNOLOGY CO., LTD.) and a T-die. Thus, a monolayer sheet of 150 μm in thickness was obtained.

Type: Single screw extruder (non-vent type)
L/D: 24
Bore diameter: 40 mmφ
Screw: Single-thread full-flight type, nitrided surface steel
Screw rotation speed: 100 rpm
Die: Coat hanger die of 550 mm in width
Gap between lips: 0.3 mm
Temperatures Set for Cylinders and Die: C1/C2/C3/adaptor/die=180/200/210/210/210 (° C.)

(3-1) Evaluation of Stretchability of Monolayer Sheet

The monolayer sheet prepared above was put in a pantograph type biaxial stretching machine manufactured by Toyo Seiki Seisaku-Sho, Ltd. and was subjected to simultaneous biaxial stretching at 100° C. at a draw ratio of every 0.25×0.25 time within the draw ratio range of from 2.0×2.0 time to 5.0×5.0 time. The maximum draw ratio at which the sheet was able to be stretched well without causing breakage in the sheet stretched was 4.0×4.0 time.

(4) Preparation of Multilayer Sheet

Next, using the resin composition obtained, a multilayer sheet (polystyrene resin layer/adhesive resin layer/resin composition layer/adhesive resin layer/polystyrene resin layer) was prepared by means of a three-kind five-layer coextrusion machine shown later under coextrusion molding conditions also described layer. The sheet constitution is as follows: the layers of the polystyrene resin ("Idemitsu Styrol ET-61" manufactured by Idemitsu Chemical Co., Ltd.), both outermost layers: 425 μm each; the layers of the adhesive resin ("ADMER SF600" manufactured by Mitsui Chemicals, Inc.): 50 μm each; and the layer of the resin composition: 50 μm.

Layer Constitution:
polystyrene resin/adhesive resin/resin composition/adhesive resin/polystyrene resin
(thickness 425/50/50/50/425; unit: μm)

Specifications of Extruder and Extrusion Temperature for Each Resin:

Polystyrene Resin:
65φ extruder, model 20VSE-65-22 (manufactured by Osaka Seiki Co., Ltd.)
C1/C2/C3/C4/AD=150/180/210/210/220° C.

Adhesive Resin:
40φ extruder, model 10VSE-40-22 (manufactured by Osaka Seiki Co., Ltd.)
C1/C2/C3/C4/AD=130/180/210/210/220° C.

Resin Composition:
40φ extruder, model VSVE-40-24 (manufactured by Osaka Seiki Co., Ltd.)
C1/C2/C3/C4/AD=175/210/210/210/210° C.

Specifications of T-Die:
for 600 mm-wide three-kind five-layer extrusion (manufactured by RESEARCH LABORATORY OF PLASTICS TECHNOLOGY CO., LTD.) AD/Die=220/220° C.
Temperature of cooling roll: 80° C.
Drawing speed: 1.2 m/min (4-1) Evaluation of Stretchability of Multilayer Sheet The multilayer sheet prepared above was put in a pantograph type biaxial stretching machine manufactured by Toyo Seiki Seisaku-Sho, Ltd. and was subjected to simultaneous biaxial stretching at a draw ratio of 4×4 at 120° C. The film appearance after the drawing was evaluated according to the following criteria.

Judgment: Criteria
A: There is neither unevenness nor local thickness deviation.
B: There is slight unevenness, but there is no local thickness deviation.
C: There are slight unevenness and slight local thickness deviation, but the film can be used practically.
D: There are severe unevenness and great local thickness deviation.
E: The film has a tear.

The film of this Example after the stretching had no unevenness or no local thickness deviation and, therefore, was rated as A.

The components and the like of the resin composition and the evaluation results and the like of the film and sheet are summarized in Table 2 and Table 3, respectively.

EXAMPLE 2

80 parts by weight of EVOH (F) the same as that used in Example 1 and 20 parts by weight of modified EVOH (C) obtained in Synthesis Example 2 were dry blended. Then, twin screw extrusion, pelletization and hot air drying were conducted in the same manner as Example 1, resulting in a resin composition. The melt flow rate (at 190° C. under a load of 2160 g) of the resin composition was 2.2 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 3

80 parts by weight of EVOH (F) the same as that used in Example 1 and 20 parts by weight of modified EVOH (C) obtained in Synthesis Example 3 were dry blended. Then, twin screw extrusion, pelletization and hot air drying were conducted in the same manner as Example 1, resulting in a resin composition. The melt flow rate (at 190° C. under a load of 2160 g) of the resin composition was 2.3 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 4

50 parts by weight of EVOH (F) the same as that used in Example 1 and 50 parts by weight of modified EVOH (C) obtained in Synthesis Example 3 were dry blended. Then, twin screw extrusion, pelletization and hot air drying were conducted in the same manner as Example 1, resulting in a resin composition. The melt flow rate (at 190° C. under a load of 2160 g) of the resin composition was 3.5 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 5

80 parts by weight of EVOH (F) having an ethylene content of 44 mol %, a degree of saponification of 99.9%, a melt flow rate (at 190° C. under a load of 2160 g) of 5.5 g/10 min, and a melting point of 165° C. and 20 parts by weight of modified EVOH (C) obtained in Synthesis Example 3 were dry blended. Then, twin screw extrusion, pelletization and hot air drying were conducted in the same manner as Example 1, resulting in a resin composition. The contents of phosphoric acid compound (in terms of phosphate radical), acetic acid, and Na ion (in terms of metal element) in the EVOH (F) were measured to be 50 ppm, 200 ppm and 120 ppm, respectively. The melt flow rate (at 190° C. under a load of 2160 g) of the resin composition was 6.0 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 6

90 parts by weight of EVOH (F) the same as that used in Example 1 and 10 parts by weight of modified EVOH (C) obtained in Synthesis Example 4 were dry blended. Then, twin screw extrusion, pelletization and hot air drying were conducted in the same manner as Example 1, resulting in a resin composition. The melt flow rate (at 190° C. under a load of 2160 g) of the resin composition was 2.0 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 7

80 parts by weight of EVOH (F) the same as that used in Example 1 and 20 parts by weight of modified EVOH (C) obtained in Synthesis Example 4 were dry blended. Then, twin screw extrusion, pelletization and hot air drying were conducted in the same manner as Example 1, resulting in a resin composition. The melt flow rate (at 190° C. under a load of 2160 g) of the resin composition was 2.2 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 8

50 parts by weight of EVOH (F) the same as that used in Example 1 and 50 parts by weight of modified EVOH (C) obtained in Synthesis Example 4 were dry blended. Then, twin screw extrusion, pelletization and hot air drying were conducted in the same manner as Example 1, resulting in a resin composition. The melt flow rate (at 190° C. under a load of 2160 g) of the resin composition was 3.0 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 9

80 parts by weight of EVOH (F) the same as that used in Example 5 and 20 parts by weight of modified EVOH (C) obtained in Synthesis Example 4 were dry blended. Then, twin screw extrusion, pelletization and hot air drying were conducted in the same manner as Example 1, resulting in a resin composition. The melt flow rate (at 190° C. under a load of 2160 g) of the resin composition was 5.6 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 10

80 parts by weight of EVOH (F) having an ethylene content of 27 mol %, a degree of saponification of 99.9%, a melt flow rate (at 210° C. under a load of 2160 g) of 3.9 g/10 min, and a melting point of 191° C. and 20 parts by weight of modified EVOH (C) obtained in Synthesis Example 4 were dry blended. Then, twin screw extrusion, pelletization and hot air drying were conducted in the same manner as Example 1, resulting in a resin composition. The contents of phosphoric acid compound (in terms of phosphate radical), acetic acid, and Na ion (in terms of metal element) in the EVOH (F) were measured to be 50 ppm, 300 ppm and 200 ppm, respectively. The melt flow rate (at 210° C. under a load of 2160 g) of the resin composition was 5.1 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 11

80 parts by weight of EVOH (F) having an ethylene content of 32 mol %, a degree of saponification of 99.9%, a melt flow rate (at 190° C. under a load of 2160 g) of 1.6 g/10 min, and a melting point of 183° C. and 20 parts by weight of modified EVOH (C) obtained in Synthesis Example 4 were dry blended. Then, twin screw extrusion, pelletization and hot air drying were conducted in the same manner as Example 1, resulting in a resin composition. The contents of phosphoric acid compound (in terms of phosphate radical), acetic acid, and Na ion (in terms of metal element) in the EVOH (F) were measured to be 50 ppm, 300 ppm and 200 ppm, respectively. In addition, the boron content thereof was 180 ppm. The melt flow rate (at 190° C. under a load of 2160 g) of the resin composition was 2.2 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 12

80 parts by weight of EVOH (F) the same as that used in Example 1 and 20 parts by weight of modified EVOH (C) obtained in Synthesis Example 5 were dry blended. Then, twin screw extrusion, pelletization and hot air drying were conducted in the same manner as Example 1, resulting in a resin composition. The melt flow rate (at 190° C. under a load of 2160 g) of the resin composition was 1.8 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

EXAMPLE 13

80 parts by weight of EVOH (F) the same as that used in Example 5 and 20 parts by weight of modified EVOH (C) obtained in Synthesis Example 6 were dry blended. Then, twin screw extrusion, pelletization and hot air drying were conducted in the same manner as Example 1, resulting in a resin composition. The melt flow rate (at 190° C. under a load of 2160 g) of the resin composition was 4.5 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

COMPARATIVE EXAMPLE 1

A monolayer film, a monolayer sheet and a multilyer sheet were prepared in the same manner as Example 1 except using only the EVOH (F) used in Example 1 in place of the resin composition. These were measured for their oxygen transmission rate, carbon dioxide gas transmission rate and haze and were evaluated for their stretchability. The physical properties and the like of the EVOH (F) and the evaluation results and the like of the film are summarized in Table 2 and Table 3, respectively.

The flexing resistance was evaluated in the manner described below. Using the EVOH (F) pellets used in Example 1, film formation was carried out at an extrusion temperature of from 180 to 210° C. and a T-die temperature of 210° C. by means of a film forming machine composed of a 40φ extruder and a T-die. Thus, a monolayer film of 25 μm in thickness was obtained. From the EVOH monolayer film prepared above, forty films 21 cm×30 cm were cut out. Following moisture conditioning at 20° C. and 65% RH for 5 days, every cut film was flexed 25 times, 30 times, 35 times, 40 times, 50 times, 60 times, 80 times or 100 times using a Gelbo Flex Tester manufactured by Rigaku Kogyo Co., Ltd. according to ASTM F392-74. And then the number of pinholes in the film was measured. For each number of flextures, measurements were conducted five times and the average thereof was used as the number of pinholes. The above measurements were plotted with numbers of flexures (P) as abscissa against numbers of pinholes (N) as ordinate. The number of flextures at which one pinhole is formed (Np1) is determined by extrapolation. Np1 of the film of this Comparative Example was 34 times.

COMPARATIVE EXAMPLE 2

A monolayer film, a monolayer sheet and a multilyer sheet were prepared in the same manner as Example 1 except using only the EVOH (F) used in Example 5 in place of the resin composition. These were measured for their oxygen transmission rate, carbon dioxide gas transmission rate and haze and were evaluated for their stretchability. They were evaluated for their flexing resistance in the same manner as Comparative Example 1. The physical properties and the like of the EVOH (F) and the evaluation results and the like of the film are summarized in Table 2 and Table 3, respectively.

COMPARATIVE EXAMPLE 3

80 parts by weight of EVOH (F) the same as that used in Example 1 and 20 parts by weight of modified EVOH obtained in Synthesis Example 7 were dry blended. Then, twin screw extrusion, pelletization and hot air drying were conducted in the same manner as Example 1, resulting in a resin composition. The melt flow rate (at 190° C. under a load of 2160 g) of the resin composition was 1.9 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their stretchability. They were evaluated for their flexing resistance in the same manner as Comparative Example 1. The components and the like of the resin composition and the evaluation results and the like of the film are summarized in Table 2 and Table 3, respectively.

COMPARATIVE EXAMPLE 4

A monolayer film, a monolayer sheet and a multilyer sheet were prepared in the same manner as Example 1 except using only the modified EVOH (C) obtained in Synthesis Example 1 in place of the resin composition. These were measured for their oxygen transmission rate, carbon dioxide gas transmission rate and haze and were evaluated for their stretchability and flexing resistance. The physical properties and the like of the modified EVOH (C) and the evaluation results and the like of the film are summarized in Table 2 and Table 3, respectively.

COMPARATIVE EXAMPLE 5

A monolayer film, a monolayer sheet and a multilyer sheet were prepared in the same manner as Example 1 except using only the modified EVOH (C) obtained in Synthesis Example 2 in place of the resin composition. These were measured for their oxygen transmission rate, carbon dioxide gas transmission rate and haze and were evaluated for their stretchability and flexing resistance. The physical properties and the like of the modified EVOH (C) and the evaluation results and the like of the film are summarized in Table 2 and Table 3, respectively.

COMPARATIVE EXAMPLE 6

A monolayer film, a monolayer sheet and a multilayer sheet were prepared in the same manner as Example 1 except using only the modified EVOH (C) obtained in Synthesis Example 3 in place of the resin composition. These were measured for their oxygen transmission rate, carbon dioxide gas transmission rate and haze and were evaluated for their stretchability and flexing resistance. The physical properties and the like of the modified EVOH (C) and the evaluation results and the like of the film are summarized in Table 2 and Table 3, respectively.

COMPARATIVE EXAMPLE 7

A monolayer film, a monolayer sheet and a multilyer sheet were prepared in the same manner as Example 1 except using only the modified EVOH (C) obtained in Synthesis Example 5 in place of the resin composition. These were measured for their oxygen transmission rate, carbon dioxide gas transmission rate and haze and were evaluated for their stretchability and flexing resistance. The physical properties and the like of the modified EVOH (C) and the evaluation results and the like of the film are summarized in Table 2 and Table 3, respectively.

COMPARATIVE EXAMPLE 8

A monolayer film, a monolayer sheet and a multilyer sheet were prepared in the same manner as Example 1 except using only the modified EVOH (C) obtained in Synthesis Example 6 in place of the resin composition. These were measured for their oxygen transmission rate, carbon dioxide gas transmission rate and haze and were evaluated for their stretchability and flexing resistance. The physical properties and the like of the modified EVOH (C) and the evaluation results and the like of the film are summarized in Table 2 and Table 3, respectively.

COMPARATIVE EXAMPLE 9

80 parts by weight of the EVOH (F) used in Example 1 and 20 parts by weight of EVOH of a low degree of saponification which had an ethylene content of 32 mol %, a degree of saponification of 97.0%, an MFR of 1.2 g/10 min (at 190° C. under a load of 2160 g) and a melting point of 171° C. were dry blended. Then, twin screw extrusion, pelletization and hot air drying were conducted in the same manner as Example 1, resulting in a resin composition. The contents of phosphoric acid compound (in terms of phosphate radical), acetic acid, and Na ion (in terms of metal element) in the EVOH of a low degree of saponification used were measured to be 50 ppm, 300 ppm and 200 ppm, respectively. The melt flow rate (at 190° C. under a load of 2160 g) of the resin composition was 1.7 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The components and the like of the resin composition and the evaluation results and the like of the film are summarized in Table 2 and Table 3, respectively.

COMPARATIVE EXAMPLE 10

50 parts by weight of the EVOH (F) used in Example 1 and 50 parts by weight of the EVOH of a low degree of saponification used in Comparative Example 9 were dry blended. Then, twin screw extrusion, pelletization and hot air drying were conducted in the same manner as Example 1, resulting in a resin composition. The melt flow rate (at 190° C. under a load of 2160 g) of the resin composition was 1.6 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their stretchability. They were evaluated for their flexing resistance in the same manner as Comparative Example 1. The components and the like of the resin composition and the evaluation results and the like of the film are summarized in Table 2 and Table 3, respectively.

COMPARATIVE EXAMPLE 11

80 parts by weight of the EVOH (F) used in Example 1 and 20 parts by weight of EVOH of a low degree of saponification which had an ethylene content of 44 mol %, a degree of saponification of 96.5%, an MFR of 5.0 g/10 min (at 190° C.

under a load of 2160 g) and a melting point of 157° C. were dry blended. Then, twin screw extrusion, pelletization and hot air drying were conducted in the same manner as Example 1, resulting in a resin composition. The contents of phosphoric acid compound (in terms of phosphate radical), acetic acid, and Na ion (in terms of metal element) in the EVOH of a low degree of saponification used were measured to be 50 ppm, 200 ppm and 120 ppm, respectively. The melt flow rate (at 190° C. under a load of 2160 g) of the resin composition was 2.2 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their stretchability. They were evaluated for their flexing resistance in the same manner as Comparative Example 1. The components and the like of the resin composition and the evaluation results and the like of the film are summarized in Table 2 and Table 3, respectively.

TABLE 2

| | Modified EVOH (C) | | | | | EVOH (F) | | | Resin composition | |
|---|---|---|---|---|---|---|---|---|---|---|
| | | Structural | | | | | | | | |
| | Epoxy compound (B) | unit (I) content (mol %) | Ethylene content (mol %) | Melting point (° C.) | MFR (g/10 min) | Ethylene content (mol %) | Melting point (° C.) | MFR (g/10 min) | Weight ratio (C)/(F) | MFR (g/10 min) |
| Example 1 | 1,2-Epoxybutane | 4.8 | 32 | 141 | 2.5 | 32 | 183 | 1.6 | 20/80 | 1.9 |
| Example 2 | 1,2-Epoxybutane | 7 | 44 | 109 | 5 | 32 | 183 | 1.6 | 20/80 | 2.2 |
| Example 3 | Epoxypropane | 5.5 | 32 | 132 | 7 | 32 | 183 | 1.6 | 20/80 | 2.3 |
| Example 4 | Epoxypropane | 5.5 | 32 | 132 | 7 | 32 | 183 | 1.6 | 50/50 | 3.5 |
| Example 5 | Epoxypropane | 5.5 | 32 | 132 | 7 | 44 | 165 | 5.5 | 20/80 | 6.0 |
| Example 6 | Epoxypropane | 8 | 44 | 105 | 5 | 32 | 183 | 1.6 | 10/90 | 2.0 |
| Example 7 | Epoxypropane | 8 | 44 | 105 | 5 | 32 | 183 | 1.6 | 20/80 | 2.2 |
| Example 8 | Epoxypropane | 8 | 44 | 105 | 5 | 32 | 183 | 1.6 | 50/50 | 3.0 |
| Example 9 | Epoxypropane | 8 | 44 | 105 | 5 | 44 | 165 | 5.5 | 20/80 | 5.6 |
| Example 10 | Epoxypropane | 8 | 44 | 105 | 5 | 27 | 191 | 3.9 *1) | 20/80 | 5.1 *1) |
| Example 11 | Epoxypropane | 8 | 44 | 105 | 5 | 32 *2) | 183 | 1.6 | 20/80 | 2.2 |
| Example 12 | Glycidol | 5 | 32 | 135 | 1.8 | 32 | 183 | 1.6 | 20/80 | 1.8 |
| Example 13 | Glycidol | 6 | 44 | 127 | 1.6 | 44 | 165 | 5.5 | 20/80 | 4.5 |
| Comparative Example 1 | — | — | — | — | — | 32 | 183 | 1.6 | 0/100 | 1.6 |
| Comparative Example 2 | — | — | — | — | — | 44 | 165 | 5.5 | 0/100 | 5.5 |
| Comparative Example 3 | *3) | *4) | 32 | *4) | 2.5 | 32 | 183 | 1.6 | 20/80 | 1.9 |
| Comparative Example 4 | 1,2-Epoxybutane | 4.8 | 32 | 141 | 2.5 | — | — | — | 100/0 | 2.5 |
| Comparative Example 5 | 1,2-Epoxybutane | 7 | 44 | 109 | 5 | — | — | — | 100/0 | 5 |
| Comparative Example 6 | Epoxypropane | 5.5 | 32 | 132 | 7 | — | — | — | 100/0 | 7 |
| Comparative Example 7 | Glycidol | 5 | 32 | 135 | 1.8 | — | — | — | 100/0 | 1.8 |
| Comparative Example 8 | Glycidol | 6 | 44 | 127 | 1.6 | — | — | — | 100/0 | 1.6 |
| Comparative Example 9 | EVOH of low degree of saponification | | 32 | 171 | 1.2 | 32 | 183 | 1.6 | 20/80 | 1.7 |
| Comparative Example 10 | EVOH of low degree of saponification | | 32 | 171 | 1.2 | 32 | 183 | 1.6 | 50/50 | 1.6 |
| Comparative Example 11 | EVOH of low degree of saponification | | 44 | 157 | 5 | 32 | 183 | 1.6 | 20/80 | 2.2 |

*1) Measured at 210° C.
*2) Boric acid treatment
*3) Bisphenol A diglycidyl ether
*4) Not measured

TABLE 3

| | Oxygen transmission rate *1) | Carbon dioxide gas transmission rate *1) | Young's modulus (kgf/mm²) | Tensile strength at yield (kgf/mm²) | Tensile elongation at break (%) | Haze (%) | Flexing resistance (Np1) *2) | Maximum stretch magnification of monolayer sheet (time) | Stretchability of multilayer sheet |
|---|---|---|---|---|---|---|---|---|---|
| Example 1 | 0.5 | 2.2 | 176 | 6.4 | 306 | 0.1 | 90 | 4.0 × 4.0 | A |
| Example 2 | 0.6 | 2.6 | 172 | 6.3 | 323 | 0.3 | 160 | 4.25 × 4.25 | A |
| Example 3 | 0.4 | 1.7 | 168 | 6.4 | 313 | 0.1 | 90 | 3.75 × 3.75 | A |
| Example 4 | 0.7 | 2.9 | 113 | 4.1 | 362 | 0.1 | 150 | 3.75 × 3.75 | A |
| Example 5 | 0.5 | 2.0 | 120 | 5.4 | 387 | 0.2 | 270 | 3.25 × 3.25 | A |
| Example 6 | 0.5 | 1.9 | 186 | 7.1 | 305 | 0.3 | 120 | 3.75 × 3.75 | A |
| Example 7 | 0.7 | 2.6 | 167 | 5.6 | 329 | 0.3 | 190 | 4.25 × 4.25 | A |

TABLE 3-continued

|  | Oxygen transmission rate *1) | Carbon dioxide gas transmission rate *1) | Young's modulus (kgf/mm²) | Tensile strength at yield (kgf/mm²) | Tensile elongation at break (%) | Haze (%) | Flexing resistance (Np1) *2) | Maximum stretch magnification of monolayer sheet (time) | Stretchability of multilayer sheet |
|---|---|---|---|---|---|---|---|---|---|
| Example 8 | 2.3 | 9.0 | 111 | 4.7 | 308 | 0.4 | 220 | 4.0 × 4.0 | A |
| Example 9 | 2.5 | 9.2 | 119 | 5.5 | 383 | 0.1 | 300 | 3.25 × 3.25 | A |
| Example 10 | 0.3 | 1.3 | 142 | 5.4 | 317 | 0.3 | 180 | 4.0 × 4.0 | A |
| Example 11 | 0.7 | 2.7 | 167 | 6.4 | 330 | 0.2 | 180 | 4.25 × 4.25 | A |
| Example 12 | 0.4 | 1.4 | 168 | 6.5 | 310 | 0.1 | 110 | 3.5 × 3.5 | B |
| Example 13 | 1.7 | 6.5 | 119 | 5.6 | 362 | 0.1 | 290 | 3.75 × 3.75 | A |
| Comparative Example 1 | 0.3 | 1.8 | 205 | 7.9 | 191 | 0.4 | 34 | 2.25 × 2.25 | E |
| Comparative Example 2 | 1.5 | 6.2 | 145 | 7.0 | 224 | 0.3 | 47 | Unstretchable | E |
| Comparative Example 3 | 1.0 | 4.7 | 206 | 8.0 | 199 | 0.6 | 37 | 2.25 × 2.25 | E |
| Comparative Example 4 | 2.5 | 11 | 46 | 5.3 | 278 | 0.1 | 160 | 3.75 × 3.75 | B |
| Comparative Example 5 | 10.0 | 37 | 36 | 3.1 | 333 | 0.1 | 300 | 4.5 × 4.5 | A |
| Comparative Example 6 | 1.5 | 6.0 | 31 | 3.9 | 302 | 0.1 | 160 | 4.0 × 4.0 | A |
| Comparative Example 7 | 0.7 | 3.7 | 22 | 3.1 | 292 | 0.1 | 180 | 3.75 × 3.75 | B |
| Comparative Example 8 | 2.7 | 13 | 15 | 3.4 | 336 | 0.1 | 220 | 4.0 × 4.0 | A |
| Comparative Example 9 | 0.5 | 2.5 | 203 | 7.5 | 206 | 0.4 | 37 | 2.25 × 2.25 | E |
| Comparative Example 10 | 0.9 | 3.7 | 201 | 6.8 | 229 | 0.3 | 41 | 2.25 × 2.25 | D |
| Comparative Example 11 | 0.6 | 2.9 | 192 | 7.3 | 216 | 1.0 | 40 | 2.25 × 2.25 | D |

*1) Unit: cc · 20 μm/m² · day · atm
*2) Np1: The number of flexures until one pinhole is formed.

As shown above, the resin compositions comprising an unmodified EVOH (F) and a modified EVOH (C) having a structural unit (I) (Examples 1 to 13) have greatly improved flexibilities, flexing resistances and stretchabilities despite their slightly increased oxygen transmission rates in comparison to the cases using only an unmodified EVOH (F) (Comparative Examples 1 and 2). On the other hand, in Comparative Example 3 using a multifunctional epoxy compound, bisphenol A diglycidyl ether, in place of a monofunctional epoxy compound (B) having a molecular weight of not more than 500, the aforementioned effects of improving flexibility, flexing resistance and stretchability were not obtained.

In comparison to the cases using only a modified EVOH (C) (Comparative Examples 4 to 8), the resin compositions comprising an EVOH (F) and a modified EVOH (C) having a structural unit (I) (Examples 1 to 13) demonstrate greatly improved oxygen barrier properties while maintaining superior flexibility, superior flexing resistance and superior stretchability which the modified EVOH (C) inherently possesses. On the other hand, in the cases using the resin compositions containing an EVOH (F) and an EVOH of a low degree of saponification (Comparative Examples 9 to 11), the aforementioned effects of improving flexibility, flexing resistance and stretchability were not obtained.

EXAMPLE 14

"UE320" manufactured by Japan Polychem Co., Ltd. (MFR=0.7 g/10 min at 190° C. under a load of 2160 g) was used as a linear low density polyethylene (LLDPE), "Admer NF500" manufactured by Mitsui Chemicals, Inc. (MFR=1.8 g/10 min at 230° C.-2160 g) was used as an adhesive resin, and the resin composition prepared in Example 1 was used as a barrier material. A three-kind five-layer parison having a layer constitution, LLDPE/adhesive resin/barrier material/adhesive resin/LLDPE, was extruded by use of a blow molding machine TB-ST-6P manufactured by Suzuki Seiko-sho, Co., Ltd. while setting extrusion temperature for each resin and die temperature to 210° C. The parison was blown in a mold at 15° C. and cooled for 20 seconds, yielding a 500-mL bottle comprising a multilayer blow molded article. The bottle had a total layer thickness of 500 μm and a layer constitution: (inside) LLDPE/adhesive resin/barrier material/adhesive resin/LLDPE (outside)=210/20/30/20/220 μm. The bottle was able to be molded without any special problems. In addition, the bottle had a good appearance.

EXAMPLE 15

A multilayer film (nylon 6 resin/barrier material/adhesive resin/LLDPE resin) was produced under the conditions shown below by use of a four-kind four-layer coextrusion machine using the resin composition prepared in Example 11 as a barrier material. The constitution of the film comprises 10 μm of the nylon 6 resin ("Ube nylon 1022B" manufactured by Ube Industries, Ltd.), 20 μm of the barrier material, 10 μm of the adhesive resin ("Admer NF500" manufactured by Mitsui Chemicals, Inc.) and 60 μm of the LLDPE resin ("ULTZEX 3520L" manufactured by Mitsui Chemicals, Inc.)

The coextrusion molding conditions are as follows.

Layer Constitution:
nylon 6 resin/barrier material/adhesive resin/LLDPE resin
  (thickness 10/20/10/60 in μm)

Extrusion Temperature of Nylon 6 Resin:
C1/C2/C3/C4=230/240/250/250° C.

Extrusion Temperature of Adhesive Resin:
C1/C2/C3=170/170/220/220° C.

Extrusion Temperature of Barrier Material:
C1/C2/C3/C4=175/210/230/230° C.

Extrusion Temperature of LLDPE Resin:
C1/C2/C3=170/170/220/220° C.
Temperature of adapter: 250° C.
Temperature of die: 250° C.

Specifications of Extruder for Each Resin and T-Die:

Nylon 6 Resin:
40φ extruder, model UT-40-H (manufactured by Research Laboratory Of Plastics Technology Co., Ltd.)

Adhesive Resin:
40φ extruder, model 10VSE-40-22 (manufactured by Osaka Seiki Co., Ltd.)

Barrier Material:
40φ extruder, model VSVE-40-24 (manufactured by Osaka Seiki Co., Ltd.)

LLDPE Resin:
65φ extruder, model 20VS-65-22 (manufactured by Osaka Seiki Co., Ltd.)

T-Die:
for 650 mm-wide four-kind four-layer extrusion (manufactured by Research Laboratory Of Plastics Technology Co., Ltd.)

Temperature of cooling roll: 30° C.
Drawing speed: 8 m/min

A thermoformed container was obtained by thermoforming the resulting multilayer film so that the LLDPE resin may come to the inner layer side of the container by use of a thermoforming machine (R530 manufactured by Multivac Inc.). Specifically, a thermoformed container was obtained by heating the multilayer film at a mold temperature of 100° C. for 2 seconds and thermoforming it into a shape of the mold (rectangular solid 130 mm long, 110 mm wide and 60 mm deep) by use of compressed air (pressure: 5 kgf/cm$^2$). The appearance of the thermo formed container obtained was observed visually. The container was stretched uniformly without any unevenness or local thickness deviation. Moreover, it had good transparency and also had good appearance.

EXAMPLE 16

A multilayer sheet (polypropylene resin/adhesive resin/barrier material/adhesive resin/polypropylene resin) was produced by use of a three-kind five-layer coextrusion machine using the resin composition prepared in Example 10 as a barrier material. The constitution of the film comprises 420 μm of the polypropylene resin ("Idemitsu Polypropylene E-203G" made by Idemitsu Petrochemical Co., Ltd.) of the inner and outer layers, 40 μm of the adhesive resin ("Admer QF551" manufactured by Mitsui Chemicals, Inc.) and 80 μm of the barrier material of the middle layer.

A thermoformed container was obtained by thermoforming the resulting multilayer sheet by use of a thermoforming machine (a vacuum-pressure deep drawing molding machine, model FX-0431-3 manufactured by Asano Laboratories Co., Ltd.) into a shape of a round cup (mold shape: upper part 75 mmφ, lower part 60 mmφ, depth 75 mm, drawn ratio S=1.0) at a sheet temperature of 160° C. using compressed air (pressure: 5 kgf/cm$^2$). The molding conditions are as follows.

Temperature of heater: 400° C.
Plug: 45φ×65 mm
Temperature of plug: 150° C.
Temperature of mold: 70° C.

The appearance of the cup-shaped thermoformed container obtained was observed visually. The container was stretched uniformly without any unevenness or local thickness deviation. Moreover, it had good transparency and also had good appearance.

EXAMPLE 17

A multilayer film (polystyrene resin/adhesive resin/barrier material/adhesive resin/polystyrene resin) was produced under the conditions shown below by use of a three-kind five-layer coextrusion machine using the resin composition prepared in Example 7 as a barrier material. The constitution of the film comprises 425 μm of the polystyrene resin ("Idemitsu Polystyrol ET-61" manufactured by Idemitsu Petrochemical Co., Ltd.) of the inner and outer layers, 50 μm of the adhesive resin ("Melthene M-5420" manufactured by Tosoh Corp.) each and 50 μm of the barrier material of the middle layer.

A thermoformed container was obtained by thermoforming the resulting multilayer sheet by use of a thermoforming machine (a vacuum-pressure deep drawing molding machine, model FX-0431-3 manufactured by Asano Laboratories Co., Ltd.) into a shape of a round cup (mold shape: upper part 75 mmφ, lower part 60 mmφ, depth 75 mm, drawn ratio S=1.0) at a sheet temperature of 150° C. using compressed air (pressure: 5 kgf/cm$^2$). The molding conditions are as follows.

Temperature of heater: 400° C.
Plug: 45φ×65 mm
Temperature of plug: 120° C.
Temperature of mold: 70° C.

The appearance of the thermoformed container obtained was observed visually. The container had no cracks, no unevenness and no local thickness deviation and was stretched uniformly. Moreover, it had good transparency and also had good appearance.

EXAMPLE 18

The resin composition prepared in Example 11 was used as a barrier material, a maleic anhydride-modified polyethylene ("Admer NF500" manufactured by Mitsui Chemicals, Inc.) was used as an adhesive resin and a water crosslinking polyethylene ("Mordakes S-141" manufactured by Sumitomo Bakelite Co., Ltd.) was used as a crosslinkable polyolefin. Each of the above-mentioned resins was supplied to a coextrusion molding machine ("M50/28D" manufactured by Leonard Co.) for multilayer pipe production to produce a multilayer pipe with an outer diameter of 20 mm comprising (outer layer) barrier material/adhesive resin layer/crosslinkable polyolefin (inner layer). The thicknesses of the outer layer, the adhesive resin layer and the inner layer in the multilayer pipe obtained were 100 μm, 50 μm and 1850 μm, respectively. The inner layer of the resulting multilayer pipe was water-crosslinked by passing water vapor (temperature 150° C.; pressure 4 kg/cm$^2$) through the multilayer pipe for 3 minutes. Then the oxygen barrier property of this multilayer pipe was measured by a method described below. The oxygen barrier property was evaluated based on the increasing speed of dissolved oxygen. The smaller the increasing speed of dissolved oxygen, the better the oxygen barrier property.

By circulating water from which dissolved oxygen had been removed by use of a packed tower containing metallic tin through the resulting pipe, the increasing speed of the dissolved oxygen in the water at 70° C. was measured under conditions: 20° C. and 65% RH. The increasing speed μg/liter·hr used herein indicates that the dissolved oxygen increases at a rate of μg/hr per liter of water in the pipe. In other words, when V1 cc represents the volume of the water in the whole apparatus including the pipe, V2 cc represents the volume of the water in the pipe and B μg/liter·hr represents the increase per unit time in the oxygen concentration in the water circulated in the apparatus, the above-mentioned increasing speed of dissolved oxygen (A μg/liter·hr) is a value calculated from A=B (V1/V2). The multilayer pipe had an increasing speed of dissolved oxygen of 5 μg/liter·hr, showing good oxygen barrier property.

EXAMPLE 19

A polyester based thermoplastic polyurethane ("Kuramilon U-2190" manufactured by Kuraray Co., Ltd.) was used as a thermoplastic polyurethane elastomer, the resin composition prepared in Example 11 was used as a barrier material, and a resin composition comprising 70 parts by weight of an ethylene-vinyl acetate copolymer ("Evaflex EV-460" manufactured by Du Pont-Mitsui Polychemicals Co., Ltd.) and 30 parts by weight of a maleic anhydride-modified ethylene-vinyl acetate copolymer based adhesive resin ("Admer VF500" manufactured by Mitsui Chemicals, Inc.) was used as a sealant layer.

Using the resins and resin composition described above, coextrusion was carried out under the conditions shown below to yield a multilayer film having a layer constitution, thermoplastic polyurethane elastomer (50 μm)/barrier material (10 μm)/sealant material (30 μm).

The coextrusion molding conditions are as follows.

Layer Constitution:
Thermoplastic polyurethane elastomer/barrier material/sealant layer (thickness 50/10/30 in μm)

Extrusion Temperature of Thermoplastic Polyurethane Elastomer:
C1/C2/C3=195/200/200° C.

Extrusion Temperature of Barrier Material:
C1/C2/C3=175/210/210° C.

Extrusion Temperature of Sealant Material:
C1/C2/C3=150/200/210° C.
Temperature of die: 210° C.

Specifications of Extruder for Each Resin and T-Die:

Thermoplastic Polyurethane Elastomer:
20φ extruder for laboratory use, ME type CO-EXT (manufactured by Toyo Seiki Seisaku-Sho, Ltd.)

Barrier Material:
25φ extruder, model P25-18AC (manufactured by Osaka Seiki Co., Ltd.)

Sealant Material:
32φ extruder, model GT-32-A (manufactured by RESEARCH LABORATORY OF PLASTICS TECHNOLOGY CO., LTD.)

T-Die:
for 300 mm-wide three-kind three-layer extrusion (manufactured by RESEARCH LABORATORY OF PLASTICS TECHNOLOGY CO., LTD.)
Temperature of cooling roll: 50° C.
Drawing speed: 4 m/min The multilayer film prepared above was moisture conditioned at 20° C. and 65% RH for 5 days. For the above-mentioned two moisture-conditioned samples, oxygen transmission rates were measured using an apparatus, MOCON OX-TRAN 2/20, manufactured by Modern Control, Inc. according to JIS K7126 (Equal Pressure Method) under a 20° C.-65% RH condition and the average thereof was calculated. The oxygen transmission rate of the multilayer film of this Example was 0.8 cc/m$^2$·day·atm.

Figure 9:
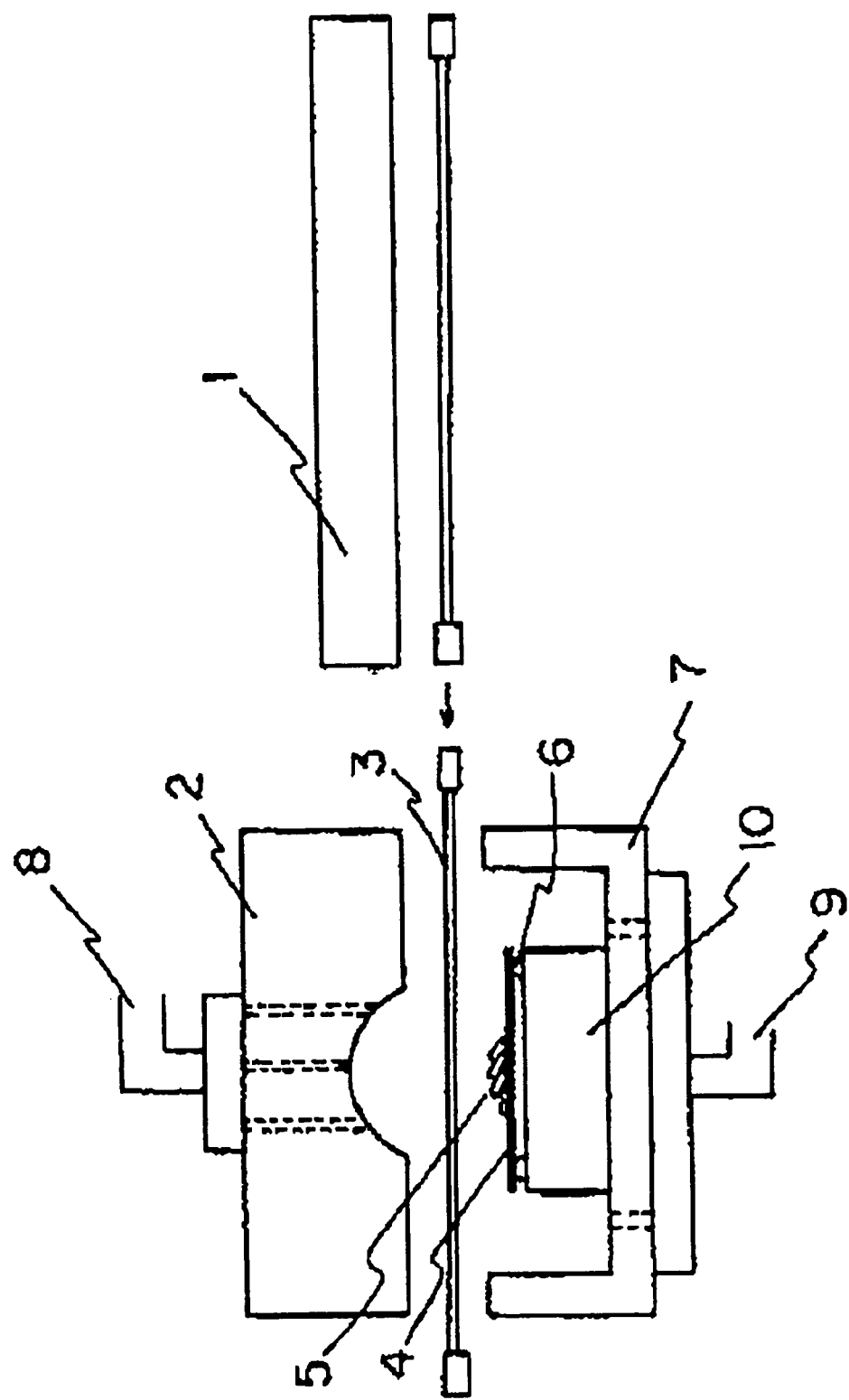
FIG. 9 is a diagram showing the outline of the manufacturing process of a skin packaging material.
Figure 10:
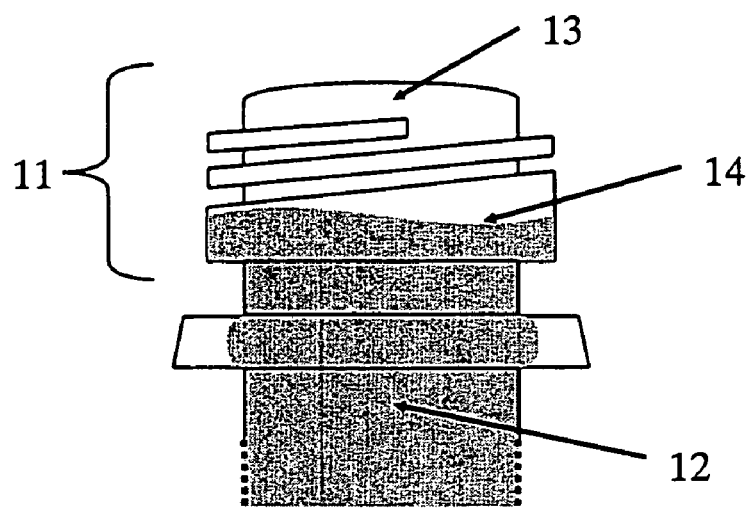
FIG. 10 is a schematic view showing part of a bottomed parison having a good leading edge.
Figure 11:
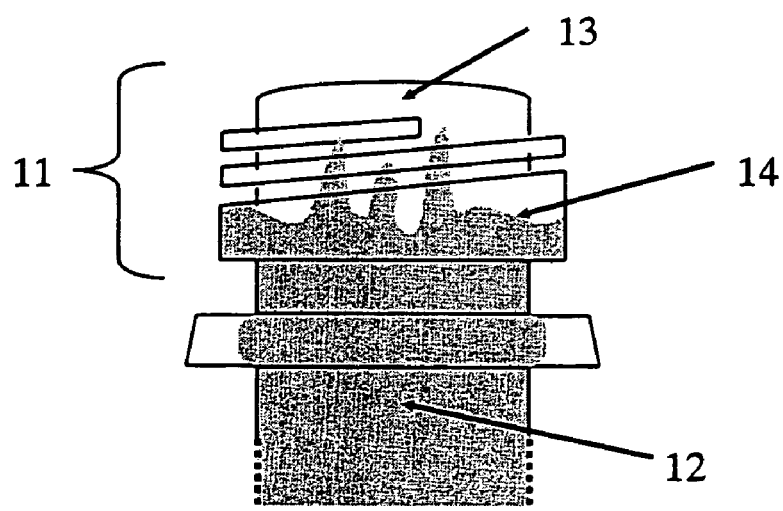
FIG. 11 is a schematic view showing part of a bottomed parison having a bad leading edge.

Then, using the multilayer film, the skin packaging aptitude was evaluated. On a two-layer film, as a lid material 4, which comprised a 100-μm thick polyethylene terephthalate film ("Lumirror #100" manufactured by Toray Industries, Inc.) and a 40-μm thick ethylene-vinyl acetate copolymer film ("Lamilon SR-L10" manufactured by Sekisui Film Nishinippon Co., Ltd.) laminated together by dry lamination, a content (sliced ham) 5 was placed while the ethylene-vinyl acetate copolymer layer was faced with the sliced ham. Then, the film for evaluation was subjected to skin packaging using a skin packaging test machine (a vacuum-pressure deep drawing molding machine, model FX-0431-3, manufactured by Asano Laboratories Co., Ltd.) (see FIG. 9).

The film was preheated with a preheater 1 set at 100° C. Then the aforementioned multilayer film 3 was vacuum formed by means of an upper mold 2 (temperature controlling device) kept at 90° C. Subsequently, the upper mold 2 and a lower mold 7 were mated together and then the inside of the molds was brought into vacuum by degassing through vacuuming tubes 8 and 9. After the inside of the molds reached vacuum, a heat sealer 6 mounted on a heat sealer base 10 was actuated to heat seal in circular shape around the sliced ham. Then the inside of the mold was brought back to the atmospheric pressure, yielding a skin package in which the film for evaluation was shaped in tight contact with the surface of the content, sliced ham.

For the formed skin package, the appearance of the package was evaluated with respect to two points, follow ability to the shape of the content (degree of deformation of the content) and a state of the wrinkle formed. As a result, in the skin package comprising the multilayer film of this Example, there was almost no change in the shape of the content and the film followed the shape of the content well. In addition, no wrinkles were formed and, therefore, good contactibility was shown.

EXAMPLE 20

The resin composition prepared in Example 11 was used as a barrier material, "Eveflex EV-340" manufactured by Du Pont-Mitsui Polychemicals Co., Ltd. was used as an EVA resin, and "Admer VF-600" manufactured by Mitsui Chemicals, Inc. was used as an adhesive resin. Using the above-mentioned resins, a multilayer sheet having a layer constitution, EVA resin/adhesive resin/barrier material/adhesive resin/EVA resin (=300/50/50/50/300 μm), was produced under the following conditions by use of a three-kind five-layer coextrusion machine.

The coextrusion molding conditions are as follows.

Layer Constitution:
EVA resin/adhesive resin/barrier material/adhesive resin/EVA resin
(thickness 300/50/50/50/300 in μm)

Extrusion Temperature of Each Resin:
C1/C2/C3/die=170/170/220/220° C.

Specifications of Extruder for Each Resin and T-Die:

EVA Resin:

32φ extruder, model GT-32-A (manufactured by RESEARCH LABORATORY OF PLASTICS TECHNOLOGY CO., LTD.)

Adhesive Resin:

25φ extruder, model P25-18AC (manufactured by Osaka Seiki Co., Ltd.)

Barrier Material:

20φ extruder for laboratory use, ME type CO-EXT (manufactured by Toyo Seiki Seisaku-Sho, Ltd.)

T-Die:

for 300 mm-wide 3-kind 5-layer extrusion (manufactured by RESEARCH LABORATORY OF PLASTICS TECHNOLOGY CO., LTD.)

Temperature of cooling roll: 50° C.

Drawing speed: 4 m/min

The multilayer sheet prepared above was put in a pantograph type biaxial stretching machine manufactured by Toyo Seiki Seisaku-Sho, Ltd. and was subjected to simultaneous biaxial stretching at a draw ratio of 3×3 at 70° C. to obtain a multilayer oriented film. The multilayer sheet mentioned above showed good stretchability. After the drawing, the multilayer oriented film had few cracks, little unevenness and little local thickness deviation and, therefore, had a good appearance (transparency, gels and pimples).

The multilayer oriented film prepared above was moisture conditioned at 20° C.-100% RH for 5 days. For the above-mentioned two moisture-conditioned samples, oxygen transmission rates were measured using an apparatus, MOCON OX-TRAN 2/20, manufactured by Modern Control, Inc. according to JIS K7126 (Equal Pressure Method) under a 20° C.-100% RH condition and the average thereof was calculated. The oxygen transmission rate of the multilayer oriented film of this Example was 1.3 cc/m$^2$·day·atm and a good gas barrier property was shown.

Moreover, the heat shrinkability obtained when the multilayer oriented film prepared above is used as a heat shrinkable film was evaluated according the method described below. Specifically, the above multilayer oriented film was immersed in hot water at 90° C. for one minute, and the area shrinkage percentage was determined. The multilayer oriented film of this Example had an area shrinkage percentage of 57% and, therefore, showed a good heat shrinkability.

EXAMPLE 21

A thermoplastic polyester resin was produced according to the method mentioned below.

A slurry comprising 100.000 parts by weight of terephthalic acid and 44.830 parts by weight of ethylene glycol was prepared and 0.010 part by weight of germanium dioxide, 0.010 part by weight of phosphorous acid and 0.010 part by weight of tetraethyl ammonium hydroxide were added thereto. The resulting slurry was heated under pressure (absolute pressure of 2.5 Kg/cm$^2$) at 250° C. for esterification to a degree of esterification up to 95%, thereby giving an oligomer. The resulting oligomer was subjected to melt polycondensation under a reduced pressure of 1 mmHg at a temperature of 270° C. to obtain a polyester having an intrinsic viscosity of 0.50 dl/g. The resulting polyester was extruded through a nozzle into a strand, cooled with water, and pelletized into columnar pellets (diameter: about 2.5 mm, length: about 2.5 mm). The resulting pellets were pre-dried at 160° C. for 5 hours and crystallized. Thus was obtained a polyester prepolymer.

The structural unit contents of the resulting polyester prepolymer were measured by NMR. The terephthalic acid unit content, the ethylene glycol unit content and the content of diethylene glycol unit by-produced in the polyester were 50.0 mol %, 48.9 mol % and 1.1 mol %, respectively. The terminal carboxyl group concentration and the melting point of the polyester were measured according to the methods mentioned hereinabove to be 38 µeq/g and 253° C., respectively. The resulting polyester prepolymer were pre-dried at 160° C. for 5 hours and crystallized.

The crystallized polyester prepolymer was subjected to solid-phase polymerization in a rotary vacuum solid-phase polymerization device, under a reduced pressure of 0.1 mmHg at 220° C. for 10 hours, into a thermoplastic polyester resin having an increased molecular weight. The characteristic values of the thermoplastic polyester resin obtained were measured according to the methods mentioned below.

(1) Structural Unit Contents in Polyester:

The content of each structural unit in a polyester was determined from a $^1$H-NMR (nuclear magnetic resonance) spectrum (measured by "JNM-GX-500" manufactured by JEOL Ltd.) of the polyester using deuterated trifluoroacetic acid as a solvent.

(2) Intrinsic Viscosity of Polyester:

A sample was taken out of the polyester layer of the body part of a multilayer container, and its intrinsic viscosity was measured in an equiweight mixed solvent of phenol and tetrachloroethane, at 30° C. using an Ubbelohed's viscometer (model "HRK-3" manufactured by Hayashi Seisakusho Co. Ltd.).

(3) Glass Transition Temperature and Melting Point of Polyester:

A sample is taken out of the polyester layer of the body part of a multilayer container, and its glass transition temperature and melting point were measured by differential scanning calorimetry (DSC) according to JIS K7121 using a differential scanning calorimeter (DSC) of model RDC220/SSC5200H manufactured by Seiko Instruments & Electronics Ltd. Precisely, in the device, the sample was kept at 280° C. for 5 minutes, then cooled to 30° C. at a cooling rate of 100° C./min, kept at the temperature for 5 minutes, and then heated at a heating rate of 10° C./min. For temperature calibration, used are indium and lead. The glass transition temperature as referred to herein indicates the midway glass transition temperature (Tmg) according to JIS K7121, and the melting point also referred to herein indicates the peak point in melting (Tpm) according to the same.

The contents of terephthalic acid unit, ethylene glycol unit and diethylene glycol unit in the thermoplastic polyester resin obtained were 50.0 mol %, 48.9 mol % and 1.1 mol %, respectively. The intrinsic viscosity, the melting point and the glass transition temperature were 0.83 dl/g, 252° C. and 80° C., respectively.

Using the resin composition prepared in Example 1 and the thermoplastic polyester (PES) prepared by the method described above, obtained was a two-kind three-layer parison of PES/resin composition/PES, through coinjection molding using a coinjection molding machine (model SL160, four cavities) manufactured by KORTEC/HUSKY. Concretely, the temperature of the PES injection zone was 280° C.; the temperature of the resin composition injection zone was 210° C.; the temperature of the hot runner block in which the PES and the resin composition were combined was 270° C.; the temperature of the injection mold core was 10° C.; and the temperature of the injection mold cavity was 10° C. When the parison was observed visually, no streaks were found and, therefore, the leading edge of the resin composition layer in the opening of the parison was in a good condition.

Thereafter, stretch blow molding was carried out by heating the parison to 105° C. at a surface temperature using a stretch blow molding machine (model LB01, one 530-mL cavity) manufactured by Crupp Corpoplast Maschinenbau, to give a two-kind three-layer type multilayer coinjection blow molded container. When the blow molded container was observed visually, neither streaks, bubbles nor gels were found and, therefore, the container had a good appearance. Using the multilayer blow molded container obtained, the incidence of delamination in the container, the haze of the container body and the oxygen transmission rate of the container were measured by the methods shown below.

(1) Incidence of Delamination in Multilayer Container:

100 molded bottles each are filled with water as a content and hermetically sealed with a stopper under normal pressure. Each bottle with its body being kept horizontally was spontaneously dropped from a height of 60 cm onto a triangular stand having a length of 20 cm and having an angle of 90° at its edge that faces the dropping bottle. The dropping test was effected only once, in which the edge of the stand is targeted to the center of the body of the bottle. From the number of the bottles in which delamination occurred, the incidence of delamination was calculated according to the following equation:

Incidence of delamination=[(number of bottles in which delamination occurred)/100]×100 (%)

(2) Haze of Multilayer Container:

The body of a bottle obtained was divided into four equal portions around the circumference at its center, and the internal haze of each of those four portions was measured with a Poic integrating-sphere light transmittance/complete light reflectance meter (HR-100 Model from Murakami Color Technology Laboratories) according to ASTM D1003-61. The data were averaged and the resulting mean value indicated the haze of the bottle.

(3) Oxygen Transmission Rate of Multilayer Container:

A bottle obtained was conditioned at 20° C. and 65% RH, and the oxygen transmission rate per one bottle (cc/container·day·atm) was measured using an oxygen transmission rate meter (OX-TRAN-10/50A manufactured by Modern Control, Inc.).

The above-mentioned evaluation results are summarized in Table 4. In addition, when the appearance of a container produced by stretch blow molding this parison was observed, neither streaks, bubbles nor gels were found and, therefore, the container had a good appearance.

EXAMPLE 22

Evaluation was carried out in the same manner as Example 21 except using the resin composition prepared in Example 4 as a resin composition. The results are shown in Table 4.

EXAMPLE 23

Evaluation was carried out in the same manner as Example 21 except using the resin composition prepared in Example 5 as a resin composition. The results are shown in Table 4.

EXAMPLE 24

Evaluation was carried out in the same manner as Example 21 except using the resin composition prepared in Example 11 as a resin composition. The results are shown in Table 4.

EXAMPLE 25

Evaluation was carried out in the same manner as Example 21 except using the resin composition prepared in Example 12 as a resin composition. The results are shown in Table 4.

COMPARATIVE EXAMPLE 12

The evaluations of the moldability of a parison, the incidence of delamination of a container, the haze of the body of a container and the oxygen transmission rate of the container were conducted in the same manner as Example 21 except using only the EVOH (F) used in Example 1 in place of the resin composition. The results are shown in Table 4.

COMPARATIVE EXAMPLE 13

The evaluations of the moldability of a parison, the incidence of delamination of a container, the haze of the body of a container and the oxygen transmission rate of the container were conducted in the same manner as Example 21 except using only the EVOH (F) used in Example 5 in place of the resin composition. The results are shown in Table 4.

COMPARATIVE EXAMPLE 14

The evaluations of the moldability of a parison, the incidence of delamination of a container, the haze of the body of a container and the oxygen transmission rate of the container were conducted in the same manner as Example 21 except using only the modified EVOH (C) obtained in Synthesis Example 1 in place of the resin composition. The results are shown in Table 4.

COMPARATIVE EXAMPLE 15

The evaluations of the moldability of a parison, the incidence of delamination of a container, the haze of the body of a container and the oxygen transmission rate of the container were conducted in the same manner as Example 21 except using the composition used in Comparative Example 9 in place of the resin composition. The results are shown in Table 4.

COMPARATIVE EXAMPLE 16

The evaluations of the moldability of a parison, the incidence of delamination of a container, the haze of the body of a container and the oxygen transmission rate of the container were conducted in the same manner as Example 21 except using the composition used in Comparative Example 10 in place of the resin composition. The results are shown in Table 4.

COMPARATIVE EXAMPLE 17

The evaluations of the moldability of a parison, the incidence of delamination of a container, the haze of the body of a container and the oxygen transmission rate of the container were conducted in the same manner as Example 21 except using the composition used in Comparative Example 11 in place of the resin composition. The results are shown in Table 4.

tion speed of 400 rpm and an extrusion resin amount of 25 kg/hr. Then hot air drying was carried out at 80° C. for 16 hour, yielding a resin composition.

TABLE 4

| | Resin composition or EVOH constituting the middle layer | | | | | | | |
|---|---|---|---|---|---|---|---|---|
| | Modified EVOH (C) | | | | Evaluation results | | | |
| | Epoxy compound (B) | Structural unit (I) content (mol %) | Ethylene content (mol %) | EVOH (F) Ethylene content (mol %) | Weight ratio (C.)/(F.) | Moldability of parison *1) | Incidence of delamination (%) | Haze (%) | Oxygen transmission rate *2) |
| Example 21 | 1,2-Epoxybutane | 4.8 | 32 | 32 | 20/80 | ○ | 8 | 2.1 | 0.012 |
| Example 22 | Epoxypropane | 5.5 | 32 | 32 | 50/50 | ○ | 6 | 2.0 | 0.014 |
| Example 23 | Epoxypropane | 5.5 | 32 | 44 | 20/80 | ○ | 9 | 2.6 | 0.017 |
| Example 24 | Epoxypropane | 8 | 44 | 32 *3) | 20/80 | ○ | 7 | 2.7 | 0.014 |
| Example 25 | Glycidol | 5 | 32 | 32 | 20/80 | ○ | 6 | 2.0 | 0.013 |
| Comparative Example 12 | — | — | — | 32 | 0/100 | X | 95 | 2.5 | 0.011 |
| Comparative Example 13 | — | — | — | 44 | 0/100 | X | 85 | 2.9 | 0.019 |
| Comparative Example 14 | 1,2-Epoxybutane | 4.8 | 32 | — | 100/0 | ○ | 5 | 2.7 | 0.019 |
| Comparative Example 15 | EVOH with low degree of saponification | | 32 | 32 | 20/80 | ○ | 78 | 2.7 | 0.015 |
| Comparative Example 16 | EVOH with low degree of saponification | | 32 | 32 | 50/50 | ○ | 53 | 2.6 | 0.021 |
| Comparative Example 17 | EVOH with low degree of saponification | | 44 | 32 | 20/80 | ○ | 77 | 3.2 | 0.018 |

*1) ○: A parison after molding had a leading edge of good conditions.
X: A parison after molding had a leading edge of bad conditions.
*2) Unit: cc/container · day · atm
*3) Boric acid treatment As shown in Examples 21-25, the coinjection stretch blow molded containers using resin compositions of the present invention are superior in moldability of a parison, delamination resistance, transparency and oxygen gas barrier property. In contrast to this, Comparative Examples 12 and 13, in which only an unmodified EVOH (F) was used, the moldability of a parison and delamination resistance are very poor. In Comparative Example 14 where only a modified EVOH (C) was used, the oxygen transmission rate increases though the delamination resistance is good. Furthermore, in Comparative Examples 15 to 17 where an EVOH of a low degree of saponification was incorporated, the incidence of delamination and the oxygen transmission rate increase.

In other words, the coinjection stretch blow molded container of the present invention can prevent delamination caused by impact without having an adhesive resin layer and it is superior in transparency and gas barrier properties. The containers are suitable for preserving various contents therein in good condition for a long period of time, and are especially useful as those for various beverages such as carbonated beverages, beer, wine and others, and also for various edibles or cosmetics.

EXAMPLE 26

Figure 12:
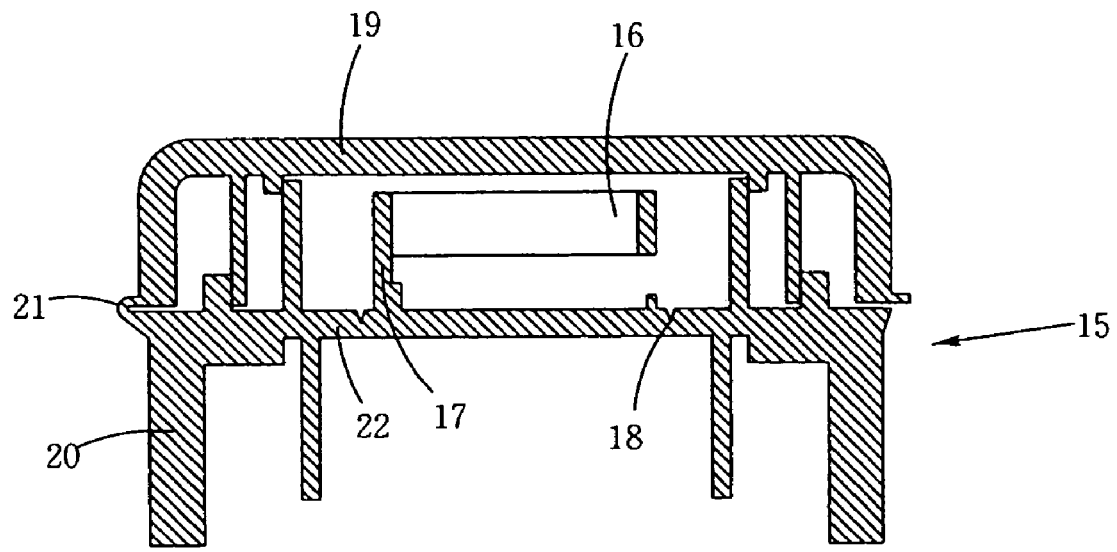
FIG. 12 shows the pouring opening with a pull-ring which was injection molded in Example 26.

30 parts by weight of the modified EVOH (C) used in Synthesis Example 1 as modified EVOH (C) and 70 parts by weight of a linear low density polyethylene (Ultozex 2022L manufactured by Mitsui Chemicals, Inc.) as polyolefin (G) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rota- Subsequently, the resin composition pellets were fed to a injection molding machine equipped with a mold for forming a molded article shown in FIG. 12. Then, a pouring opening with a pull ring coupled to a cap with a hinge was formed by injection molding. At that time, the injection molding machine was set to a cylinder temperature of 230° C. and a nozzle temperature of 220° C.

The thus-formed pouring opening with a pull ring was cut partly into a small piece. The modified EVOH (C) in the cut surface of the small piece was stained with iodine and the cut surface of the small piece was observed through an optical microscope. Thus, it was determined whether the modified EVOH (C) forms a continuous phase or a dispersed phase. The continuous phase was the linear low density polyethylene, whereas the modified EVOH (C) was present as a dispersed phase. Evaluation of the pouring opening with a pull ring was conducted in the manner described below. The components and the like of the resin composition and the evaluation results and the like of the molded article are summarized in Table 5 and Table 6, respectively.

(1) Barrier Property (Oxygen Transmission Rate)

The resin composition was melt extruded through a T-die at 240° C. to form a film 100 μm thick, which was then moisture conditioned under conditions: a temperature of 20° C. and 65% RH for 2 weeks and was determined for oxygen transmission rate (cc·20 μm/m$^2$·day·atm) according to JIS K7126 at a temperature of 20° C. at 65% RH using an oxygen transmission tester, Ox-Tran 10/50 Model (manufactured by Modern Control Inc., U.S.A.).

(2) Cap Strength

The molded pouring opening with a pull ring was moisture conditioned under conditions: a temperature of 20° C. and 65% RH for 2 weeks. Then, it was dropped five times from a height of 5 m and was checked for damage. The cap strength was determined according to the criteria shown below.

Criteria:
◎: No deformation was found after 5 droppings.
○: No deformation was found after 3 droppings, but cracks or damage was formed by 5 droppings.
Δ: No deformation was found after 1 dropping, but cracks or damage was found by 2 droppings.
X: Cracks or damage was formed by 2 droppings.

(3) Easy Openability 100 pouring openings with a pull ring were opened by pulling the pull ring with fingers. The condition of a thin portion cut by the force applied during the opening was judged according to the criteria shown below.

Criteria:
◎: The thin portion was cut and it is easy to open.
○: It is relatively easy to open.
X: It is difficult to open. The thin portion cannot be cut.

(4) Pull Ring Strength 100 pouring openings with a pull ring were opened by pulling the pull ring with fingers. They were evaluated whether they can be opened easily without causing breakage in their rings during the opening. The pull ring strength was determined according to the criteria shown below.

Criteria:
◎: The number of pull rings broken is up to 10.
○: The number of pull rings broken is more than 10 but not more than 30.
Δ: The number of pull rings broken is more than 30 but not more than 50.
X: The number of pull rings broken is more than 50.

(5) Hinge Strength 100 pouring openings with a pull ring were moisture conditioned under conditions: a temperature of 20° C. and 65% RH. Then, their caps were opened and closed repeatedly 200 times. The strength of the hinge was determined according to the criteria shown below.

Criteria:
◎: The number of pouring openings the hinges of which were broken is up to 10.
○: The number of pouring openings the hinges of which were broken is more than 10 but not more than 30.
Δ: The number of pouring openings the hinges of which were broken is more than 30 but not more than 50.
X: The number of pouring openings the hinges of which were broken is more than 50.

(6) Recyclability

Flashes formed in the injection molding of pouring openings with a pull ring, such as those formed at a liner portion, were crushed, fed again to an injection molding machine, and molded again into pouring opening with a pull ring under the same conditions as mentioned previously. The molded articles were evaluated for the above-described items except the evaluation of barrier property.

EXAMPLE 27

30 parts by weight of the modified EVOH (C) obtained in Synthesis Example 3 as modified EVOH (C), 65 parts by weight of a linear low density polyethylene (Ultozex 2022L manufactured by Mitsui Chemicals, Inc.) as polyolefin (G) and 5 parts by weight a metal salt of an ethylene-methacrylic acid random copolymer (content of methacrylic acid in the copolymer: 7.5 mol %, counter ion: Zn, neutralization degree: 40%, melt flow rate (at 190° C. under a load of 2160 g): 1.1 g/10 min) as compatibilizer (H) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rotation speed of 400 rpm and an extrusion resin amount of 25 kg/hr. Then, hot air drying was carried out at 80° C. for 16 hour, yielding a resin composition. Using the resulting resin composition, evaluations were conducted in the same manner as Example 26. The components and the like of the resin composition and the evaluation results and the like of the molded article are summarized in Table 5 and Table 6, respectively.

EXAMPLE 28

20 parts by weight of the EVOH (F) used in Example 5 and 15 parts by weight of the modified EVOH (C) obtained in Synthesis Example 4 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then, hot air drying was carried out at 80° C. for 16 hour, yielding a resin composition composed of EVOH (F) and modified EVOH (C). Subsequently, 35 parts by weight of the resulting resin composition composed of EVOH (F) and modified EVOH (C) and 65 parts by weight of a linear low density polyethylene (Ultozex 2022L manufactured by Mitsui Chemicals, Inc.) as polyolefin (G) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rotation speed of 400 rpm and an extrusion resin amount of 25 kg/hr. Then, hot air drying was carried out at 80° C. for 16 hour, yielding a resin composition. Using the resulting resin composition, evaluations were conducted in the same manner as Example 26. The components and the like of the resin composition and the evaluation results and the like of the molded article are summarized in Table 5 and Table 6, respectively.

EXAMPLE 29

20 parts by weight of the EVOH (F) used in Example 1 and 15 parts by weight of the modified EVOH (C) obtained in Synthesis Example 4 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then, hot air drying was carried out at 80° C. for 16 hour, yielding a resin composition composed of EVOH (F) and modified EVOH (C). Subsequently, 35 parts by weight of the resulting resin composition composed of EVOH (F) and modified EVOH (C), 60 parts by weight of a linear low density polyethylene (Ultozex 2022L manufactured by Mitsui Chemicals, Inc.) as polyolefin (G) and 5 parts by weight of a material prepared in the manner described below as compatibilizer (H) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rotation speed of 400 rpm and an extrusion resin amount of 25 kg/hr. Then, hot air drying was carried out at 80° C. for 16 hour, yielding a resin composition.

Production Method of Compatibilizer (H):

To a 37φ twin screw extruder including a resin feeder (the inlet section of the extruder), a liquid feeder (the middle section of the extruder) and vents (provided at two points, before the liquid feeder and before the outlet of the extruder), an ultra low density polyethylene ("Excellen" (commercial name) EUL430 manufactured by Sumitomo Chemical Co., Ltd.) (melt index (MI): 4 g/10 min (at 190° C. under a load of 2160 g), amount of double bond: $4.7 \times 10^{-2}$ meq/g, density: 0.89 g/cm$^3$) was fed at a rate of 8 kg/hr. On the other hand, from the liquid feeder, a mixed solution of triethylamine borane and boric acid 1,3-butanediol ester with a weight ratio of 29:71 was added at a rate of 0.2 kg/hr (0.058 kg/hr for triethylamine borane and 0.142 kg/hr for boric acid 1,3-butanediolester). Thus, an ultra low density polyethylene with a melt index (MI) of 4 g/10 min (at 190° C. under a load of 2160 g) was obtained which had on its terminal 0.03 meq/g of boric acid 1,3-butanediol ester group. This ultra low density polyethylene with a boric acid 1,3-butanediol ester group was used as compatibilizer (H).

Extruder:
TEM-35B (Toshiba Machine Co., Ltd.)
D=37 mm, L/D=53.8
Position of liquid feeder: C8
Position of vent: C6 and C14
Temperature setting
C1-C6: 240° C.
C7-C15: 260° C.
Die: 250° C.
Screw rotation speed: 100 rpm Using the resulting resin composition, evaluations were conducted in the same manner as Example 26. The components and the like of the resin composition and the evaluation results and the like of the molded article are summarized in Table 5 and Table 6, respectively.

COMPARATIVE EXAMPLE 18

Using only the linear low density polyethylene (Ultozex 2022L manufactured by Mitsui Chemicals, Inc.) used in Example 26, evaluations were conducted in the same manner as Example 26. The components and the like of the resin composition and the evaluation results and the like of the molded article are summarized in Table 5 and Table 6, respectively.

COMPARATIVE EXAMPLE 19

Using only the EVOH (F) used in Example 5, evaluations were conducted in the same manner as Example 26. The components and the like of the resin composition and the evaluation results and the like of the molded article are summarized in Table 5 and Table 6, respectively.

COMPARATIVE EXAMPLE 20

Using 30 parts by weight of the EVOH (F) used in Example 1 and 70 parts by weight of a linear low density polyethylene (Ultozex 2022L manufactured by Mitsui Chemicals, Inc.) as polyolefin (G), twin screw extrusion was conducted in the same manner as Example 26 to obtain a resin composition. Using the resulting resin composition, evaluations were conducted in the same manner as Example 26. The components and the like of the resin composition and the evaluation results and the like of the molded article are summarized in Table 5 and Table 6, respectively.

COMPARATIVE EXAMPLE 21

Using 30 parts by weight of the EVOH (F) used in Example 1, 65 parts by weight of a linear low density polyethylene (Ultozex 2022L manufactured by Mitsui Chemicals, Inc.) as polyolefin (G) and 5 parts by weight of the compatibilizer (H) used in Example 27, twin screw extrusion was conducted in the same manner as Example 26 to obtain a resin composition. Using the resulting resin composition, evaluations were conducted in the same manner as Example 26. The components and the like of the resin composition and the evaluation results and the like of the molded article are summarized in Table 5 and Table 6, respectively.

COMPARATIVE EXAMPLE 22

Using 35 parts by weight of the EVOH (F) used in Example 5 and 65 parts by weight of a linear low density polyethylene (Ultozex 2022L manufactured by Mitsui Chemicals, Inc.) as polyolefin (G), twin screw extrusion was conducted in the same manner as Example 26 to obtain a resin composition. Using the resulting resin composition, evaluations were conducted in the same manner as Example 26. The components and the like of the resin composition and the evaluation results and the like of the molded article are summarized in Table 5 and Table 6, respectively.

COMPARATIVE EXAMPLE 23

Using 30 parts by weight of the EVOH (F) used in Example 5, 65 parts by weight of a linear low density polyethylene (Ultozex 2022L manufactured by Mitsui Chemicals, Inc.) as polyolefin (G) and 5 parts by weight of the compatibilizer (H) used in Example 29, twin screw extrusion was conducted in the same manner as Example 26 to obtain a resin composition. Using the resulting resin composition, evaluations were conducted in the same manner as Example 26. The components and the like of the resin composition and the evaluation results and the like of the molded article are summarized in Table 5 and Table 6, respectively.

TABLE 5

|  | | Modified EVOH (C) | | | | | | |
|---|---|---|---|---|---|---|---|---|
|  | Epoxy compound (B) | Structural unit (I) content (mol %) | Ethylene content (mol %) | EVOH(F) Ethylene content (mol %) | Polyolefin (G) | Compatibilizer (H) | Weight ratio (C)/(F)/ (G)/(H) | Continuous phase |
| Comparative Example 26 | 1,2-Epoxybutane | 4.8 | 32 | — | LLDPE | — | 30/0/70/0 | LLDPE |
| Comparative Example 27 | Epoxypropane | 5.5 | 32 | — | LLDPE | *1) | 30/0/65/5 | LLDPE |

TABLE 5-continued

|  | Modified EVOH (C) | | | EVOH(F) | | | Weight | |
|---|---|---|---|---|---|---|---|---|
|  | Epoxy compound (B) | Structural unit (I) content (mol %) | Ethylene content (mol %) | Ethylene content (mol %) | Polyolefin (G) | Compatibilizer (H) | ratio (C)/(F)/ (G)/(H) | Continuous phase |
| Comparative Example 28 | Epoxypropane | 8 | 44 | 44 | LLDPE | — | 15/20/65/0 | LLDPE |
| Comparative Example 29 | Epoxypropane | 8 | 44 | 32 | LLDPE | *2) | 15/20/60/5 | LLDPE |
| Comparative Example 18 | — | — | — | — | LLDPE | — | 0/0/100/0 | LLDPE |
| Comparative Example 19 | — | — | — | 44 | — | — | 0/100/0/0 | EVOH |
| Comparative Example 20 | — | — | — | 32 | LLDPE | — | 0/30/70/0 | LLDPE |
| Comparative Example 21 | — | — | — | 32 | LLDPE | *1) | 0/30/65/5 | LLDPE |
| Comparative Example 22 | — | — | — | 44 | LLDPE | — | 0/35/65/0 | LLDPE |
| Comparative Example 23 | — | — | — | 44 | LLDPE | *2) | 0/35/60/5 | LLDPE |

*1) Ethylene-methacrylic acid copolymer
*2) Boronic acid ester group-containing ultra low density polyethylene

TABLE 6

|  | Oxygen transmission rate *1) | Cap strength | Easy openability | Ring strength | Hinge strength | Recyclability | | | |
|---|---|---|---|---|---|---|---|---|---|
|  |  |  |  |  |  | Cap strength | Easy openability | Ring strength | Hinge strength |
| Example 26 | 230 | ◎ | ○ | ○ | Δ | ○ | ○ | ○ | Δ |
| Example 27 | 190 | ◎ | ◎ | ◎ | ○ | ◎ | ◎ | ◎ | ○ |
| Example 28 | 250 | ◎ | ○ | ○ | ◎ | ○ | ○ | ○ | ○ |
| Example 29 | 160 | ◎ | ◎ | ◎ | ◎ | ◎ | ◎ | ◎ | ◎ |
| Comparative Example 18 | 4,500 | ◎ | ◎ | ◎ | ◎ | ◎ | ◎ | ◎ | ◎ |
| Comparative Example 19 | 1.5 | X | X | X | X | X | X | X | X |
| Comparative Example 20 | 90 | X | X | X | X | X | X | X | X |
| Comparative Example 21 | 100 | Δ | X | Δ | X | X | X | X | X |
| Comparative Example 22 | 140 | X | X | X | X | X | X | X | X |
| Comparative Example 23 | 180 | Δ | X | Δ | X | X | X | X | X |

*1) cc · 20 μm/m² · day · atm

The pouring openings with a pull ring of the present invention obtained in Examples 26 to 29 were superior in barrier property and also demonstrated satisfactory cap strengths in the dropping evaluation. Moreover, they are superior in easy openability and also are excellent in mechanical strengths such as ring strength and hinge strength. Comparative Example 18 where only polyolefin (G) was used resulted in an extremely poor gas barrier property. Regarding Comparative Example 19 where only EVOH (F) was used, Comparative Examples 20 and 22 where EVOH (F) and polyolefin (G) were used, and Comparative Examples 21 and 23 where EVOH (F) polyolefin (G) and compatibilizer (H) were used, the mechanical strengths such as cap strength, ring strength and hinge strength were unsatisfactory. The easy openability and the recyclability as well were also poor.

EXAMPLE 30

30 parts by weight of the modified EVOH (C) obtained in Synthesis Example 3 as modified EVOH (C), 65 parts by weight of a polypropylene (Novatec PP BC03B manufactured by Japan Polychem Corp.) as polyolefin (G) and 5 parts by weight a material prepared in the manner described below as compatibilizer (H) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rotation speed of 400 rpm and an extrusion resin amount of 25 kg/hr. Then, hot air drying was carried out at 80° C. for 16 hours, yielding a resin composition.

Production Method of Compatibilizer (H):

To a reactor equipped with a stirrer, a nitrogen-introduction tube, a cooling tube and a distillation column, 500 parts by weight of "Tuftec H1062" manufactured by Asahi Kasei Chemicals Corp. and 1500 parts by weight of decalin were charged. After replacement with nitrogen by pressure reduction, the temperature in the reactor was set to 130° C. and the solute was dissolved by stirring. To the solution, a mixture of 57.5 parts by weight of triethylamine borane and 143 parts by weight of 1,3-butanediol ester were added and was stirred for five minutes. Then, the stirring was stopped and the temperature in the reactor was elevated to 200° C. After a while from the elevation of the temperature, the entire system gelled and then the gel started to dissolve from the wall of the reactor. When it became possible to stir, stirring was resumed. Following heating the system for additional one hour after complete disappearance of the gel in the reactor, the cooling tube was switched to the distillation column and distillation under normal pressure was started. The temperature in the reactor was elevated up to 220° C. and the distillation was continued until running out almost stopped. After cooling the resulting solution of polymer, the solution was reprecipitated in 5 parts by weight of acetone. Moreover, the precipitate was vacuum dried overnight at 120° C., resulting in a hydrogenated product of a polystyrene-polybutadiene-polystyrene triblock copolymer having 0.22 mmol/g of boronic acid 1,3-butanediol ester groups. The triblock copolymer having boronic acid 1,3-butanediol ester groups was employed as compatibilizer (H).

Figure 13:
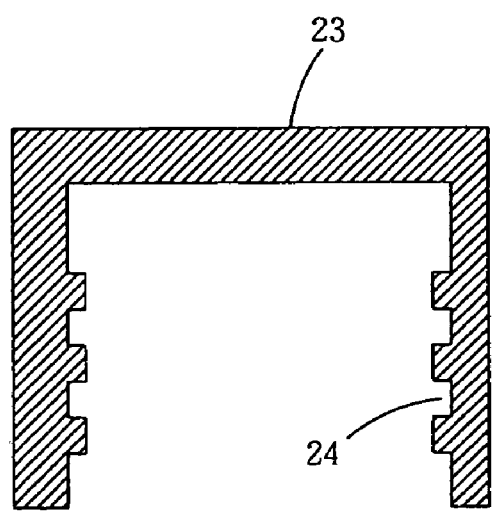
FIG. 13 shows the cap of a container which was injection molded in Example 30.

Subsequently, the resin composition pellets were fed to a injection molding machine equipped with a mold for forming a molded article shown in FIG. 13. Then, a cap for a container was formed by injection molding. At that time, the injection molding machine was set to a cylinder temperature of 230° C. and a nozzle temperature of 220° C.

The thus-formed container cap was cut partly into a small piece. The modified EVOH (C) in the cut surface of the small piece was stained with iodine and the cut surface of the small piece was observed through an optical microscope. Thus, it was determined whether the modified EVOH (C) forms a continuous phase or a dispersed phase. The continuous phase was the polypropylene, whereas the modified EVOH (C) was present as a dispersed phase. Evaluation of the formed container cap was conducted in the manner described below. The evaluation results are summarized in Table 7.

(1) Barrier Property (Oxygen Transmission Coefficient)

The resin composition was melt extruded through a T-die at 240° C. to form a film of 100 μm thick, which was then moisture conditioned under conditions: a temperature of 20° C. and 65% RH for 2 weeks and was determined for its oxygen transmission rate (cc·20 μm/m²·day·atm) according to JIS K7126 at a temperature of 20° C. at 65% RH using an oxygen transmission tester, Ox-Tran 10/50 Model (manufactured by Modern Control Inc., U.S.A.).

(2) Cap Strength

The formed container cap was moisture conditioned under conditions: a temperature of 20° C. and 65% RH for a month. Then, it was dropped five times from a height of 5 m and was checked for damage. The cap strength was determined according to the criteria shown below.

Criteria:

◎: No deformation was found after 5 droppings.

○: No deformation was found after 3 droppings, but cracks or damage was formed by 5 droppings.

Δ: No deformation was found after 1 dropping, but cracks or damage was found by 2 droppings.

X: Cracks or damage was formed by 2 droppings.

(3) Recyclability

Flashes formed in the injection molding of container caps, such as those formed at a liner portion, were crushed, fed again to an injection molding machine, and molded again into container caps under the same conditions as mentioned previously. Molded articles were evaluated for the above-described item (2) cap strength.

EXAMPLE 31

20 parts by weight of the EVOH (F) used in Example 1 and 15 parts by weight of the modified EVOH (C) obtained in Synthesis Example 4 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then, hot air drying was carried out at 80° C. for 16 hours, yielding a resin composition composed of EVOH (F) and modified EVOH (C).

Subsequently, 35 parts by weight of the resulting resin composition composed of EVOH (F) and modified EVOH (C), 60 parts by weight of a polypropylene (Novatec PP BC03B manufactured by Japan Polychem Corp.) as polyolefin (G) and 5 parts by weight of the compatibilizer (H) used in Example 30 as compatibilizer (H) were dry blended. Using a 30 mmφ twin screw extruder (TEX-30SS-30CRW-2V manufactured by The Japan Steel Works, LTD.), the blend was extruded into pellets at an extrusion temperature of 210° C. under conditions: a screw rotation speed of 400 rpm and an extrusion resin amount of 25 kg/hr. Then, hot air drying was carried out at 80° C. for 16 hours, yielding a resin composition. Using the resulting resin composition, evaluations were conducted in the same manner as Example 30. The evaluation results are summarized in Table 7.

COMPARATIVE EXAMPLE 24

Using only the polypropylene (Novatec PP BC03B manufactured by Japan Polychem Corp.) used in Example 30, evaluations were conducted in the same manner as Example 30. The evaluation results are summarized in Table 7.

COMPARATIVE EXAMPLE 25

Using only the EVOH (F) used in Example 5, evaluations were conducted in the same manner as Example 30. The evaluation results are summarized in Table 7.

COMPARATIVE EXAMPLE 26

Using 30 parts by weight of the EVOH (F) used in Example 1, 65 parts by weight of a polypropylene (Novatec PP BC03B manufactured by Japan Polychem Corp.) as polyolefin (G) and 5 parts by weight of the compatibilizer (H) used in Example 30, twin screw extrusion was conducted in the same manner as Example 30, yielding a resin composition. Using the resulting resin composition, evaluations were conducted in the same manner as Example 30. The evaluation results are summarized in Table 7.

COMPARATIVE EXAMPLE 27

Using 30 parts by weight of the EVOH (F) used in Example 5, 65 parts by weight of a polypropylene (Novatec PP BC03B manufactured by Japan Polychem Corp.) as polyolefin (G) and 5 parts by weight of the compatibilizer (H) used in Example 30, twin screw extrusion was conducted in the same manner as Example 30, yielding a resin composition. Using the resulting resin composition, evaluations were conducted in the same manner as Example 30. The evaluation results are summarized in Table 7.

TABLE 7

| | Modified EVOH (C) | | | | | | | | | | |
|---|---|---|---|---|---|---|---|---|---|---|---|
| | Epoxy compound (B) | Structural unit (I) content (mol %) | Ethylene content (mol %) | EVOH (F) Ethylene content (mol %) | Polyolefin (G) | Compatibilizer (H) | Weight ratio (C)/(F)/(G)/(H) | Continuous phase | Oxygen transmission rate *1) | Cap strength | Recycled cap strength |
| Example 30 | Epoxy-propane | 5.5 | 32 | — | PP | *2) | 30/0/65/5 | PP | 150 | ◎ | ◎ |
| Example 31 | Epoxy-propane | 8 | 44 | 32 | PP | *2) | 15/20/60/5 | PP | 130 | ◎ | ◎ |
| Comparative Example 24 | — | — | — | — | PP | — | 0/0/100/0 | PP | 2,000 | ◎ | ◎ |
| Comparative Example 25 | — | — | — | 44 | — | — | 0/100/0/0 | EVOH | 1.5 | X | X |
| Comparative Example 26 | — | — | — | 32 | PP | *2) | 0/30/65/5 | PP | 90 | Δ | X |
| Comparative Example 27 | — | — | — | 44 | PP | *2) | 0/35/60/5 | PP | 160 | Δ | X |

*1) cc · 20 μm/m² · day · atm
*2) Boronic acid ester group-containing triblock copolymer The container caps using the resin compositions of the present invention obtained in Examples 30 and 31 were superior in barrier properties and also demonstrated satisfactory cap strengths in the dropping evaluation. Moreover, the resin compositions demonstrated superior cap strengths even after recycling. On the other hand, Comparative Example 24, which comprises only polyolefin (G), exhibited an extremely poor gas barrier property. In Comparative Example 25, which comprises only EVOH (F), and Comparative Examples 26 and 27, which comprise EVOH (F), polyolefin (G) and compatibilizer (H), the cap strength was unsatisfactory. Moreover, the recyclability was also poor.

EXAMPLE 32

80 parts by weight of the EVOH (F) used in Example 11, 10 parts by weight of the modified EVOH (C) obtained in Synthesis Example 4 and 10 parts by weight of the compatibilizer (H) used in Example 29 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then, hot air drying was carried out at 80° C. for 16 hours, yielding a resin composition. The melt flow rate (at 190° C. under a load of 2160 g) was 1.1 g/10 min.

Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance and stretchability. The evaluation results of the film and sheets are summarized in Table 8.

Next, using the resin composition obtained, a multilayer sheet (polypropylene resin layer/adhesive resin layer/resin composition layer/adhesive resin layer/polypropylene resin layer) was prepared by means of a three-kind five-layer coextrusion machine shown later under coextrusion molding conditions also described later. The sheet constitution is as follows: the layers of the polystyrene resin ("EG-7FT" manufactured by Japan Polychem Corp.), both outermost layers: 425 μm each; the layers of the adhesive resin ("AD-MER QF500" manufactured by Mitsui Chemicals, Inc.): 50 μm each; and the layer of the resin composition: 50 μm.

The coextrusion molding conditions are as follows.

Layer Constitution:
polypropylene resin/adhesive resin/resin composition/adhesive resin/polypropylene resin
(thickness 425/50/50/50/425; unit: μm)

Specifications of Extruder and Extrusion Temperature for Each Resin:

Polypropylene Resin:
65φ extruder, model 20VSE-65-22 (manufactured by Osaka Seiki Co., Ltd.)
C1/C2/C3/C4/AD=200/210/230/240/240° C.

Adhesive Resin:
40φ extruder, model 10VSE-40-22 (manufactured by Osaka Seiki Co., Ltd.)
C1/C2/C3/C4/AD=130/180/210/220/220° C.

Resin Composition:
40φ extruder, model VSVE-40-24 (manufactured by Osaka Seiki Co., Ltd.)
C1/C2/C3/C4/AD=175/210/220/220/220° C.

Specifications of T-Die:
for 600 mm-wide three-kind five-layer extrusion (manufactured by RESEARCH LABORATORY OF PLASTICS TECHNOLOGY CO., LTD.)
AD/Die=240/240° C.
Temperature of cooling roll: 80° C.
Drawing speed: 1.2 m/min The resulting multilayer sheet was crushed and then was extruded into pellets at an extrusion temperature of 240° C. under conditions: a screw rotation speed of 300 rpm and an extrusion resin amount of 25 kg/hr by use of a 30 mmφ twin screw extruder (TEX-30SS-30CRW-2V manufactured by The Japan Steel Works, LTD.). Then, hot air drying was carried out at 80° C. for 8 hours, yielding recycled pellets.

Using the thus-obtained recycled pellets, film formation was carried out under the extrusion conditions shown below by means of a film forming machine composed of a 40φ extruder (PLABOR GT-40-A manufactured by RESEARCH LABORATORY OF PLASTICS TECHNOLOGY CO., LTD.) and a T-die. Thus, a monolayer film of 25 μm thick was obtained.

Type: Single screw extruder (non-vent type)
L/D: 24
Bore diameter: 40 mmφ
Screw: Single-thread full-flight type, nitrided surface steel
Screw rotation speed: 40 rpm
Die: Coat hanger die of 550 mm wide
Gap between lips: 0.3 mm Temperatures Set for Cylinders and Die:
C1/C2/C3/adaptor/die=200/230/240/240/240 (° C.)

Using the monolayer film prepared above, the external appearance of the film and the dispersion condition of EVOH were evaluated according to the criteria shown below. Thus, the recyclability (recoverability) was judged. Moreover, the dispersion condition of EVOH was observed by SEM by etching a cut surface of the resulting monolayer film with a methanol/isopropanol mixed solvent (50/50 vol %).

and stretchability. In addition, the evaluation of recyclability (recoverability) was conducted in the same manner as Example 32. The evaluation results are summarized in Table 8.

COMPARATIVE EXAMPLE 28

A monolayer film, a monolayer sheet and a multilayer sheet were produced in the same manner as Example 1 using the EVOH (F) used in Example 11 in place of the resin composition. These were measured for their oxygen transmission rate, carbon dioxide gas transmission rate and haze and were evaluated for their flexing resistance and stretchability. In addition, the evaluation of recyclability (recoverability) was conducted in the same manner as Example 32. The evaluation results are summarized in Table 8.

TABLE 8

| | Oxygen transmission rate *1) | Carbon dioxide gas transmission rate *1) | Young's modulus (kgf/mm$^2$) | Tensile strength at yield (kgf/mm$^2$) | Tensile elongation at break (%) | Haze (%) | Flexing resistance (Np1) *2) | Maximum elongation ratio of monlayer sheet (times) | Stretchability of multilayer sheet | Recyclability |
|---|---|---|---|---|---|---|---|---|---|---|
| Example 32 | 0.8 | 3.0 | 159 | 6.1 | 320 | 0.4 | 200 | 4.25 × 4.25 | A | A |
| Example 33 | 0.8 | 2.8 | 151 | 5.8 | 330 | 0.4 | 220 | 4.25 × 4.25 | A | A |
| Comparative Example 28 | 0.3 | 1.8 | 195 | 7.5 | 201 | 0.4 | 36 | 2.25 × 2.25 | E | D |

*1) Unit: cc · 20 μm/m$^2$ · day · atm
*2) Np1: The number of flexures until one pinhole is formed.

Criteria:
A: The number of pimples is less than 10 pimples/100 cm$^2$ and the diameter of dispersed particles of EVOH is approximately up to 1 μm.
B: The number of pimples is not less than 10 pimples/100 cm$^2$ but less than 50 pimples/100 cm$^2$ and the diameter of dispersed particles of EVOH is approximately from 1 to 5 μm.
C: The number of pimples is not less than 50 pimples/100 cm$^2$ but less than 100 pimples/100 cm$^2$ and the diameter of dispersed particles of EVOH is approximately from 5 to 10 μm.
D: The number of pimples is not less than 100 pimples/100 cm$^2$ and there are many dispersed particles of EVOH having diameters greater than 10 μm.

EXAMPLE 33

80 parts by weight of the EVOH (F) used in Example 11, 10 parts by weight of the modified EVOH (C) obtained in Synthesis Example 4 and 10 parts by weight of the compatibilizer (H) used in Example 30 were dry blended. Using a 30 mmφ twin screw extruder (TEX-30SS-30CRW-2V manufactured by The Japan Steel Works, LTD.), the blend was extruded into pellets at an extrusion temperature of 200° C. under conditions: a screw rotation speed of 300 rpm and an extrusion resin amount of 25 kg/hr. Then, hot air drying was carried out at 80° C. for 16 hours, yielding a resin composition. The melt flow rate (at 190° C. under a load of 2160 g) was 1.2 g/10 min. Using the thus obtained resin composition, a monolayer film, a monolayer sheet and a multilayer sheet were produced in the same manner as Example 1. These were measured for their oxygen transmission rate, carbon dioxide gas transmission rate and haze and were evaluated for their flexing resistance As shown in Examples 32 and 33, the resin compositions of the present invention comprising EVOH (F), modified EVOH (C) and compatibilizer (H) have a low Young's modulus, a low tensile elongation at break and a high tensile strength at yield and demonstrate good flexing resistance, stretchability and recyclability. Regarding gas barrier properties, these resin compositions have comparable performances to unmodified EVOH (F). On the other hand, as shown in Comparative Example 27, unmodified EVOH (F) does not achieve sufficient flexing resistance, stretchability or recyclability.

The following are Examples of dynamically crosslinked resin compositions. Molded articles (specimens) were produced in the manner described below by use of pellets of the resin compositions obtained in the following Examples and Comparative Examples. The molded articles were measured in the manner described below for properties, namely, oxygen transmission coefficient, elastic modulus, 100% modulus, tensile strength at break, tensile elongation at break and diameter of dispersed elastomer particles.

(1) Measurement of Oxygen Transmission Coefficient:

Pellets of the resin compositions manufactured in Examples and Comparative Examples described below were compression molded into 100 μm-thick sheet-like specimens while being heated by use of a compression molding machine. Using the specimens, measurement of oxygen transmission coefficient was conducted. The measurement of oxygen transmission coefficient was conducted under conditions: an oxygen pressure of 0.34 MPa, a temperature of 35° C. and a humidity of 0% RH by use of a gas permeability rate analyzer ("GTR-10" manufactured by Yanaco Tec Corp.)

(2) Measurement of Elastic Modulus:

Using pellets of the resin compositions produced in Examples and Comparative Examples described below, the pellets were compressed molded into sheets of 1 mm thick while being heated by means of a compression molding machine. From these sheets 5 mm-wide strip-shaped specimens were produced. The specimens were measured for dynamic viscoelasticity under tensile loading. Thus, the elastic modulus at room temperature was determined. The measurement of dynamic viscoelasticity was conducted at a frequency of 1 Hz using a viscoelasticity analyzer ("DVE-V4" manufactured by Rheology Co., Ltd.)

(3) Measurements of Tensile Strength at Break, Tensile Elongation at Break and 100% Modulus:

Dumbbell specimens of 2 mm in thickness and 5 mm in width were prepared by molding the pellets of the resin compositions manufactured in Examples, Comparative Examples or Reference Examples shown below under conditions including a cylinder temperature of 210° C. and a mold temperature of 40° C. using a 15-ton injection molding machine ("ROBOSHOT-α15" produced by FANUC Co., Ltd.). Using the dumbbell specimens obtained above, the tensile strength at break, the tensile elongation at break and the 100% modulus were measured at 500 mm/min in accordance with JIS K6301 with an AUTOGRAPH produced by Shimadzu Corporation.

(4) Measurement of Average Diameter of Dispersed Particles of Elastomer (J):

The average diameter of dispersed particles was determined by electron staining of cut surfaces of the resin compositions manufactured in Examples and Comparative Examples shown below, followed by observation through a scanning electron microscope. In Table 2 below, the symbol "-" indicates that elastomer (J) forms not a dispersed phase but a matrix phase or that the elastomer (J) comprises a single phase.

The particulars of the modified EVOH (C), elastomer (J) and crosslinking agent (K) used in Examples and Comparative Examples shown below are as follows.

Modified EVOH (C)

Employed was the modified EVOH (C) obtained in Synthesis Example 1 having an ethylene content of 32 mol % and a content of structural unit (I) of 4.8 mol %.

Elastomer (J-1)

A triblock copolymer which is made up of polystyrene block-hydrogenated polybutadiene block-polystyrene block and which contains maleic anhydride groups (styrene unit content=30 mass %, molecular weight=100,000, acid value=5 mg $CH_3ONa$/g, amount of maleic anhydride group=6.5 groups/molecule).

Elastomer (J-2)

A triblock copolymer which is made up of polystyrene block-hydrogenated polybutadiene block-polystyrene block and which contains 210 μeq/g of boronic acid 1,3-butanediol ester group (styrene unit content=30 mass %, molecular weight=100,000, amount of boronic acid 1,3-butanediol ester group=21 groups/molecule).

Crosslinking Agent (K-1):
1,9-nonanediamine

Crosslinking Agent (K-2):
Inositol

EXAMPLES 34-39

(1) The above-mentioned modified EVOH (C), elastomer (J) and crosslinking agent (K) at the proportions shown in the following Table 9 were preliminarily mixed, followed by supplying the mixture to a twin screw extruder ("ZSK-25WLE" manufactured by Krupp Werner & Pfleiderer), melt kneading under conditions: a cylinder temperature of 200° C. and a screw rotation speed of 350 rpm, extruding and cutting. Pellets of each resin composition were prepared thereby.

(2) Using the pellets of the resin compositions prepared in (1) above, press films and molded articles (specimens) were produced in the methods mentioned previously. Their oxygen transmission coefficients, elastic moduli at 20° C., tensile strengths at break, tensile elongations at break and 100% moduli were measured by the methods described above. The results are shown in Table 9 below.

TABLE 9

|  | Example 34 | Example 35 | Example 36 | Example 37 | Example 38 | Example 39 |
|---|---|---|---|---|---|---|
| Modified EVOH (C) | 70 | 50 | 30 | 70 | 50 | 30 |
| Elastomer (J-1) | 30 | 50 | 70 |  |  |  |
| Elastomer (J-2) |  |  |  | 30 | 50 | 70 |
| Crosslinking agent (K-1) | 0.2 | 0.4 | 0.4 |  |  |  |
| Crosslinking agent (K-2) |  |  |  | 5 | 5 | 5 |
| Oxygen transmission coefficient (ml · 20 μm/m² · day · atm) | 12 | 23 | 155 | 16 | 30 | 175 |
| Elastic modulus (Pa) | $2.4 \times 10^8$ | $9.1 \times 10^7$ | $3.8 \times 10^7$ | $2.8 \times 10^8$ | $9.5 \times 10^7$ | $3.9 \times 10^7$ |
| 100% modulus (MPa) | 18 | 12 | 10 | 19 | 13 | 10 |
| Tensile strength at break (MPa) | 27 | 15 | 15 | 27 | 16 | 16 |
| Tensile elongation at break (%) | 230 | 365 | 520 | 215 | 360 | 475 |
| Average diameter of dispersed particles (μm) | 8 | 9 | 10 | 10 | 12 | 12 |

COMPARATIVE EXAMPLES 29 AND 30

(1) The above-mentioned modified EVOH (C) and elastomer (J) at the proportions shown in the following Table 10 were preliminarily mixed, followed by supplying the mixture to a twin screw extruder ("ZSK-25WLE" manufactured by Krupp Werner & Pfleiderer) without addition of crosslinking agent (K), melt kneading under conditions: a cylinder temperature of 200° C. and a screw rotation speed of 350 rpm, extruding and cutting. Pellets of each resin composition were prepared thereby.

(2) Using the pellets of the resin compositions prepared in (1) above, press films and molded articles (specimens) were produced in the methods mentioned previously. Their oxygen transmission coefficients, elastic moduli, tensile strengths at break, tensile elongations at break and 100% moduli were measured by the methods described previously. The results are shown in Table 10 below.

COMPARATIVE EXAMPLES 31-33

(1) Using the pellets alone, a press film and a molded article (specimen) were prepared by the method described previously.
(2) The oxygen transmission coefficients, elastic moduli, tensile strengths at break, tensile elongations at break and 100% moduli were measured by the methods described previously. The results are shown in Table 10 below.

TABLE 10

|  | Comparative Example 29 | Comparative Example 30 | Comparative Example 31 | Comparative Example 32 | Comparative Example 33 |
|---|---|---|---|---|---|
| Modified EVOH (C) | 30 | 30 | 100 | | |
| Elastomer (J-1) | 70 | | | 100 | |
| Elastomer (J-2) | | 70 | | | 100 |
| Oxygen transmission coefficient (ml · 20 μm/m² · day · atm) | 67000 | 58000 | 2.5 | 110000 | 110000 |
| Elastic modulus (Pa) | $2.9 \times 10^7$ | $3.0 \times 10^7$ | $9.0 \times 10^8$ | $8.8 \times 10^6$ | $8.6 \times 10^6$ |
| 100% modulus (MPa) | 7 | 8 | — | 2.3 | 1.9 |
| Tensile strength at break (MPa) | 8 | 9 | 53 | 8.5 | 8.2 |
| Tensile elongation at break (%) | 230 | 210 | 56 | 550 | 520 |
| Average diameter of dispersed particles (μm) | — | — | — | — | — |

The results given in Table 9 above show that the use of the resin compositions of Examples 34 to 39, which were produced using modified EVOH (C), elastomer (J) and crosslinking agent (K), gives good gas barrier properties such that the oxygen transmission coefficient ranges from 12 to 175 ml·20 μm/m²·day·atm (1.4 to 20 fm·20 μm/Pa·s) and that high-quality molded articles superior in various properties such as mechanical properties, flexibility and elasticity are obtained smoothly.

The results given in Table 10 above show that the use of the resin compositions of Comparative Examples 29 and 30, which contain modified EVOH (C), elastomer (J) and no crosslinking agent (K), gives poor gas barrier properties such that the oxygen transmission coefficient ranges from 58000 to 67000 ml·20 μm/m²·day·atm (6600 to 7700 fm·20 μm/Pa·s) and that they are not sufficiently good also in mechanical properties.

INDUSTRIAL APPLICABILITY

According to the present invention, a resin composition superior in barrier properties, transparency, stretchability, flexibility, flexing resistance and interlayer adhesiveness is provided. The resin composition is useful as a barrier material and is suitably employed in the form of various kinds of molded articles, especially multilayer structures, which are required to have barrier properties.

What is claimed is:
1. A resin composition comprising:
   1-99 wt. % of a modified ethylene-vinyl alcohol copolymer (C) having an ethylene content of 5-55 mole % and comprising 0.3-40 mole % of a following structural unit (I); and
   1-99 wt. % of an ethylene-vinyl alcohol copolymer (F) having an ethylene content of 5-55 mole % and being free of the structural unit (I):

wherein $R^1$ and $R^2$ are each a hydrogen atom, and
wherein one of $R^3$ and $R^4$ is a methyl group, an ethyl group or a $(CH_2)_iOH$ group, wherein i is an integer of 1 or 2, and the other is a hydrogen atom.

2. The resin composition according to claim 1, wherein the modified ethylene-vinyl alcohol copolymer (C) has an ethylene content of 10-50 mole %.

3. The resin composition according to claim 1, wherein the modified ethylene-vinyl alcohol copolymer (C) has an ethylene content of 20-45 mole %.

4. The resin composition according to claim 1, wherein the modified ethylene-vinyl alcohol copolymer (C) has an ethylene content of 25-31 mole %.

5. The resin composition according to claim 1, wherein the modified ethylene-vinyl alcohol copolymer (C) comprises 0.5-35 mole % of the structural unit (I).

6. The resin composition according to claim 1, wherein the modified ethylene-vinyl alcohol copolymer (C) comprises 1-30 mole % of the structural unit (I).

7. The resin composition according to claim 1, wherein the modified ethylene-vinyl alcohol copolymer (C) comprises 2-25 mole % of the structural unit (I).

8. The resin composition according to claim 1, wherein the modified ethylene-vinyl alcohol copolymer (C) has a melt flow rate of 0.1-30 g/10 min when measured at 190° C. under a load of 2160 g.

9. The resin composition according to claim 1, wherein the modified ethylene-vinyl alcohol copolymer (C) has a melt flow rate of 0.3-25 g/10 min when measured at 190° C. under a load of 2160 g.

10. The resin composition according to claim 1, wherein the modified ethylene-vinyl alcohol copolymer (C) has a melt flow rate of 0.5-20 g/10 min when measured at 190° C. under a load of 2160 g.

11. The resin composition according to claim 1, wherein the modified ethylene-vinyl alcohol copolymer (C) has a melting point of 160° C. or lower.

12. The resin composition according to claim 1, wherein the modified ethylene-vinyl alcohol copolymer (C) has a melting point of 150° C. or lower.

13. The resin composition according to claim 1, wherein the modified ethylene-vinyl alcohol copolymer (C) has a melting point of 140° C. or lower.

14. The resin composition according to claim 1, wherein the ethylene-vinyl alcohol copolymer (F) has an ethylene content of 20-50 mole %.

15. The resin composition according to claim 1, wherein the ethylene-vinyl alcohol copolymer (F) has an ethylene content of 25-45 mole %.

16. The resin composition according to claim 1, wherein the ethylene-vinyl alcohol copolymer (F) has an ethylene content of 27-38 mole %.

17. The resin composition according to claim 1, wherein the ethylene-vinyl alcohol copolymer (F) has an oxygen transmission rate of not more than 1000 cc·20 μm/m²·day·atm when measured at 20° C. and 65% RH.

18. The resin composition according to claim 1, wherein the ethylene-vinyl alcohol copolymer (F) has an oxygen transmission rate of not more than 100 cc·20 μm/m²·day·atm when measured at 20° C. and 65% RH.

19. The resin composition according to claim 1, wherein the ethylene-vinyl alcohol copolymer (F) has an oxygen transmission rate of not more than 10 cc·20 μm/m²·day·atm when measured at 20° C. and 65% RH.

20. The resin composition according to claim 1, comprising:
    1-50 wt. % of the modified ethylene-vinyl alcohol copolymer (C); and
    50-99 wt. % of the ethylene-vinyl alcohol copolymer (F).

21. The resin composition according to claim 1, comprising:
    5-40 wt. % of the modified ethylene-vinyl alcohol copolymer (C); and
    60-95 wt. % of the ethylene-vinyl alcohol copolymer (F).

22. The resin composition according to claim 1, comprising:
    10-30 wt. % of the modified ethylene-vinyl alcohol copolymer (C); and
    70-90 wt. % of the ethylene-vinyl alcohol copolymer (F).

23. The resin composition according to claim 1, wherein the difference between the ethylene content of the modified ethylene-vinyl alcohol copolymer (C) and the ethylene content of the ethylene-vinyl alcohol copolymer (F) is 2-30 mole %.

24. The resin composition according to claim 1, wherein the difference between the ethylene content of the modified ethylene-vinyl alcohol copolymer (C) and the ethylene content of the ethylene-vinyl alcohol copolymer (F) is 5-20 mole %.

25. The resin composition according to claim 1, wherein the resin composition has an oxygen transmission rate of not more than 100 cc·20 μm/m²·day·atm when measured at 20° C. and 65% RH.

26. The resin composition according to claim 1, wherein the resin composition has an oxygen transmission rate of not more than 50 cc·20 μm/m²·day·atm when measured at 20° C. and 65% RH.

27. The resin composition according to claim 1, wherein the resin composition has an oxygen transmission rate of not more than 20 cc·20 μm/m²·day·atm when measured at 20° C. and 65% RH.

28. The resin composition according to claim 1, wherein the resin composition has an oxygen transmission rate of not more than 10 cc·20 μm/m²·day·atm when measured at 20° C. and 65% RH.

29. The resin composition according to claim 1, wherein the resin composition has a carbon dioxide transmission rate of not more than 500 cc·20 μm/m²·day·atm when measured at 20° C. and 65% RH.

30. The resin composition according to claim 1, wherein the resin composition has a carbon dioxide transmission rate of not more than 200 cc·20 μm/m²·day·atm when measured at 20° C. and 65% RH.

31. The resin composition according to claim 1, wherein the resin composition has a carbon dioxide transmission rate of not more than 100 cc·20 μm/m²·day·atm when measured at 20° C. and 65% RH.

32. The resin composition according to claim 1, wherein the resin composition has a carbon dioxide transmission rate of not more than 50 cc·20 μm/m²·day·atm when measured at 20° C. and 65% RH.

33. The resin composition according to claim 1, wherein the resin composition has a Young's modulus of not more than 200 kgf/mm² in a tensile strength/elongation measurement at 23° C. and 50% RH.

34. The resin composition according to claim 1, wherein the resin composition has a Young's modulus of not more than 180 kgf/mm² in a tensile strength/elongation measurement at 23° C. and 50% RH.

35. The resin composition according to claim 1, wherein the resin composition have a tensile strength at yield of 4.0-10.0 kgf/mm² and a tensile elongation at break of 200-500% in a tensile strength/elongation measurement at 23° C. and 50% RH.

36. A method of producing the resin composition according to claim 1, wherein said method comprises:
    reacting an ethylene-vinyl alcohol copolymer (A) with a monofunctional epoxy compound (B) having a molecular weight of not more than 500 to produce the modified ethylene-vinyl alcohol copolymer (C); and
    blending the modified ethylene-vinyl alcohol copolymer (C) with the ethylene-vinyl alcohol copolymer (F).

37. The method according to claim 36, wherein the ethylene-vinyl alcohol copolymer (A) has an ethylene content of 5-55 mole %.

38. The method according to claim 36, wherein the ethylene-vinyl alcohol copolymer (A) has an ethylene content of 10-50 mole %.

39. The method according to claim 36, wherein the ethylene-vinyl alcohol copolymer (A) has an ethylene content of 20-45 mole %.

40. The method according to claim 36, wherein the ethylene-vinyl alcohol copolymer (A) has an ethylene content of 25-31 mole %.

41. The method according to claim 36, wherein the ethylene-vinyl alcohol copolymer (A) has an intrinsic viscosity of not less than 0.06 L/g.

42. The method according to claim 36, wherein the ethylene-vinyl alcohol copolymer (A) has an intrinsic viscosity of 0.07-0.2 L/g.

43. The method according to claim 36, wherein the ethylene-vinyl alcohol copolymer (A) has an intrinsic viscosity of 0.075-0.15 L/g.

44. The method according to claim 36, wherein the ethylene-vinyl alcohol copolymer (A) has an intrinsic viscosity of 0.080-0.12 L/g.

45. The method according to claim 36, wherein the ethylene-vinyl alcohol copolymer (A) has a melt flow rate of 0.1-30 g/10 min when measured at 190° C. under a load of 2160 g.

46. The method according to claim 36, wherein the ethylene-vinyl alcohol copolymer (A) has a melt flow rate of 0.3-25 g/10 min when measured at 190° C. under a load of 2160 g.

47. The method according to claim 36, wherein the ethylene-vinyl alcohol copolymer (A) has a melt flow rate of 0.5-20 g/10 min when measured at 190° C. under a load of 2160 g.

48. The method according to claim 36, wherein the monofunctional epoxy compound (B) having a molecular weight of not more than 500 is selected from the following formulae (III) or (IV):

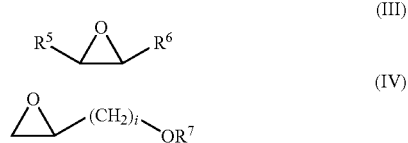

wherein one of $R^5$ and $R^6$ is a methyl group or an ethyl group, and the other is a hydrogen atom, and wherein $R^7$ is a hydrogen atom, and i is an integer of 1 or 2.

49. The method according to claim 36, wherein the modified ethylene-vinyl alcohol copolymer (C) is produced by reacting the ethylene-vinyl alcohol copolymer (A) with the monofunctional epoxy compound (B) in a weight ratio of 100:1-50.

50. The method according to claim 36, wherein the modified ethylene-vinyl alcohol copolymer (C) is produced by reacting the ethylene-vinyl alcohol copolymer (A) with the monofunctional epoxy compound (B) in a weight ratio of 100:2-40.

51. The method according to claim 36, wherein the modified ethylene-vinyl alcohol copolymer (C) is produced by reacting the ethylene-vinyl alcohol copolymer (A) with the monofunctional epoxy compound (B) in a weight ratio of 100:5-35.

52. The method according to claim 36, wherein the modified ethylene-vinyl alcohol copolymer (C) is produced by reacting the ethylene-vinyl alcohol copolymer (A) with the monofunctional epoxy compound (B) in a solution.

53. The method according to claim 52, wherein said reacting is conducted at a temperature of from room temperature to 150° C.

54. The method according to claim 52, wherein said reacting is conducted in the presence of a polar aprotic solvent selected from dimethylsulfoxide, dimethylformamide, dimethylacetamide and N-methylpyrrolidone.

55. The method according to claim 52, wherein said reacting is conducted in the presence of a reaction catalyst selected from acid catalysts and alkali catalysts.

56. The method according to claim 52, wherein the reaction catalyst is present in an amount of 0.0001-10 wt. %, based on 100 wt. % of the ethylene-vinyl alcohol copolymer (A).

57. The method according to claim 36, wherein the modified ethylene-vinyl alcohol copolymer (C) is produced by reacting the ethylene-vinyl alcohol copolymer (A) with the monofunctional epoxy compound (B) in an extruder.

58. The method according to claim 57, wherein the extruder is selected from a single-screw extruder, a twin-screw extruder, and a multi-screw extruder.

59. The method according to claim 57, wherein said reacting is conducted at a temperature of about 180-300° C.

60. The method according to claim 57, wherein said reacting is conducted under a pressure of 0.5-30 MPa.

61. The method according to claim 57, wherein said reacting is conducted in the presence of a reaction catalyst, which is a metal salt comprising: a metal cation selected from groups 3-12 of the periodic table; and an anion.

62. The method according to claim 61, wherein the metal cation is selected from zinc, yttrium and gadolinium.

63. The method according to claim 61, wherein the anion is a monovalent anion, the conjugate acid of is as strong as or stronger than sulfuric acid, and is selected from sulfonate ions, halide ions, perchlorate ions, anions having four or more fluorine atoms, ions of tetraphenylborate derivatives, and ions of carborane derivatives.

64. The method according to claim 61, wherein the reaction catalyst is present in an amount of 0.1-20 μmol/g based on the weight of the ethylene-vinyl alcohol copolymer (A).

65. The method according to claim 61, wherein the reaction catalyst is present in an amount of 0.5-10 μmol/g based on the weight of the ethylene-vinyl alcohol copolymer (A).

66. A resin composition comprising:

1-99 wt. % of a modified ethylene-vinyl alcohol copolymer (C) having an ethylene content of 5-55 mole % and comprising 0.3-40 mole % of a following structural unit (I); and 1-99 wt. % of an ethylene-vinyl alcohol copolymer (F) having an ethylene content of 5-55 mole % and being free of the structural unit (I):

wherein $R^1$ and $R^2$ are each a hydrogen atom, wherein one of $R^3$ and $R^4$ is a methyl group, an ethyl group or a $(CH_2)_iOH$ group, wherein i is an integer of 1 or 2, and the other is a hydrogen atom, and wherein said resin composition is produced by a process comprising:

reacting an ethylene-vinyl alcohol copolymer (A) with a monofunctional epoxy compound (B) having a molecular weight of not more than 500 to produce the modified ethylene-vinyl alcohol copolymer (C); and blending the modified ethylene-vinyl alcohol copolymer (C) with the ethylene-vinyl alcohol copolymer (F).

* * * * *